(12) United States Patent
Vinciarelli et al.

(10) Patent No.: US 12,395,087 B1
(45) Date of Patent: Aug. 19, 2025

(54) POWER DISTRIBUTION ARCHITECTURE WITH SERIES-CONNECTED BUS CONVERTER

(71) Applicant: Vicor Corporation, Andover, MA (US)

(72) Inventors: Patrizio Vinciarelli, Boston, MA (US); Andrew D'Amico, Marina Del Rey, CA (US)

(73) Assignee: Vicor Corporation, Andover, MA (US)

( * ) Notice: Subject to any disclaimer, the term of this patent is extended or adjusted under 35 U.S.C. 154(b) by 74 days.

(21) Appl. No.: 18/323,974

(22) Filed: May 25, 2023

Related U.S. Application Data

(63) Continuation of application No. 17/385,384, filed on Jul. 26, 2021, now Pat. No. 11,705,820, which is a
(Continued)

(51) Int. Cl.
*H02M 3/335* (2006.01)
*H02M 3/158* (2006.01)
*H02M 1/00* (2006.01)

(52) U.S. Cl.
CPC ....... *H02M 3/33576* (2013.01); *H02M 3/158* (2013.01); *H02M 3/33561* (2013.01);
(Continued)

(58) Field of Classification Search
CPC ................................................ H02M 3/33576
(Continued)

(56) References Cited

U.S. PATENT DOCUMENTS

| 443,441 A | 12/1890 | Hanson |
|---|---|---|
| 1,181,803 A | 5/1916 | Sargent |

(Continued)

FOREIGN PATENT DOCUMENTS

| CA | 1181803 A | 1/1985 |
|---|---|---|
| CA | 2042274 A1 | 12/1991 |

(Continued)

OTHER PUBLICATIONS

"Electronics Life" magazine excerpts, Mar. 1995, pp. 45-52 (English not available).
(Continued)

*Primary Examiner* — Joseph Chang
(74) *Attorney, Agent, or Firm* — Foley & Lardner LLP

(57) ABSTRACT

Apparatus for power conversion are provided. One apparatus includes a power converter including an input circuit and an output circuit. The power converter is configured to receive power from a source for providing power at a DC source voltage $V_S$. The power converter is adapted to convert power from the input circuit to the output circuit at a substantially fixed voltage transformation ratio $K_{DC}=V_{OUT}/V_{IN}$ at an output current, wherein $V_{IN}$ is an input voltage and $V_{OUT}$ is an output voltage. The input circuit and at least a portion of the output circuit are connected in series across the source, such that an absolute value of the input voltage $V_{IN}$ applied to the input circuit is approximately equal to the absolute value of the DC source voltage $V_S$ minus a number N times the absolute value of the output voltage $V_{OUT}$, where N is at least 1.

95 Claims, 7 Drawing Sheets

Related U.S. Application Data continuation of application No. 16/781,070, filed on Feb. 4, 2020, now Pat. No. 11,075,583, which is a continuation of application No. 16/022,636, filed on Jun. 28, 2018, now Pat. No. 10,594,223, which is a continuation of application No. 13/933,252, filed on Jul. 2, 2013, now Pat. No. 10,199,950.

(52) U.S. Cl.
CPC ........ *H02M 1/0058* (2021.05); *H02M 1/0064* (2021.05); *H02M 1/0093* (2021.05)

(58) Field of Classification Search
USPC .......................................................... 307/31
See application file for complete search history.

(56) References Cited

U.S. PATENT DOCUMENTS

| | | |
|---|---|---|
| 2,042,274 A | 5/1936 | Pollock |
| 2,497,534 A | 2/1950 | Campbell |
| 2,852,730 A | 9/1958 | Henry |
| 2,902,862 A | 9/1959 | Twiford |
| 2,953,738 A | 9/1960 | Bright |
| 3,008,068 A | 11/1961 | Jacobus et al. |
| 3,008,506 A | 11/1961 | Hicks |
| 3,029,398 A | 4/1962 | McComb |
| 3,083,328 A | 3/1963 | Paul et al. |
| 3,141,140 A | 7/1964 | Rich |
| 3,146,406 A | 8/1964 | Jacobus |
| 3,161,837 A | 12/1964 | Lloyd |
| 3,174,042 A | 3/1965 | Effner |
| 3,229,111 A | 1/1966 | Rudolf et al. |
| 3,241,035 A | 3/1966 | Rhyne |
| 3,295,042 A | 12/1966 | Evalds et al. |
| 3,307,073 A | 2/1967 | McLaughlin |
| 3,313,996 A | 4/1967 | Lingle |
| 3,343,073 A | 9/1967 | Orland |
| 3,400,325 A | 9/1968 | Webb |
| 3,435,375 A | 3/1969 | Miller |
| 3,443,194 A | 5/1969 | Cielo |
| 3,448,370 A | 6/1969 | Harrigan |
| 3,454,853 A | 7/1969 | Hawkins et al. |
| 3,458,798 A | 7/1969 | Frang et al. |
| 3,459,957 A | 8/1969 | Kelley |
| 3,471,747 A | 10/1969 | Gershen |
| 3,495,157 A | 2/1970 | Nercessian |
| 3,506,908 A | 4/1970 | Resch |
| 3,514,692 A | 5/1970 | Lingle |
| 3,517,301 A | 6/1970 | Huber |
| 3,553,428 A | 1/1971 | McGhee |
| 3,564,393 A | 2/1971 | Williamson |
| 3,569,818 A | 3/1971 | Dahlinger et al. |
| 3,573,483 A | 4/1971 | White |
| 3,573,494 A | 4/1971 | Houpt et al. |
| 3,573,508 A | 4/1971 | Harris |
| 3,573,544 A | 4/1971 | Zonis et al. |
| 3,573,597 A | 4/1971 | Genuit et al. |
| 3,579,026 A | 5/1971 | Paget |
| 3,581,186 A | 5/1971 | Weinberger |
| 3,582,754 A | 6/1971 | Hoffmann et al. |
| 3,582,758 A | 6/1971 | Gunn |
| 3,584,289 A | 6/1971 | Bishop et al. |
| 3,588,595 A | 6/1971 | Silvers |
| 3,599,073 A | 8/1971 | Wilson et al. |
| 3,604,920 A | 9/1971 | Niles |
| 3,619,713 A | 11/1971 | Biega et al. |
| 3,629,648 A | 12/1971 | Brown et al. |
| 3,629,725 A | 12/1971 | Chun |
| 3,638,099 A | 1/1972 | Centala |
| 3,643,152 A | 2/1972 | Matsumura et al. |
| 3,646,395 A | 2/1972 | De Pratti |
| 3,657,631 A | 4/1972 | Martens et al. |
| 3,660,672 A | 5/1972 | Berger et al. |
| 3,663,941 A | 5/1972 | Pasciutti |
| 3,665,203 A | 5/1972 | Barnett |
| 3,668,508 A | 6/1972 | Archer et al. |
| 3,684,891 A | 8/1972 | Sieron |
| 3,696,286 A | 10/1972 | Ule |
| 3,704,381 A | 11/1972 | Nercessian |
| 3,710,231 A | 1/1973 | Baker |
| 3,714,545 A | 1/1973 | Chiffert |
| 3,733,538 A | 5/1973 | Kernick et al. |
| 3,735,235 A | 5/1973 | Hamilton et al. |
| 3,737,755 A | 6/1973 | Calkin et al. |
| 3,742,242 A | 6/1973 | Morio et al. |
| 3,743,861 A | 7/1973 | Bolmgren |
| 3,751,676 A | 8/1973 | Igarashi et al. |
| 3,753,071 A | 8/1973 | Engel et al. |
| 3,753,076 A | 8/1973 | Zelina |
| 3,754,177 A | 8/1973 | O'Reilly |
| 3,757,195 A | 9/1973 | Sklaroof |
| 3,769,545 A | 10/1973 | Crane |
| 3,771,040 A | 11/1973 | Fletcher et al. |
| 3,781,505 A | 12/1973 | Steigerwald |
| 3,781,638 A | 12/1973 | Anderson et al. |
| 3,787,730 A | 1/1974 | Ray |
| 3,805,094 A | 4/1974 | Orlando |
| 3,816,810 A | 6/1974 | Friedman et al. |
| 3,818,237 A | 6/1974 | Straus |
| 3,818,312 A | 6/1974 | Luursema et al. |
| 3,820,008 A | 6/1974 | Guarnaschelli |
| 3,824,450 A | 7/1974 | Johnson et al. |
| 3,845,404 A | 10/1974 | Trilling |
| 3,848,175 A | 11/1974 | Demarest |
| 3,851,240 A | 11/1974 | Walker et al. |
| 3,851,278 A | 11/1974 | Isono |
| 3,859,638 A | 1/1975 | Hume |
| 3,873,846 A | 3/1975 | Morio et al. |
| 3,879,647 A | 4/1975 | Hamilton et al. |
| 3,879,652 A | 4/1975 | Billings |
| 3,904,950 A | 9/1975 | Judd et al. |
| 3,909,695 A | 9/1975 | Peck |
| 3,909,700 A | 9/1975 | Ferro |
| 3,912,940 A | 10/1975 | Vince |
| 3,913,002 A | 10/1975 | Steigerwald et al. |
| 3,913,036 A | 10/1975 | Hook |
| 3,916,289 A | 10/1975 | Lynch |
| 3,919,656 A | 11/1975 | Sokal et al. |
| 3,927,363 A | 12/1975 | Mitchell et al. |
| 3,930,196 A | 12/1975 | Park et al. |
| 3,932,764 A | 1/1976 | Corey |
| 3,938,024 A | 2/1976 | Clarke |
| 3,940,682 A | 2/1976 | Park et al. |
| 3,949,238 A | 4/1976 | Brookes |
| 3,959,716 A | 5/1976 | Gilbert et al. |
| 3,974,397 A | 8/1976 | Killough |
| 3,976,932 A | 8/1976 | Collins |
| 3,986,052 A | 10/1976 | Hunter |
| 3,986,097 A | 10/1976 | Woods |
| 3,989,995 A | 11/1976 | Peterson |
| 3,991,319 A | 11/1976 | Servos et al. |
| 4,005,335 A | 1/1977 | Perper |
| 4,007,413 A | 2/1977 | Fisher et al. |
| 4,010,381 A | 3/1977 | Fickenscher et al. |
| 4,011,518 A | 3/1977 | Irvine et al. |
| 4,017,746 A | 4/1977 | Miller |
| 4,017,783 A | 4/1977 | Assow et al. |
| 4,017,784 A | 4/1977 | Simmons et al. |
| 4,027,228 A | 5/1977 | Collins |
| 4,037,271 A | 7/1977 | Keller |
| 4,044,268 A | 8/1977 | Hammel et al. |
| 4,051,445 A | 9/1977 | Boschert |
| 4,058,369 A | 11/1977 | Bentley et al. |
| 4,060,757 A | 11/1977 | McMurray |
| 4,066,945 A | 1/1978 | Korte, Jr. |
| 4,074,182 A | 2/1978 | Weischedel |
| 4,078,247 A | 3/1978 | Albrecht |
| 4,104,539 A | 8/1978 | Hase |
| 4,106,084 A | 8/1978 | Gibert |
| 4,109,192 A | 8/1978 | Burbank et al. |
| 4,114,048 A | 9/1978 | Hull et al. |
| 4,115,704 A | 9/1978 | Hannemann et al. |
| 4,122,359 A | 10/1978 | Breikss |

(56) References Cited

U.S. PATENT DOCUMENTS

| | | |
|---|---|---|
| 4,126,793 A | 11/1978 | De Vries |
| 4,128,868 A | 12/1978 | Gamble |
| 4,131,860 A | 12/1978 | Fyot |
| 4,140,959 A | 2/1979 | Powell |
| 4,150,423 A | 4/1979 | Boschert |
| 4,177,389 A | 12/1979 | Schott |
| 4,184,197 A | 1/1980 | Cuk et al. |
| 4,187,458 A | 2/1980 | Milberger et al. |
| 4,194,147 A | 3/1980 | Payne et al. |
| 4,205,368 A | 5/1980 | Erche et al. |
| 4,207,475 A | 6/1980 | Nercessian |
| 4,208,594 A | 6/1980 | Guicheteau |
| 4,208,706 A | 6/1980 | Suzuki et al. |
| 4,209,710 A | 6/1980 | Quarton |
| 4,210,858 A | 7/1980 | Ford et al. |
| 4,210,958 A | 7/1980 | Ikenoue et al. |
| 4,238,690 A | 12/1980 | Clarke |
| 4,238,691 A | 12/1980 | Ebert, Jr. |
| 4,241,261 A | 12/1980 | Ebert, Jr. |
| 4,245,194 A | 1/1981 | Fahlen et al. |
| 4,245,286 A | 1/1981 | Paulkovich et al. |
| 4,251,857 A | 2/1981 | Shelly |
| 4,253,136 A | 2/1981 | Nanko |
| 4,254,459 A | 3/1981 | Belson |
| 4,257,087 A | 3/1981 | Cuk |
| 4,257,089 A | 3/1981 | Ravis |
| 4,262,214 A | 4/1981 | Patel |
| 4,268,476 A | 5/1981 | Raible |
| 4,270,164 A | 5/1981 | Wyman et al. |
| 4,270,165 A | 5/1981 | Carpenter et al. |
| 4,272,806 A | 6/1981 | Metzger |
| 4,274,133 A | 6/1981 | Cuk et al. |
| 4,275,317 A | 6/1981 | Frosch et al. |
| 4,276,594 A | 6/1981 | Morley |
| 4,277,726 A | 7/1981 | Burke |
| 4,277,728 A | 7/1981 | Stevens |
| 4,288,739 A | 9/1981 | Nercessian |
| 4,288,865 A | 9/1981 | Graham |
| 4,292,581 A | 9/1981 | Tan |
| 4,293,902 A | 10/1981 | White |
| 4,293,904 A | 10/1981 | Brooks et al. |
| 4,297,590 A | 10/1981 | Vail |
| 4,300,191 A | 11/1981 | Baranowski et al. |
| 4,301,496 A | 11/1981 | Schwarz |
| 4,302,803 A | 11/1981 | Shelly |
| 4,307,441 A | 12/1981 | Bello |
| 4,310,771 A | 1/1982 | Wyatt et al. |
| 4,313,060 A | 1/1982 | Fickenscher et al. |
| 4,315,207 A | 2/1982 | Apfel |
| 4,316,097 A | 2/1982 | Reynolds |
| 4,317,056 A | 2/1982 | Alberts |
| 4,318,007 A | 3/1982 | Rizzi |
| 4,318,164 A | 3/1982 | Onodera et al. |
| 4,322,817 A | 3/1982 | Kuster |
| 4,323,787 A | 4/1982 | Sato et al. |
| 4,323,788 A | 4/1982 | Smith |
| 4,323,962 A | 4/1982 | Steigerwald |
| 4,325,017 A | 4/1982 | Schade, Jr. |
| 4,327,298 A | 4/1982 | Burgin |
| 4,328,482 A | 5/1982 | Belcher et al. |
| 4,330,816 A | 5/1982 | Imazeki et al. |
| 4,334,263 A | 6/1982 | Adachi |
| 4,336,587 A | 6/1982 | Boettcher et al. |
| 4,344,122 A | 8/1982 | Jones |
| 4,344,124 A | 8/1982 | Panicali |
| 4,346,342 A | 8/1982 | Carollo |
| 4,347,558 A | 8/1982 | Kalinsky |
| 4,353,113 A | 10/1982 | Billings |
| 4,355,884 A | 10/1982 | Honda et al. |
| 4,356,541 A | 10/1982 | Ikenoue et al. |
| 4,357,654 A | 11/1982 | Ikenoue et al. |
| 4,368,409 A | 1/1983 | Sivanesan et al. |
| 4,371,919 A | 2/1983 | Andrews et al. |
| 4,381,457 A | 4/1983 | Wiles |
| 4,386,394 A | 5/1983 | Kocher et al. |
| 4,393,316 A | 7/1983 | Brown |
| 4,395,639 A | 7/1983 | Bring |
| 4,398,156 A | 8/1983 | Aaland |
| 4,399,499 A | 8/1983 | Butcher et al. |
| 4,403,269 A | 9/1983 | Carroll |
| 4,415,960 A | 11/1983 | Clark, Jr. |
| 4,423,341 A | 12/1983 | Shelly |
| 4,427,899 A | 1/1984 | Bruns |
| 4,438,411 A | 3/1984 | Rubin et al. |
| 4,441,070 A | 4/1984 | Davies et al. |
| 4,442,339 A | 4/1984 | Mizuno et al. |
| 4,443,840 A | 4/1984 | Geissler et al. |
| 4,449,173 A | 5/1984 | Nishino et al. |
| 4,449,174 A | 5/1984 | Ziesse |
| 4,449,175 A | 5/1984 | Ishii et al. |
| 4,451,743 A | 5/1984 | Suzuki et al. |
| 4,451,876 A | 5/1984 | Ogata |
| 4,465,966 A | 8/1984 | Long et al. |
| 4,471,289 A | 9/1984 | Duley et al. |
| 4,473,756 A | 9/1984 | Brigden et al. |
| 4,476,399 A | 10/1984 | Yoshida et al. |
| 4,479,175 A | 10/1984 | Gille et al. |
| 4,484,084 A | 11/1984 | Cheffer |
| 4,499,531 A | 2/1985 | Bray |
| 4,504,895 A | 3/1985 | Steigerwald |
| 4,519,024 A | 5/1985 | Federico et al. |
| 4,520,296 A | 5/1985 | Lepper et al. |
| 4,523,265 A | 6/1985 | Deprez |
| 4,524,411 A | 6/1985 | Willis |
| 4,524,413 A | 6/1985 | Ikenoue et al. |
| 4,527,228 A | 7/1985 | Chi Yu |
| 4,528,459 A | 7/1985 | Wiegel |
| 4,533,986 A | 8/1985 | Jones |
| 4,535,399 A | 8/1985 | Szepesi |
| 4,536,700 A | 8/1985 | Bello et al. |
| 4,538,073 A | 8/1985 | Freige et al. |
| 4,538,101 A | 8/1985 | Shimpo et al. |
| 4,539,487 A | 9/1985 | Ishii |
| 4,546,421 A | 10/1985 | Bello et al. |
| 4,553,039 A | 11/1985 | Stifter |
| 4,556,802 A | 12/1985 | Harada et al. |
| 4,561,046 A | 12/1985 | Kuster |
| 4,562,522 A | 12/1985 | Adams et al. |
| 4,564,800 A | 1/1986 | Jurjans |
| 4,566,059 A | 1/1986 | Gallios et al. |
| 4,571,551 A | 2/1986 | Trager |
| 4,575,640 A | 3/1986 | Martin |
| 4,578,631 A | 3/1986 | Smith |
| 4,584,635 A | 4/1986 | MacInnis et al. |
| 4,586,119 A | 4/1986 | Sutton |
| 4,587,604 A | 5/1986 | Nerone |
| 4,591,782 A | 5/1986 | Germer |
| 4,593,213 A | 6/1986 | Vesce et al. |
| 4,605,999 A | 8/1986 | Bowman et al. |
| 4,607,195 A | 8/1986 | Valkestijn et al. |
| 4,607,323 A | 8/1986 | Sokal et al. |
| 4,618,919 A | 10/1986 | Martin, Jr. |
| 4,621,313 A | 11/1986 | Kiteley |
| 4,622,511 A | 11/1986 | Moore |
| 4,622,629 A | 11/1986 | Glennon |
| 4,626,982 A | 12/1986 | Huber |
| 4,628,426 A | 12/1986 | Steigerwald |
| 4,635,179 A | 1/1987 | Carsten |
| 4,638,175 A | 1/1987 | Bradford et al. |
| 4,642,475 A | 2/1987 | Fischer et al. |
| 4,642,743 A | 2/1987 | Radcliffe |
| 4,644,440 A | 2/1987 | Kenny et al. |
| 4,648,017 A | 3/1987 | Nerone |
| 4,651,020 A | 3/1987 | Kenny et al. |
| 4,652,769 A | 3/1987 | Smith et al. |
| 4,659,942 A | 4/1987 | Volp |
| 4,663,699 A | 5/1987 | Wilkinson |
| 4,670,661 A | 6/1987 | Ishikawa |
| 4,672,517 A | 6/1987 | Mandelcorn |
| 4,672,518 A | 6/1987 | Murdock |
| 4,672,528 A | 6/1987 | Park et al. |
| 4,674,019 A | 6/1987 | Martinelli |
| 4,675,796 A | 6/1987 | Gautherin et al. |
| 4,677,311 A | 6/1987 | Morita |

(56) References Cited

U.S. PATENT DOCUMENTS

| | | |
|---|---|---|
| 4,677,534 A | 6/1987 | Okochi |
| 4,680,688 A | 7/1987 | Inou et al. |
| 4,680,689 A | 7/1987 | Payne et al. |
| 4,683,528 A | 7/1987 | Snow et al. |
| 4,685,039 A | 8/1987 | Inou et al. |
| 4,688,160 A | 8/1987 | Fraidlin |
| 4,691,273 A | 9/1987 | Kuwata et al. |
| 4,694,384 A | 9/1987 | Steigerwald et al. |
| 4,694,386 A | 9/1987 | De Sartre |
| 4,695,935 A | 9/1987 | Oen et al. |
| 4,697,136 A | 9/1987 | Ishikawa |
| 4,698,738 A | 10/1987 | Miller et al. |
| 4,706,177 A | 11/1987 | Josephson |
| 4,709,316 A | 11/1987 | Ngo et al. |
| 4,709,318 A | 11/1987 | Gephart et al. |
| 4,716,514 A | 12/1987 | Patel |
| 4,717,833 A | 1/1988 | Small |
| 4,727,308 A | 2/1988 | Huljak et al. |
| 4,727,469 A | 2/1988 | Kammiller |
| 4,730,242 A | 3/1988 | Divan |
| 4,733,102 A | 3/1988 | Nakayama et al. |
| 4,734,839 A | 3/1988 | Barthold |
| 4,734,844 A | 3/1988 | Rhoads |
| 4,734,924 A | 3/1988 | Yahata et al. |
| 4,745,299 A | 5/1988 | Eng et al. |
| 4,745,538 A | 5/1988 | Cross et al. |
| 4,747,034 A | 5/1988 | Dickey |
| 4,748,550 A | 5/1988 | Okado |
| 4,754,160 A | 6/1988 | Ely |
| 4,754,161 A | 6/1988 | Fox |
| 4,760,276 A | 7/1988 | Lethellier |
| 4,763,237 A | 8/1988 | Wieczorek |
| 4,768,141 A | 8/1988 | Hubertus et al. |
| 4,772,994 A | 9/1988 | Harada et al. |
| 4,777,382 A | 10/1988 | Reingold |
| 4,777,575 A | 10/1988 | Yamato et al. |
| 4,779,185 A | 10/1988 | Musil |
| 4,782,241 A | 11/1988 | Baker et al. |
| 4,783,728 A | 11/1988 | Hoffman |
| 4,785,387 A | 11/1988 | Lee et al. |
| 4,788,450 A | 11/1988 | Wagner |
| 4,788,634 A | 11/1988 | Schlecht et al. |
| 4,794,506 A | 12/1988 | Hino et al. |
| 4,796,173 A | 1/1989 | Steigerwald |
| 4,800,479 A | 1/1989 | Bupp |
| 4,805,078 A | 2/1989 | Munz |
| 4,809,148 A | 2/1989 | Barn |
| 4,811,191 A | 3/1989 | Miller |
| 4,812,672 A | 3/1989 | Cowan et al. |
| 4,814,962 A | 3/1989 | Magalhaes et al. |
| 4,814,965 A | 3/1989 | Petersen |
| 4,823,249 A | 4/1989 | Garcia, II |
| 4,825,348 A | 4/1989 | Steigerwald et al. |
| 4,829,216 A | 5/1989 | Rodriguez-Cavazos |
| 4,833,582 A | 5/1989 | Kupka |
| 4,841,160 A | 6/1989 | Yon et al. |
| 4,853,832 A | 8/1989 | Stuart |
| 4,853,837 A | 8/1989 | Gulczynski |
| 4,855,858 A | 8/1989 | Boertzel et al. |
| 4,855,888 A | 8/1989 | Henze et al. |
| 4,860,184 A | 8/1989 | Tabisz et al. |
| 4,860,185 A | 8/1989 | Brewer et al. |
| 4,860,188 A | 8/1989 | Bailey et al. |
| 4,860,189 A | 8/1989 | Hitchcock |
| 4,864,479 A | 9/1989 | Steigerwald et al. |
| 4,864,483 A | 9/1989 | Divan |
| 4,866,588 A | 9/1989 | Rene |
| 4,866,589 A | 9/1989 | Satoo et al. |
| 4,868,729 A | 9/1989 | Suzuki |
| 4,870,555 A | 9/1989 | White |
| 4,873,616 A | 10/1989 | Fredrick et al. |
| 4,873,618 A | 10/1989 | Fredrick et al. |
| 4,877,972 A | 10/1989 | Sobhani et al. |
| 4,881,014 A | 11/1989 | Okochi |
| 4,882,646 A | 11/1989 | Genuit |
| 4,882,664 A | 11/1989 | Pennington |
| 4,882,665 A | 11/1989 | Choi et al. |
| 4,885,674 A | 12/1989 | Varga et al. |
| 4,890,210 A | 12/1989 | Myers |
| 4,890,214 A | 12/1989 | Yamamoto |
| 4,893,227 A | 1/1990 | Gallios et al. |
| 4,893,228 A | 1/1990 | Orrick et al. |
| 4,896,092 A | 1/1990 | Flynn |
| 4,899,271 A | 2/1990 | Seiersen |
| 4,900,885 A | 2/1990 | Inumada |
| 4,902,508 A | 2/1990 | Badylak et al. |
| 4,903,183 A | 2/1990 | Noguchi et al. |
| 4,903,189 A | 2/1990 | Ngo et al. |
| 4,908,857 A | 3/1990 | Burns et al. |
| 4,916,599 A | 4/1990 | Traxler et al. |
| 4,920,470 A | 4/1990 | Clements |
| 4,922,397 A | 5/1990 | Heyman |
| 4,922,404 A | 5/1990 | Ludwig et al. |
| 4,924,170 A | 5/1990 | Henze |
| 4,926,303 A | 5/1990 | Sturgeon |
| 4,929,605 A | 5/1990 | Domet et al. |
| 4,931,918 A | 6/1990 | Inou et al. |
| 4,935,857 A | 6/1990 | Nguyen et al. |
| 4,937,468 A | 6/1990 | Shekhawat et al. |
| 4,952,849 A | 8/1990 | Fellows et al. |
| 4,953,068 A | 8/1990 | Henze |
| 4,958,268 A | 9/1990 | Nagagata et al. |
| 4,959,764 A | 9/1990 | Bassett |
| 4,959,766 A | 9/1990 | Jain |
| 4,961,128 A | 10/1990 | Bloom |
| 4,975,823 A | 12/1990 | Rilly et al. |
| 4,982,149 A | 1/1991 | Shimanuki |
| 5,001,318 A | 3/1991 | Noda |
| 5,006,782 A | 4/1991 | Pelly |
| 5,008,795 A | 4/1991 | Parsley et al. |
| 5,010,261 A | 4/1991 | Steigerwald |
| 5,012,401 A | 4/1991 | Barlage |
| 5,013,980 A | 5/1991 | Stephens et al. |
| 5,016,245 A | 5/1991 | Lobjinski et al. |
| 5,017,800 A | 5/1991 | Divan |
| 5,019,717 A | 5/1991 | McCurry et al. |
| 5,019,719 A | 5/1991 | King |
| 5,019,954 A | 5/1991 | Bourgeault et al. |
| 5,023,766 A | 6/1991 | Laidler |
| 5,027,002 A | 6/1991 | Thornton |
| 5,027,264 A | 6/1991 | Dedoncker et al. |
| 5,029,062 A | 7/1991 | Capel |
| 5,036,452 A | 7/1991 | Loftus |
| 5,038,264 A | 8/1991 | Steigerwald |
| 5,038,265 A | 8/1991 | Paladel |
| 5,038,266 A | 8/1991 | Callen et al. |
| 5,041,777 A | 8/1991 | Riedger |
| 5,043,859 A | 8/1991 | Korman et al. |
| 5,047,911 A | 9/1991 | Sperzel et al. |
| 5,055,722 A | 10/1991 | Latos et al. |
| 5,057,698 A | 10/1991 | Widener et al. |
| 5,057,986 A | 10/1991 | Henze et al. |
| 5,063,338 A | 11/1991 | Capel et al. |
| 5,063,489 A | 11/1991 | Inaba |
| 5,066,900 A | 11/1991 | Bassett |
| 5,073,848 A | 12/1991 | Steigerwald et al. |
| 5,077,486 A | 12/1991 | Marson et al. |
| 5,079,686 A | 1/1992 | Vinciarelli |
| 5,097,403 A | 3/1992 | Smith |
| 5,099,406 A | 3/1992 | Harada et al. |
| 5,101,336 A | 3/1992 | Willocx et al. |
| 5,103,110 A | 4/1992 | Housworth et al. |
| 5,103,387 A | 4/1992 | Rosenbaum et al. |
| 5,105,351 A | 4/1992 | Harada et al. |
| 5,111,372 A | 5/1992 | Kameyama et al. |
| 5,111,374 A | 5/1992 | Lai et al. |
| 5,113,334 A | 5/1992 | Tuson et al. |
| 5,113,337 A | 5/1992 | Steigerwald |
| 5,119,013 A | 6/1992 | Sabroff |
| 5,119,283 A | 6/1992 | Steigerwald et al. |
| 5,119,284 A | 6/1992 | Fisher et al. |
| 5,122,726 A | 6/1992 | Elliott et al. |
| 5,122,945 A | 6/1992 | Marawi |
| 5,126,651 A | 6/1992 | Gauen |

(56) References Cited

U.S. PATENT DOCUMENTS

| | | |
|---|---|---|
| 5,128,603 A | 7/1992 | Wolfel |
| 5,132,888 A | 7/1992 | Lo et al. |
| 5,132,889 A | 7/1992 | Hitchcock et al. |
| 5,138,184 A | 8/1992 | Keefe |
| 5,138,249 A | 8/1992 | Capel |
| 5,140,509 A | 8/1992 | Murugan |
| 5,140,512 A | 8/1992 | O'Sullivan |
| 5,140,514 A | 8/1992 | Tuusa et al. |
| 5,144,547 A | 9/1992 | Masamoto |
| 5,146,394 A | 9/1992 | Ishii et al. |
| 5,157,269 A | 10/1992 | Jordan et al. |
| 5,159,541 A | 10/1992 | Jain |
| 5,161,241 A | 11/1992 | Kanai |
| 5,162,663 A | 11/1992 | Combs et al. |
| 5,164,609 A | 11/1992 | Poppe et al. |
| 5,168,435 A | 12/1992 | Kobayashi et al. |
| 5,173,846 A | 12/1992 | Smith |
| 5,177,675 A | 1/1993 | Archer |
| 5,179,512 A | 1/1993 | Fisher et al. |
| 5,206,800 A | 4/1993 | Smith |
| 5,208,740 A | 5/1993 | Ehsani |
| 5,216,351 A | 6/1993 | Shimoda |
| 5,218,522 A | 6/1993 | Phelps et al. |
| 5,221,887 A | 6/1993 | Gulczynski |
| 5,224,025 A | 6/1993 | Divan et al. |
| 5,233,509 A | 8/1993 | Ghotbi |
| 5,235,502 A | 8/1993 | Vinciarelli et al. |
| 5,237,208 A | 8/1993 | Tominaga et al. |
| 5,237,606 A | 8/1993 | Ziermann |
| 5,254,930 A | 10/1993 | Daly |
| 5,255,174 A | 10/1993 | Murugan |
| 5,264,736 A | 11/1993 | Jacobson |
| 5,267,135 A | 11/1993 | Tezuka et al. |
| 5,267,137 A | 11/1993 | Goebel |
| 5,268,830 A | 12/1993 | Loftus, Jr. |
| 5,272,612 A | 12/1993 | Harada et al. |
| 5,272,613 A | 12/1993 | Buthker |
| 5,274,539 A | 12/1993 | Steigerwald et al. |
| 5,274,543 A | 12/1993 | Loftus, Jr. |
| 5,289,364 A | 2/1994 | Sakurai |
| 5,303,138 A | 4/1994 | Rozman |
| 5,304,875 A | 4/1994 | Smith |
| 5,305,191 A | 4/1994 | Loftus, Jr. |
| 5,305,192 A | 4/1994 | Bonte et al. |
| 5,343,383 A | 8/1994 | Shinada et al. |
| 5,353,212 A | 10/1994 | Loftus, Jr. |
| 5,355,077 A | 10/1994 | Kates |
| 5,355,293 A | 10/1994 | Carlstedt |
| 5,355,294 A | 10/1994 | De Doncker et al. |
| 5,363,323 A | 11/1994 | Lange |
| 5,377,090 A | 12/1994 | Steigerwald |
| 5,383,858 A | 1/1995 | Reilly et al. |
| 5,386,359 A | 1/1995 | Nochi |
| 5,396,403 A | 3/1995 | Patel |
| 5,396,412 A | 3/1995 | Barlage |
| 5,398,182 A | 3/1995 | Crosby |
| 5,400,239 A | 3/1995 | Caine |
| 5,410,467 A | 4/1995 | Smith et al. |
| 5,412,308 A | 5/1995 | Brown |
| 5,412,557 A | 5/1995 | Lauw |
| 5,424,932 A | 6/1995 | Inou et al. |
| 5,428,523 A | 6/1995 | McDonnal |
| 5,430,632 A | 7/1995 | Meszlenyi |
| 5,430,633 A | 7/1995 | Smith |
| 5,434,770 A | 7/1995 | Dreifuerst et al. |
| 5,438,499 A | 8/1995 | Bonte et al. |
| 5,442,534 A | 8/1995 | Cuk et al. |
| 5,448,469 A | 9/1995 | Rilly et al. |
| 5,461,301 A | 10/1995 | Truong |
| 5,477,091 A | 12/1995 | Fiorina et al. |
| 5,481,178 A | 1/1996 | Wilcox et al. |
| 5,481,449 A | 1/1996 | Kheraluwala et al. |
| 5,500,791 A | 3/1996 | Kheraluwala et al. |
| 5,513,092 A | 4/1996 | Goebel |
| 5,514,921 A | 5/1996 | Steigerwald |
| 5,519,599 A | 5/1996 | Shinada et al. |
| 5,528,480 A | 6/1996 | Kikinis et al. |
| 5,528,482 A | 6/1996 | Rozman |
| 5,530,635 A | 6/1996 | Yashiro |
| 5,534,768 A | 7/1996 | Chavannes et al. |
| 5,535,112 A | 7/1996 | Vazquez Lopez et al. |
| 5,537,021 A | 7/1996 | Weinberg et al. |
| 5,539,630 A | 7/1996 | Pietkiewicz et al. |
| 5,539,631 A | 7/1996 | Partridge |
| 5,541,827 A | 7/1996 | Allfather |
| 5,552,695 A | 9/1996 | Schwartz |
| 5,559,423 A | 9/1996 | Harman |
| 5,559,682 A | 9/1996 | Kanouda et al. |
| 5,570,276 A | 10/1996 | Cuk et al. |
| 5,576,940 A | 11/1996 | Steigerwald et al. |
| 5,590,032 A | 12/1996 | Bowman et al. |
| 5,594,629 A | 1/1997 | Steigerwald |
| 5,621,621 A | 4/1997 | Lilliestrale |
| 5,625,541 A | 4/1997 | Rozman |
| 5,635,826 A | 6/1997 | Sugawara |
| 5,636,107 A | 6/1997 | Lu et al. |
| 5,636,116 A | 6/1997 | Milavec et al. |
| 5,663,876 A | 9/1997 | Newton et al. |
| 5,663,877 A | 9/1997 | Dittli et al. |
| 5,663,887 A | 9/1997 | Warn et al. |
| 5,691,870 A | 11/1997 | Gebara |
| 5,708,571 A | 1/1998 | Shinada |
| 5,719,754 A | 2/1998 | Fraidlin et al. |
| 5,726,869 A | 3/1998 | Yamashita et al. |
| 5,729,444 A | 3/1998 | Perol |
| 5,734,563 A | 3/1998 | Shinada |
| 5,736,843 A | 4/1998 | Amin |
| 5,742,491 A | 4/1998 | Bowman et al. |
| 5,745,359 A | 4/1998 | Faulk |
| 5,754,414 A | 5/1998 | Hanington |
| 5,757,625 A | 5/1998 | Schoofs |
| 5,757,627 A | 5/1998 | Faulk |
| 5,768,118 A | 6/1998 | Faulk et al. |
| 5,771,160 A | 6/1998 | Seong |
| 5,774,350 A | 6/1998 | Notaro et al. |
| 5,781,420 A | 7/1998 | Xia et al. |
| 5,781,421 A | 7/1998 | Steigerwald et al. |
| 5,784,266 A | 7/1998 | Chen |
| 5,805,432 A | 9/1998 | Zaitsu et al. |
| 5,818,704 A | 10/1998 | Martinez |
| 5,831,839 A | 11/1998 | Pansier |
| 5,841,641 A | 11/1998 | Faulk |
| 5,841,643 A | 11/1998 | Schenkel |
| 5,862,042 A | 1/1999 | Jiang |
| 5,870,299 A | 2/1999 | Rozman |
| 5,872,705 A | 2/1999 | Loftus et al. |
| 5,880,939 A | 3/1999 | Sardat |
| 5,880,949 A | 3/1999 | Melhem et al. |
| 5,894,412 A | 4/1999 | Faulk |
| 5,901,052 A | 5/1999 | Strijker |
| 5,903,452 A | 5/1999 | Yang |
| 5,907,481 A | 5/1999 | Svardsjo |
| 5,916,313 A | 6/1999 | Brown |
| 5,929,692 A | 7/1999 | Carsten |
| 5,946,202 A | 8/1999 | Balogh |
| 5,946,207 A | 8/1999 | Schoofs |
| 5,949,658 A | 9/1999 | Thottuvelil et al. |
| 5,956,242 A | 9/1999 | Majid et al. |
| 5,956,245 A | 9/1999 | Rozman |
| 5,959,370 A | 9/1999 | Pardo |
| 5,991,167 A | 11/1999 | Van Lerberghe |
| 5,999,417 A | 12/1999 | Schlecht |
| 6,002,597 A | 12/1999 | Rozman |
| 6,005,773 A | 12/1999 | Rozman et al. |
| 6,011,703 A | 1/2000 | Boylan et al. |
| 6,016,258 A | 1/2000 | Jain et al. |
| 6,016,261 A | 1/2000 | De Wit et al. |
| RE36,571 E | 2/2000 | Rozman |
| 6,026,005 A | 2/2000 | Abdoulin |
| 6,038,148 A | 3/2000 | Farrington et al. |
| 6,046,920 A | 4/2000 | Cazabat et al. |
| 6,058,026 A | 5/2000 | Rozman |
| 6,066,943 A | 5/2000 | Hastings et al. |
| 6,069,799 A | 5/2000 | Bowman et al. |

(56) References Cited

U.S. PATENT DOCUMENTS

| | | |
|---|---|---|
| 6,069,804 A | 5/2000 | Ingman et al. |
| 6,084,792 A | 7/2000 | Chen et al. |
| 6,087,817 A | 7/2000 | Varga |
| 6,088,329 A | 7/2000 | Lindberg et al. |
| 6,091,616 A | 7/2000 | Jacobs et al. |
| 6,137,697 A | 10/2000 | Tarodo et al. |
| 6,137,698 A | 10/2000 | Yukawa et al. |
| 6,141,224 A | 10/2000 | Xia et al. |
| 6,169,675 B1 | 1/2001 | Shimamori et al. |
| 6,191,964 B1 | 2/2001 | Boylan et al. |
| 6,208,535 B1 | 3/2001 | Parks |
| 6,211,657 B1 | 4/2001 | Goluszek |
| 6,222,742 B1 | 4/2001 | Schlecht |
| 6,246,592 B1 | 6/2001 | Balogh et al. |
| 6,252,781 B1 | 6/2001 | Rinne et al. |
| 6,262,890 B1 | 7/2001 | Dhawan et al. |
| 6,278,621 B1 | 8/2001 | Xia et al. |
| RE37,510 E | 1/2002 | Bowman et al. |
| 6,370,050 B1 | 4/2002 | Peng et al. |
| 6,385,059 B1 | 5/2002 | Telefus et al. |
| 6,417,653 B1 | 7/2002 | Massie et al. |
| 6,421,262 B1 | 7/2002 | Saxelby et al. |
| 6,430,071 B1 | 8/2002 | Haneda |
| RE37,889 E | 10/2002 | Rozman |
| 6,466,454 B1 | 10/2002 | Jitaru |
| RE37,898 E | 11/2002 | Seragnoli |
| 6,477,065 B2 | 11/2002 | Parks |
| 6,487,093 B1 | 11/2002 | Vogman |
| 6,504,267 B1 | 1/2003 | Giannopoulos |
| 6,535,407 B1 | 3/2003 | Zaitsu |
| 6,552,917 B1 | 4/2003 | Bourdillon |
| 6,580,258 B2 | 6/2003 | Wilcox et al. |
| 6,594,159 B2 | 7/2003 | Schlecht |
| 6,608,768 B2 | 8/2003 | Sula |
| 6,696,882 B1 | 2/2004 | Markowski et al. |
| 6,700,365 B2 | 3/2004 | Isham et al. |
| 6,721,192 B1 | 4/2004 | Yang et al. |
| 6,724,631 B2 | 4/2004 | Ye et al. |
| 6,728,118 B1 | 4/2004 | Chen et al. |
| 6,731,520 B2 | 5/2004 | Schlecht |
| 6,735,094 B2 | 5/2004 | Steigerwald et al. |
| 6,804,125 B2 | 10/2004 | Brkovic |
| 6,836,415 B1 | 12/2004 | Yang et al. |
| 6,845,019 B2 | 1/2005 | Kim et al. |
| 6,853,563 B1 | 2/2005 | Yang et al. |
| 6,853,568 B2 | 2/2005 | Li et al. |
| 6,862,194 B2 | 3/2005 | Yang et al. |
| 6,862,195 B2 | 3/2005 | Jitaru |
| 6,862,198 B2 | 3/2005 | Muegge et al. |
| 6,927,987 B2 | 8/2005 | Farrington et al. |
| 6,930,893 B2 | 8/2005 | Vinciarelli |
| 6,965,517 B2 | 11/2005 | Wanes et al. |
| 6,970,366 B2 | 11/2005 | Apeland et al. |
| 6,970,367 B2 | 11/2005 | Takeshima et al. |
| 6,984,965 B2 | 1/2006 | Vinciarelli |
| 6,987,679 B2 | 1/2006 | Gan et al. |
| 7,019,997 B2 | 3/2006 | Ooishi |
| 7,031,128 B2 | 4/2006 | Nam |
| 7,035,120 B2 | 4/2006 | Tobita |
| 7,050,309 B2 | 5/2006 | Farrington |
| 7,055,309 B2 | 6/2006 | Plote et al. |
| 7,061,775 B2 | 6/2006 | Beihoff et al. |
| 7,072,190 B2 | 7/2006 | Schlecht |
| 7,145,786 B2 | 12/2006 | Vinciarelli |
| 7,184,280 B2 | 2/2007 | Sun et al. |
| 7,187,562 B2 | 3/2007 | Stojcic et al. |
| 7,230,405 B2 | 6/2007 | Jang et al. |
| 7,236,368 B2 | 6/2007 | Maxwell et al. |
| 7,269,034 B2 | 9/2007 | Schlecht |
| 7,272,023 B2 | 9/2007 | Schlecht |
| 7,307,857 B2 | 12/2007 | Liu et al. |
| RE40,438 E | 7/2008 | Urakawa et al. |
| 7,403,397 B2 | 7/2008 | Matsumoto et al. |
| 7,428,159 B2 | 9/2008 | Leung et al. |
| 7,501,715 B2 | 3/2009 | Saeueng et al. |
| 7,558,083 B2 | 7/2009 | Schlecht |
| 7,564,702 B2 | 7/2009 | Schlecht |
| 7,727,021 B2 | 6/2010 | Haruna et al. |
| 7,746,041 B2 | 6/2010 | Xu et al. |
| 7,768,801 B2 | 8/2010 | Usui et al. |
| 7,855,905 B2 | 12/2010 | Leung et al. |
| 8,023,290 B2 | 9/2011 | Schlecht |
| 8,243,473 B2 | 8/2012 | Chen et al. |
| 8,493,751 B2 | 7/2013 | Schlecht |
| 8,582,333 B2 | 11/2013 | Oraw et al. |
| 8,749,990 B2 | 6/2014 | Cheng et al. |
| 9,087,656 B1 | 7/2015 | Vinciarelli |
| 9,166,481 B1 | 10/2015 | Vinciarelli et al. |
| 9,516,761 B2 | 12/2016 | Vinciarelli et al. |
| 10,199,950 B1 | 2/2019 | Vinciarelli et al. |
| 10,374,505 B2 | 8/2019 | Wood |
| 10,594,223 B1 | 3/2020 | Vinciarelli et al. |
| 11,075,583 B1 | 7/2021 | Vinciarelli et al. |
| 2003/0007372 A1 | 1/2003 | Porter et al. |
| 2003/0174522 A1 | 9/2003 | Xu et al. |
| 2004/0100778 A1 | 5/2004 | Vinciarelli |
| 2005/0047177 A1 | 3/2005 | Tobita |
| 2006/0209572 A1 | 9/2006 | Schlecht |
| 2006/0220938 A1 | 10/2006 | Leung et al. |
| 2006/0262575 A1 | 11/2006 | Schlecht et al. |
| 2006/0285368 A1 | 12/2006 | Schlecht |
| 2006/0290689 A1 | 12/2006 | Grant et al. |
| 2007/0076377 A1 | 4/2007 | Gravina |
| 2008/0175024 A1 | 7/2008 | Schlecht et al. |
| 2008/0211304 A1 | 9/2008 | Farrington et al. |
| 2009/0051221 A1 | 2/2009 | Liu et al. |
| 2009/0243079 A1 | 10/2009 | Lim et al. |
| 2010/0091526 A1 | 4/2010 | Schlecht |
| 2010/0232180 A1 | 9/2010 | Sase et al. |
| 2010/0259241 A1 | 10/2010 | Cuk |
| 2011/0057713 A1 | 3/2011 | Kawanami et al. |
| 2011/0176333 A1 | 7/2011 | Schlecht et al. |
| 2012/0155104 A1 | 6/2012 | Jonker |
| 2013/0121033 A1 | 5/2013 | Lehn et al. |
| 2013/0163287 A1 | 6/2013 | Pal et al. |
| 2014/0085939 A1 | 3/2014 | Schlecht |
| 2021/0155104 A1 | 5/2021 | Skutt et al. |

FOREIGN PATENT DOCUMENTS

| | | |
|---|---|---|
| DE | 29 02 862 A1 | 8/1979 |
| EP | 0 165 37 B1 | 11/1983 |
| EP | 0 418 83 A1 | 9/1984 |
| EP | 0 779 58 B1 | 1/1986 |
| EP | 0 584 00 B1 | 5/1986 |
| EP | 0 184 963 A2 | 6/1986 |
| EP | 0 223 504 B1 | 5/1987 |
| EP | 0 102 614 B1 | 7/1987 |
| EP | 0 139 870 B1 | 11/1987 |
| EP | 0 244 186 A2 | 11/1987 |
| EP | 0 289 196 A2 | 11/1988 |
| EP | 0 343 855 A2 | 11/1989 |
| EP | 0 410 866 A1 | 1/1991 |
| EP | 0 449 504 A2 | 10/1991 |
| EP | 0 467 778 A2 | 1/1992 |
| EP | 0 472 261 A2 | 2/1992 |
| EP | 0 481 466 A1 | 4/1992 |
| EP | 0 484 610 A1 | 5/1992 |
| EP | 0 291 403 B1 | 1/1993 |
| EP | 0 549 920 A1 | 7/1993 |
| EP | 0 550 167 A2 | 7/1993 |
| EP | 0 582 814 A2 | 2/1994 |
| EP | 0 588 569 A2 | 3/1994 |
| EP | 0 257 817 B1 | 4/1994 |
| EP | 0 336 725 B1 | 7/1994 |
| EP | 0 605 752 A2 | 7/1994 |
| EP | 0 608 091 A2 | 7/1994 |
| EP | 0 610 158 A1 | 8/1994 |
| EP | 0 616 281 A2 | 9/1994 |
| EP | 0 622 891 A2 | 11/1994 |
| EP | 0 549 920 B1 | 8/1995 |
| EP | 0 665 634 B1 | 8/1995 |
| EP | 0 687 058 A1 | 12/1995 |
| EP | 0 428 377 B1 | 1/1996 |

(56) References Cited

FOREIGN PATENT DOCUMENTS

| | | |
|---|---|---|
| EP | 0 694 826 A2 | 1/1996 |
| EP | 0 696 831 A2 | 2/1996 |
| EP | 0 529 180 B1 | 3/1996 |
| EP | 0 474 471 B1 | 5/1996 |
| EP | 0 709 949 A2 | 5/1996 |
| EP | 0 476 278 B1 | 6/1996 |
| EP | 0 720 278 A1 | 7/1996 |
| EP | 0 736 959 A1 | 10/1996 |
| EP | 0 741 447 A2 | 11/1996 |
| EP | 0 595 232 B1 | 1/1997 |
| EP | 0 599 814 B1 | 4/1997 |
| EP | 0 848 485 A2 | 6/1998 |
| EP | 0 508 664 B1 | 7/1998 |
| EP | 0 429 310 B1 | 9/1998 |
| EP | 0 757 428 B1 | 11/1998 |
| EP | 0 575 626 B1 | 12/1998 |
| EP | 0 884 829 A1 | 12/1998 |
| EP | 0 503 806 B1 | 5/1999 |
| EP | 0 944 162 A1 | 9/1999 |
| EP | 0 954 088 A1 | 11/1999 |
| EP | 0 973 246 A1 | 1/2000 |
| EP | 0 996 219 A2 | 4/2000 |
| EP | 0 618 666 B1 | 2/2001 |
| EP | 0 925 638 B1 | 10/2001 |
| EP | 0 798 846 B1 | 1/2002 |
| EP | 0 932 929 B1 | 8/2002 |
| EP | 0 851 566 B1 | 3/2003 |
| EP | 0 805 540 B1 | 6/2004 |
| EP | 0 854 564 B1 | 3/2008 |
| EP | 1 231 705 B1 | 8/2010 |
| FR | 2535133 A1 | 4/1984 |
| FR | 2608857 A1 | 5/1989 |
| GB | 2 217 931 A | 1/1900 |
| GB | 2 110 493 A | 6/1983 |
| GB | 2 117 144 A | 10/1983 |
| GB | 2 131 238 A | 6/1984 |
| GB | 2 160 722 A | 12/1985 |
| GB | 2 233 479 A | 1/1991 |
| GB | 2 244 155 A | 11/1991 |
| GB | 2 255 865 A | 11/1992 |
| GB | 2 291 287 A | 1/1996 |
| GB | 2 313 495 A | 11/1997 |
| JP | S6149583 A | 3/1986 |
| JP | 61-273171 A | 12/1986 |
| JP | 61-277372 A | 12/1986 |
| JP | 62-233067 A | 10/1987 |
| JP | 63-257458 A | 10/1988 |
| JP | 63-277471 A | 11/1988 |
| JP | S6450762 A | 2/1989 |
| JP | H01-278265 | 11/1989 |
| JP | H01-283061 | 11/1989 |
| JP | H02-155465 A | 6/1990 |
| JP | H02-202362 A | 8/1990 |
| JP | H02-246774 A | 10/1990 |
| JP | H318275 A | 1/1991 |
| JP | H389851 A | 4/1991 |
| JP | 04-105556 A | 4/1992 |
| JP | H05-064446 A | 3/1993 |
| JP | 05-199744 A | 8/1993 |
| JP | 05-207745 A | 8/1993 |
| JP | 06-098540 A | 4/1994 |
| JP | 06-187056 A | 7/1994 |
| JP | 06-315263 A | 11/1994 |
| JP | 06-339266 A | 12/1994 |
| JP | H06-343262 | 12/1994 |
| JP | 07-007928 A | 1/1995 |
| JP | 07-115766 A | 5/1995 |
| JP | 07-194104 A | 7/1995 |
| JP | 07-308062 A | 11/1995 |
| JP | 07-337005 A | 12/1995 |
| JP | 07-337006 A | 12/1995 |
| JP | 08-019251 A | 1/1996 |
| JP | 08-205533 A | 8/1996 |
| JP | 08-223906 A | 8/1996 |
| JP | 08-275518 A | 10/1996 |
| JP | 08-289538 A | 11/1996 |
| JP | 08-336282 A | 12/1996 |
| JP | 09-093917 A | 4/1997 |
| JP | 09-172775 A | 6/1997 |
| JP | 09-182416 A | 7/1997 |
| JP | H07-337005 | 12/1997 |
| JP | 10-066336 A | 3/1998 |
| JP | 10-136646 A | 5/1998 |
| JP | 10-146054 A | 5/1998 |
| JP | 10-210740 A | 8/1998 |
| JP | 10-248248 A | 9/1998 |
| JP | 11-004577 A | 1/1999 |
| JP | 11-069803 A | 3/1999 |
| JP | 11-103572 A | 4/1999 |
| JP | 11-146650 A | 5/1999 |
| JP | H11-134989 | 5/1999 |
| JP | 11-178335 A | 7/1999 |
| JP | 2004-254393 A | 9/2004 |
| JP | 2012-034522 A | 2/2012 |
| PL | 177578 B3 | 5/1997 |
| WO | WO-84/04634 A1 | 11/1984 |
| WO | WO-86/02787 A1 | 5/1986 |
| WO | WO-87/05165 A1 | 8/1987 |
| WO | WO-88/09084 A1 | 11/1988 |
| WO | WO-89/01719 A1 | 2/1989 |
| WO | WO-91/07803 A1 | 5/1991 |
| WO | WO-95/23451 A1 | 8/1995 |
| WO | WO-95/30182 A1 | 11/1995 |
| WO | WO-95/32458 A2 | 11/1995 |
| WO | WO-98/11658 A1 | 3/1998 |
| WO | WO-98/18198 A1 | 4/1998 |
| WO | WO-98/26496 A1 | 6/1998 |
| WO | WO-98/33267 A3 | 9/1998 |
| WO | WO-01/97371 A1 | 12/2001 |
| WO | WO-2004/082119 A2 | 9/2004 |
| WO | WO-2005/008872 A1 | 1/2005 |
| ZA | 9711503 B | 6/1998 |

OTHER PUBLICATIONS

"Electronics Life" magazine excerpts, Nov. 1995, pp. 81-90 (English not available).

"Thomas Financial, Venture Economics' Venture Capital Financings, Portfolio Company Report," 2 pages (2007).

Abe, et al., "Stability Improvement of Distributed Power System by Using Full-Regulated Bus Converter," 31st Annual Conference of IEEE Industrial Electronics Society, pp. 2549-2553 (2005).

Abe, et al., "System Stability of Full-Regulated Bus Converter in Distributed Power System," INTELEC 05—Twenty-Seventh International Telecommunications Conference, pp. 563-568 (2005).

Abramczyk, et al., "MOSPOWER Applications Handbook," Siliconix Incorporated, 248 pages (1984).

Abramovitz & Ben-Yaakov, "A Novel Self-Oscillating Synchronously-Rectified DC-DC Converter," PESC '91 Record: 22nd Annual IEEE Power Electronics Specialists Conference, pp. 163-170 (1991).

Acker, et al., "Current-Controlled Synchronous Rectification," Proceedings of 1994 IEEE Applied Power Electronics Conference and Exposition, pp. 185-191 (1994).

Acker, et al., "Synchronous rectification with adaptive timing control," Proceedings of PESC '95—Power Electronics Specialist Conference, pp. 88-95 (1995).

Aguilar, et al., "An Improved Battery Charger/Discharger Topology with Power Factor Correction," IV IEEE International Power Electronics Congress. Technical Proceedings, pp. 2-7, (1995).

Ahn, et al., "Clamp Mode Forward ZVS-MRC with Self-Driven Synchronous Rectifier," Proceedings of Intelec'96—International Telecommunications Energy Conference, pp. 470-475 (1996).

Alou, et al., "A High Efficiency Voltage Regulator Module with Single Winding Self-Driven Synchronous Rectification," IEEE 31st Annual Power Electronics Specialists Conference Proceedings, pp. 1510-1515 (2000).

Alou, et al., "Design of a low output voltage DC/DC converter for Telecom application with a new scheme for Self-Driven Synchronous Rectification," Fourteenth Annual Applied Power Electronics Conference and Exposition. 1999 Conference Proceedings, pp. 866-872 (1999).

(56) References Cited

OTHER PUBLICATIONS

Alou, et al., "Design of a 1,5V Output Voltage On-Board DC/DC Converter with Magnetic Components Integrated in a Multilater PCB," Proceedings of APEC 97—Applied Power Electronics Conference, pp. 764-769 (1997).
Alvarez, "Control of Multi-Switch Multi-Output Power Converters," Massachusetts Institute of Technology, Master of Science Thesis, 32 pages (1988).
Alvarez-Barcia, et al., "Low Power Multioutput Converter with Post-Regulation based on Synchronous Rectification and Windings Integrated in the PCB," Thirteenth Annual Applied Power Electronics Conference and Exposition, pp. 191-197 (1998).
Andreycak, "Power Management Solution Delivers Efficient Multiple Outputs," Power Electronics Technology, retrieved from http://www.printthis.clickability.com/pt/cpt?action=cpt&title=Power+Management+Solution, 5 pages (2001).
Arduini, "A Distributed Power System with a Low-Cost Universal DC/DC Converter," Power Conversion Electronics Sep. 1995 Proceedings, pp. 315-322 (1995).
Artesyn, "Chapter 1: Principles of Power Conversion," Amtex Electronics Pty. Ltd., 17 pages (n.d.).
Artesyn, "Quarter-Brick IBC Series Application Note 190," 9 pages (2007).
Ashdown & Poulin, "Distributed power—a solution for the 90s," Proceedings of Intelec 93: 15th International Telecommunications Energy Conference, pp. 47-51 (1993).
ASTEC, "ASTEC AMPSS Modular Power Supply System," PowerPoint presentation, 99 pages (n.d.).
Balogh, "Design Review: 140W, Multiple Output High Density DC/DC Converter," Texas Instruments Power Supply Design Seminar—Seminar 1200, Topic 6, 24 pages (1997).
Balogh, "Design Review: 100W, 400kHz, DC/DC Converter With Current Doubler Synchronous Rectification Achieves 92% Efficiency," Texas Instruments Seminar 1100 Topic 2, pp. 2-1-2-26 (2001).
Balogh, "The Performance Of The Current Doubler Rectifier with Synchronous Rectification," Technical Papers of the Tenth International High Frequency Power Conversion Conference, pp. 216-225 (1995).
Balogh, et al., "Unique Cascaded Power Converter Topology for High Current Low Output Voltage Applications," Texas Instruments Seminar 1300 Topic 1, 24 pages (1999).
Barlage, "Synchronous Rectification and Regulation in Multiple Cross Regulated Outputs," Technical Papers of the Ninth International High Frequency Power Conversion 1994 Conference, pp. 185-193 (1994).
Barry, "Design issues in regulated and unregulated intermediate bus converters," Nineteenth Annual IEEE Applied Power Electronics Conference and Exposition, pp. 1389-1394 (2004).
Beatty & Batarseh, "Topical overview of soft-switching PWM high frequency converters," Proceedings of Southcon '95, pp. 47-52 (1995).
Bel Power Products, "Bus Converter 48V Input / 9.4V Output / 36A Datasheet," 7 pages (2004).
Bel Power Products, "Isolated DC/DC Converters: 48 VDC Input; 12VDC/27 A Output, 1/4 Brick—ORCM-27S12L," 3 pages (2008).
Belopolsky & Dassatti, "Hybrid Technologies for High Frequency Switching Power Supplies," Proceedings of the 41st Electronic Components & Technology Conference, pp. 103-108 (1991).
Berkowitz, et al., "A Distributed Power Architecture for the System 75 Digital Communications System," INTELEC '84—International Telecommunications Energy Conference, pp. 130-134 (1984).
Billings, "Handbook of Switchmode Power Supplies," McGraw-Hill Publishing Company, 340 pages (1989).
Bindra, "Two-Stage Conversion Redefines Distributed Power Architecture," Power Electronics Technology, 3 pages (2003).
Blake, et al., "Synchronous Rectifiers Versus Schottky Diodes: A Comparison of the Losses of a Sychronous Rectifier Versus the Losses of a Schottky Diode Rectifier," Proceedings of 1994 IEEE Applied Power Electronics Conference and Exposition, pp. 17-23 (1994).
Blanc & Thibodeau, "Use of Enhancement- And Depletion-Mode Mosfets in Sychronous Rectification," Proceedings of The Power Electronics Show & Conference, pp. 1-8 (1986).
Blanc, "Practical Application of MOSFET Synchronous Rectifiers," Proceedings of the Thirteenth International Telecommunications Energy Conference—INTELEC 91, pp. 494-501 (1991).
Blanchard & Stevens, "MOSFETs Move in on Low Voltage Rectification," Official Proceedings of the Ninth International PCI, pp. 213-222 (1984).
Blanchard & Thibodeau, "The design of a high efficiency, low voltage power supply using MOSFET synchronous rectification and current mode control," 1985 IEEE Power Electronics Specialists Conference, pp. 355-361 (1985).
Boschert, "3T Family User Information Sheet," Boschert Incorporated, 1 page (1982).
Boschert, "Boschert: An International Leader in Switching Power Supplies," 24 pages (n.d.).
Boschert, "Marketing Brochure," 15 pages (n.d.).
Boschert, "Switching Power Supplies Test Result—Model 3T12AP, PN 10484," 1 page (n.d.).
Bowles & Paul, "Modelling Interference Properties of SMPS DC Power Distribution Busses," National Symposium on Electromagnetic Compatibility, pp. 119-126 (1989).
Bowman, et al., "A High Density Board Mounted Power Module for Distributed Powering Architectures," Fifth Annual Proceedings on Applied Power Electronics Conference and Exposition, pp. 43-54 (1990).
Brakus, "DC/DC Modules for Low Voltage Applications: The New Generation of Board Mounted Modules in Thick-Copper Multilayer Technology," INTELEC—Twentieth International Telecommunications Energy Conference, pp. 392-397 (1998).
Briskman, et al., "COMSAT Technical Review, vol. 7, No. 1, Spring 1977," Communications Satellite Corporation, 176 pages (1977).
Brown, "Addressing the topologies, converters, and switching devices for intermediate bus architectures," 2005 European Conference on Power Electronics and Applications, 9 pages (2005).
Brush, "Distributed power architecture demand characteristics," Nineteenth Annual IEEE Applied Power Electronics Conference and Exposition, pp. 342-345 (2004).
Burns, et al., "An Intelligent, Fault Tolerant, High Power, Distributed Power System for Massively Parallel Processing Computers," Proceedings of the Ninth Annual Applied Power Electronics Conference and Exposition—ASPEC'94, pp. 795-800 (1994).
Burr-Brown, "Isolated, Unregulated DC/DC Converters," Burr Brown Corporation, PWS727 & PWS728, 8 pages (1989).
Cao & Peng, "A family of zero current switching switched-capacitor dc-dc converters," Twenty-Fifth Annual IEEE Applied Power Electronics Conference and Exposition, pp. 1365-1372 (2010).
Cao & Peng, "Zero-Current-Switching Multilevel Modular Switched-Capacitor DC-DC Converter," IEEE Transactions on Industry Applications 46(6), pp. 2536-2544 (2010).
Carbone, "Distributed Power Tags Keep Falling," Electronics Purchasing, 1 page,(1996).
Carpenter, et al., "A Distributed Power System for Military VLSI Applications," Technical Papers of the Third International High Frequency Power Conversion 1988 Conference, pp. 430-441 (1988).
Carr & Franco, "X2000 Power System Architecture," Proceedings of the Thirty-Second Intersociety Energy Conversion Engineering Conference, pp. 381-386 (1997).
Carsten, "Distributed Power Systems of the Future Utilizing High Frequency Converters," Technical Papers of the Second International High Frequency Power Conversion Conference, pp. 1-14 (1987).
Carsten, "VLSI & VHSIC Power System Design Considerations," Proceedings off the Twelfth International PCI Conference, pp. 1-15 (1986).
Casey & Schlecht, "A high-frequency, low volume point-of-load power supply for distributed power systems," Proceedings of the 18th Annual IEEE Power Electronics Specialists Conference, pp. 439-450 (1987).

(56) References Cited

OTHER PUBLICATIONS

Casey, "Circuit Design for 1-10 MHZ DC-DC Conversion," MIT Doctoral Thesis, 109 pages (1989).
Celestica, "Proposal for Celestica FixedRatio Product Family," 18 pages (2002).
Cervera, et al., "A High-Efficiency Resonant Switched Capacitor Converter With Continuous Conversion Ratio," IEEE Transactions on Power Electronics 30(3), pp. 1373-1382 (2015).
Chen & Shih, "New Multi-Output Switching Converters with MOSFET-Rectifier Post Regulators," IEEE Transactions on Industrial Electronics 45(4), pp. 609-616 (1998).
Chen, "Resonant Switched Capacitor DC-DC Converter with Stackable Conversion Ratios," Electrical Engineering and Computer Sciences, Univ. of California at Berkeley, Technical Report No. UCB/EECS-2016-187, 21 pages (2016).
Chen, et al., "A resonant MOSFET gate driver with efficient energy recovery," IEEE Transactions on Power Electronics 19(2), pp. 470-477 (2004).
Chen, et al., "Design of a High-Efficiency, Low-Profile Forward Converter with 3.3-v Output," 1995 VPEC Seminar Proceedings, pp. 105-112 (1995).
Chen, et al., "Design of High Efficiency, Low Profile, Low Voltage Converter with Integrated Magnetics," Proceedings of APEC 97—Applied Power Electronics Conference, pp. 911-917 (1997).
Cheng, "Comparative Study of AC/DC Converters for More Electric Aircraft," Power Electronics and Variable Speed Drives, Conference Publication No. 456, pp. 299-304 (1998).
Cho & Choi, "Analysis and Design of Multi-Stage Distributed Power Systems," Proceedings] Thirteenth International Telecommunications Energy Conference—INTELEC 91, pp. 55-61 (1991).
Choi & Cho, "Intermediate Line Filter Design to Meet Both Impedance Compatibility and EMI Specifications," IEEE Transactions on Power Electronics 10(5), pp. 583-588 (1995).
Choi, "Dynamics and Control of Switchmode Power Conversions in Distributed Power Systems," Virginia Polytechnic Institute and State University Thesis, 200 pages (1992).
Choi, et al., "The stacked power system: a new power conditioning architecture for mainframe computer systems," IEEE Transactions on Power Electronics 9(6), pp. 616-623 (1994).
Cobos & Uceda, "Low output voltage DC/DC conversion," Proceedings of IECON'94—20th Annual Conference of IEEE Industrial Electronics, pp. 1676-1681 (1994).
Cobos, et al., "Active Clamp PWM Forward Converter with Self Driven Synchronous Rectification," Proceedings of Intelec 93: 15th International Telecommunications Energy Conference, pp. 200-206 (1993).
Cobos, et al., "Comparison of High Efficiency Low Output Voltage Forward Topologies," Proceedings of 1994 Power Electronics Specialist Conference—PESC'94, pp. 887-894 (1994).
Cobos, et al., "Low voltage power electronics," Journal of Circuits, Systems, and Computers 5(4), pp. 575-588 (1995).
Cobos, et al., "New Driving Scheme for Self Driven Synchronous Rectifiers," Fourteenth Annual Applied Power Electronics Conference and Expedition, pp. 840-846 (1999).
Cobos, et al., "Optimized Synchronous Rectification Stage for Low Output Voltage (3.3V) DC/DC Conversion," 25th Annual IEEE Power Electronics Specialists Conference, pp. 902-908 (1994).
Cobos, et al., "RCD Clamp PWM Forward Converter With Self Driven Synchronous Rectification," Proceedings of IECON '93—19th Annual Conference of IEEE Industrial Electronics, pp. 1336-1341 (1993).
Cobos, et al., "Resonant reset forward topologies for low output voltage on board converters," Applied Power Electronics Conference and Exposition, 1994. APEC '94. Conference Proceedings pp. 703-708 (1994).
Cobos, et al., "Self Driven Synchronous Rectification in Resonant Topologies: Forward ZVS-MRC, Forward ZCS-QRC and LCC-PRC," Proceedings of the 1992 International Conference on Industrial Electronics, Control, Instrumentation, and Automation, pp. 185-190 (1992).
Cobos, et al., "Several Alternatives for Low Output Voltage on Board Converters," APEC '98 Thirteenth Annual Applied Power Electronics Conference and Exposition, pp. 163-169 (1998).
Cobos, et al., "Study of the applicability of self-driven synchronous rectification to resonant topologies," PESC '92 Record. 23rd Annual IEEE Power Electronics Specialists Conference, pp. 933-940 (1992).
Croll & Grellet, "Multiple Output DC/DC Zero-Current Switch Quasi-Resonant Converter," Proceedings of Intelec 93: 15th International Telecommunications Energy Conference, pp. 215-220 (1993).
Cutatolo, "Choosing a Power Architecture," IC Master, 4 pages (2004).
De Hoz & De La Cruz, "Analysis and Design of a Zero Current Switched Quasi-Resonant Converter with Synchronous Rectification for Low Output Voltage Applications," PESC '92 Record. 23rd Annual IEEE Power Electronics Specialists Conference, pp. 221-228 (1992).
De La Cruz, et al., "Analysis of Suitable PWM Topologies to Meet Very High Efficiency Requirements for on Board DC/DC Converters in Future Telecom Systems," Proceedings of Intelec 93: 15th International Telecommunications Energy Conference, pp. 207-214 (1993).
De La Cruz, et al., "Performances Comparison of Four Practical Implementations Based on PWM, Quasi and Multiresonant Topologies for on Board DC/DC Converters in Distributed Power Architectures," PESC '92 Record. 23rd Annual IEEE Power Electronics Specialists Conference, pp. 917-925 (1992).
De La Cruz, et al., "Review of Suitable Topologies for on Board DC/DC Converters in Distributed Power Architectures for Telecom Applications," Proceedings of the Fourteenth International Telecommunications Energy Conference, pp. 59-65 (1992).
Delta Electronics, Inc., "Delphi Series E48SB, 240W Eighth Brick Bus Converter DC/DC Power Modules: 48Vin, 12V/20A Out Datasheet," 10 pages (2005).
Diaz, et al., "A New Family of Loss-Less Power MOSFET Drivers," 3rd International Power Electronic Congress. Technical Proceedings. CIEP '94, pp. 43-48 (1994).
Diaz, et al., "A new lossless power MOSFET driver based on simple DC/DC converters," Proceedings of PESC '95—Power Electronics Specialist Conference, pp. 37-43 (1995).
Diazzi & Gattavari, "80W-400W Monolithic Buck Regulators Integrated in Multipower BCD Technology," High Frequency Power Conversion Conference Proceedings, pp. 212-226 (1988).
Dixon, "High Power Factor Preregulators for Off-Line Power Supplies," Unitrode Corporation, 17 pages (2003).
Dwane, et al., "A Resonant High Side Gate Driver for Low Voltage Applications," 2005 IEEE 36th Power Electronics Specialists Conference, pp. 1979-1985 (2005).
Ericsson, "Selection of Architecture for Systems using Bus Converters and POL Converters," Design Note 023, 7 pages (2005).
Ericsson, "The Power Book—3rd Revised Edition (reduced version)," 127 pages (1996).
Farrington, et al., "Comparison of single-ended-parallel MRC and forward MRC," Proceedings of the APEC '92 Seventh Annual Applied Power Electronics Conference and Exposition, pp. 203-210 (1992).
Feng, et al., "A hybrid strategy with Simplified Optimal Trajectory Control for LLC resonant converters," Twenty-Seventh Annual IEEE Applied Power Electronics Conference and Exposition, pp. 1096-1103 (2012).
Ferencz, "A 250 W High Density Point-of-Load Converter," S.B. E.E. Massachusetts Institute of Technology Thesis, 60 pages (1987).
Ferenczi, "Power Supplies, Part B: Switched-Mode Power Supplies," Studies in Electrical and Electronic Engineering, pp. 352-558 (1987).
Ferreira, et al., "A Self Oscillating Bidirectional DC to DC Converter Employing Minimum Circuitry," Third International Conference on Power Electronics and Variable-Speed Drives, pp. 125-129 (1988).
Firek & Kent, "Reduce Load Capacitance in Noise-Sensitive High-Transient Applications, through Implementation of Active Filtering," VICOR PowerBench, 9 pages (2007).

(56) References Cited

OTHER PUBLICATIONS

Fisher, et al. "Performance of low loss synchronous rectifiers in a series-parallel resonant dc-dc converter," Proceedings of the Fourth Annual IEEE Applied Power Electronics Conference and Exposition, pp. 240-246 (1989).
Fisher, et al., "A 1 MHz, 100 W commercial, high-density point-of-load power supply using direct-bond copper and surface mount technologies," Fifth Annual Proceedings on Applied Power Electronics Conference and Exposition, pp. 55-63 (1990).
Franz, "Multilevel Simulation Tools for Power Converters," Fifth Annual Proceedings on Applied Power Electronics Conference and Exposition, pp. 629-633 (1990).
Fukumochi, et al., "Synchronous Rectifiers using New Structure MOSFET," Proceedings of International Symposium on Power Semiconductor Devices and IC's: ISPSD '95, pp. 252-255 (1995).
Gachora, "Design of a Four-Phase Switchmode High Efficiency Power Supply," Massachusetts Institute of Technology Thesis, 68 pages (1994).
Garcia, et al., "PCB Based Transformers for Multiple Output DC/DC Converters," IV IEEE International Power Electronics Congress. Technical Proceedings. CIEP 95, pp. 51-55 (1995).
Garcia, et al., "Zero voltage switching in the PWM half bridge topology with complementary control and synchronous rectification," Proceedings of PESC '95—Power Electronics Specialist Conference, pp. 286-291 (1995).
Gaudreau, et al., "Solid-State High Voltage, DC Power Distribution & Control," Proceedings of the 1999 Particle Accelerator Conference, pp. 568-570 (1999).
Gegner, "High Power Factor AC-to-DC Converter Using a Reactive Shunt Regulator," Proceedings of 1994 Power Electronics Specialist Conference—PESC'94, pp. 349-355 (1994).
Ghislanzoni, "Parallel Power Regulation of a Constant Frequency, ZV-ZC Switching Resonant Push-Pull," Proceedings of the European Space Power Conference, pp. 191-198 (1991).
Gillett & Moorman, "Transistor Rectifier-Regulator," IBM Technical Disclosure Bulletin 22(6), pp. 2319-2320 (1979).
Goodenough, "Building-block converters distribute power throughout large systems," Electronic Design, Jan. 24, 1995, pp. 202-203 (1995).
Goodenough, "Power-Supply Rails Plummet and Proliferate," Electronic Design Jul. 24, 1995, 4 pages (1995).
Gottlieb, "Power Control with Solid State Devices," Reston Publishing Company, Inc., 191 pages (1985).
Gottlieb, "Power Supplies, Switching Regulators, Inverters and Converters, Second Edition," TAB Books, 242 pages (1985).
Graf, "Converter and Filter Circuits," Butterworth-Heinemann, 98 pages (1997).
Grant & Gowar, "Power MOSFETS: Theory and Applications," John Wiley & Sons, pp. 183-253 (1989).
Greenland & Davies, "A Two Chip Set Achieves Isolation Without Compromising Power Supply Performance," Proceedings of The Power Electronics Show & Conference, pp. 390-395 (1986).
Greenland, "start:DPA developments: A reason for change in power conversion," Power Management DesignLine, retrieved from http://www.powermanagmentdesignline.com/52200069, 4 pages (2004).
Greenland, "Trends in distributed-power architecture," Hearst Electronics Group: Application Reference Materials, 5 pages (2004).
Grossman, "Power Module Lets Users Customize Supplies," Electronic Design for Engineers and Engineering Managers—Worldwide, Jun. 25, 1981, p. 213 (1981).
Gutmann, "Application of RF Circuit Design Principles to Distributed Power Converters," IEEE Transactions on Industrial Electronics and Control Instrumentation 27(3), pp. 156-164 (1980).
Hadjivassilev, et al., "Front-End Converter System for Distributed Power Supply," Fifth European Conference on Power Electronics and Applications, pp. 221-226 (1993).
Hamo, "A 360W, Power Factor Corrected, Off-Line Power Supply, Using the HIP5500," Intersil Intelligent Power No. AS9417, 6 pages (1994).

Harada, et al., "A novel ZVS-PWM half-bridge converter," Proceedings of Intelec 94, pp. 588-593 (1994).
Harada, et al., "Analysis and design of ZVS-PWM half-bridge converter with secondary switches," Proceedings of PESC '95—Power Electronics Specialist Conference, pp. 280-285 (1995).
Harper, et al., "Controlled Synchoronous Rectifier," High Frequency Power Conversion Conference Proceedings, pp. 165-172 (1988).
Hartman, "System Designer's Introduction to Modular DC/DC Converters," Proceedings of the Power Electronics Show & Conference, pp. 185-190 (1988).
Hartman, "System designer's guide to modular dc/dc converters," Electronic Products 30(19), 7 pages (1998).
Heath, "The market for Distributed Power Systems," Proceedings of APEC '91: Sixth Annual Applied Power Electronics Conference and Exhibition, pp. 225-229 (1991).
Hendrix, "The Evolution of Power Management and Conversion," Power Systems Design Europe Mar. 2005, p. 10 (2005).
Higashi, et al., "On the cross-regulation of multi-output resonant converters," PESC '88 Record., 19th Annual IEEE Power Electronics Specialists Conference, pp. 18-25 (1988).
Hsieh, et al., "A Study on Full-Bridge Zero-Voltage Switched PWM Converter: Design and Experimentation," Proceedings of IECON '93—19th Annual Conference of IEEE Industrial Electronics, pp. 1281-1285 (1993).
Hua, et al., "Development of a DC Distributed Power System," Proceedings of 1994 IEEE Applied Power Electronics Conference and Exposition—ASPEC'94, pp. 763-769 (1994).
Huang, "Coordination Design Issues in the Intermediate Bus Architecture," DCDC Technical White Paper from Astec Power, 8 pages (2004).
Huillet, et al., "High Frequency Quasi-Resonant Buck Converter on Insulated Metal Substrate for Avionics Distributed Power Systems," Proceedings of APEC '92: Seventh Annual Applied Power Electronics Conference and Exposition, pp. 647-653 (1992).
Huliehel, et al., "A New Design Approach for Distributed Power Systems," VPEC, pp. 214-218 (1993).
Hunter, "Regulatory and Technological Trends in Power Supplies," 1993 International Symposium on Electromagnetic Compatibility, pp. 10-15 (1993).
IBM "Cross-Coupled Gates Synchronous Rectifier," IBM Technical Disclosure Bulletin 35(4A), pp. 462-463 (1992).
IEEE, "Bus," IEEE Standard Dictionary of Electrical and Electronics Terms, Third Edition, ANSI/IEEE Std 100-1984, 2 pages (1984).
International Rectifier, "International Rectifier Introduces DC Bus Converter Chip Set Re-Defining Distributed Power Architecture for Networking and Communication Systems," 3 pages (2003).
International Search Report for PCT/US1998/001498 dated Jul. 14, 1998, 4 pages.
Intersil, "Intersil's New PWM Controller Advances Power Conversion Performance for Telecom," Business Wire, 3 pages (2004).
Ivensky, et al., "A Resonant DC-DC Transformer," Proceedings of APEC '92: Seventh Annual Applied Power Electronics Conference and Exposition, pp. 731-737 (1992).
Jacobs & Kunzinger, "Distributed Power Architecture Concepts," INTELEC '84—International Telecommunications Energy Conference, pp. 105-109 (1984).
Jamerson & Barker, "1500 Watt Magnetics Design Comparison: Parallel Forward Converter vs. Dual Forward Converter," Technical Papers of the Fifth International High Frequency Power Conversion Conference, pp. 347-358 (1990).
Jamerson, "Post-Regulation Techniques for 100 KHz to 300 KHz Multiple-Output PWM Supplies (Limitations, Trends, and Predictions)," Technical Papers of the Fourth International High Frequency Power Conversion Conference, pp. 260-273 (1989).
Jensen, "An Improved Square-Wave Oscillator Circuit," IRE Transactions on Circuit Theory 4(3), pp. 276-279 (1957).
Ji & Kim, "Active Clamp Forward Converter with MOSFET Synchronous Rectification," Proceedings of 1994 Power Electronics Specialist Conference—PESC'94, pp. 895-901 (1994).
Jitaru & Cocina, "High efficiency DC-DC converter," Proceedings of 1994 IEEE Applied Power Electronics Conference and Exposition—ASPEC'94, pp. 638-644, (1994).

(56) References Cited

OTHER PUBLICATIONS

Jitaru, "The Impact of Low Output Voltage Requirements on Power Converters," Technical Papers of the Tenth International High Frequency Power Conversion Conference, pp. 1-10 (1995).
Jitaru, "Zero Voltage PWM, Double Ended Converter," Technical Papers of the Seventh International High Frequency Power Conversion Conference, pp. 394-405 (1992).
Jovanovic, "Evaluation of Synchronous-Rectification Efficiency Improvement Limits in Forward Converters," IEEE Transactions on Industrial Electronics 42(4), pp. 387-395 (1995).
Jovanovic, et al., "Design Considerations for Forward Converter with Synchronous Rectifiers," Virginia Power Electronics Center 1993 Power Electronics Seminar, pp. 163-173 (1993).
Jovanovic, et al., "Distributed Power Systems—Benefits and Challenges," International Journal of Electronics 77(5), pp. 601-612 (1994).
Kagan, et al., "Improving Power Supply Efficiency with MOSFET Synchronous Rectifiers," Proceedings of Powercon 9: Ninth International Solid-State Power Electronics Conference, D-4, 6 pages (1982).
Kang & Upadhyay, "A Parallel Resonant Converter with Postregulators," IEEE Transactions on Power Electronics 7(2), pp. 296-303 (1992).
Kassakian & Schlecht, "High-Frequency High-Density Converters for Distributed Power Supply Systems," Proceedings of the IEEE 76(4), pp. 362-376 (1988).
Kassakian, et al., "Principles of Power Electronics," Addison-Wesley Series in Electrical Engineering, pp. 576-581 (1991).
Kesarwani, et al., "Resonant-Switched Capacitor Converters for Chip-Scale Power Delivery: Design and Implementation," IEEE Transactions on Power Electronics 30(12), pp. 6966-6977 (2015).
Kesarwani, et al., "Resonant switched-capacitor converters for chip-scale power delivery: Modeling and design," 2013 IEEE 14th Workshop on Control and Modeling for Power Electronics (COMPEL), 7 pages (2013).
Kester & Erisman, "Section 3: Switching Regulators," retrieved from https://www.analog.com/media/en/training-seminars/design-handbooks/Practical-Design-Techniques-Power-Thermal/Section3.pdf, 71 pages (2015).
Klapfish, "Trends in AC/DC Switching Power Supplies and DC/DC Converters," Proceedings of the Eighth Annual Applied Power Electronics Conference and Exposition, pp. 361-365 (1993).
Kociecki, et al., "A High Power-Density DC-DC Converter Board," Second Annual IEEE Applied Power Electronics Conference and Exposition, pp. 169-180 (1987).
Kollman & Chamberlin, "Processor Power Subsystem Architectures," APEC 2000. Fifteenth Annual IEEE Applied Power Electronics Conference and Exposition, pp. 1183-1189 (2000).
Korman, et al., "A Synchronous Rectifier for High-Density Power Supplies," High Frequency Power Conversion Conference Proceedings, pp. 126-139 (1988).
Krauthamer, et al., "High Efficiency Synchronous Rectification in Spacecraft Power Systems," Proceedings of the European Space Power Conference : Graz, Austria, pp. 1-5 (1993).
Krauthamer, et al., "State-of-the-Art of DC Components for Secondary Power Distribution on Space Station Freedom," Fifth Annual IEEE Applied Power Electronics Conference and Exposition (1990).
Krein & Bass, "Autonomous Control Technique for High-Performance Switches," IEEE Transactions on Industrial Electronics 39(3), pp. 215-222 (1992).
Lam, et al., "Revolutionary Advances in Distributed Power Systems," Eighteenth Annual IEEE Applied Power Electronics Conference and Exposition, pp. 30-36 (2003).
Langford-Smith, "Radiotron Designer's Handbook," Wireless Press, pp. 1202-1222, 1496-1497 (1953).
Le, et al., "Design Techniques for Fully Integrated Switched-Capacitor DC-DC Converters," IEEE Journal of Solid-State Circuits 46(9), pp. 2120-2131 (2011).
Lee & Boroyevich, "Center Overview and Highlights," Center for Power Electronics Systems, 71 pages (2007).
Lee & Zhou, "Power Management Issues for Future Generation Microprocessors," 11th International Symposium on Power Semiconductor Devices and ICs. ISPSD'99 Proceedings, pp. 27-33 (1999).
Lei, et al., "A General Method for Analyzing Resonant and Soft-Charging Operation of Switched-Capacitor Converters," IEEE Transactions on Power Electronics 30(10), pp. 5650-5664 (2015).
Lei, et al., "Split-Phase Control: Achieving Complete Soft-Charging Operation of a Dickson Switched-Capacitor Converter," IEEE Transactions on Power Electronics 31(1), pp. 770-782 (2016).
Lemnios, et al., "Low-Power Electronics," IEEE Design & Test of Computers (11)(4), pp. 8-13 (1994).
Leu, et al, "A High-Frequency AC Bus Distributed Power System," Virginia Power Electronics Center, 1990 Power Electronics Seminar, pp. 98-107 (1990).
Leu, et al., "Analysis and Design of R-C-D Clamp Forward Converter," High Frequency Power Conversion Conference Proceedings, pp. 198-208 (1992).
Leung, "SPICE Simulation and Modeling of DC-DC Flyback Converter," Massachusetts Institute of Technology Thesis, 65 pages (1995).
Lewis, et al., "Distributed Power System Analysis," Final Report Prepared for IBM Corporation, Contract No. YA-261092, 138 pages (1989).
Lewis, et al., "Modeling, analysis and design of distributed power systems," 20th Annual IEEE Power Electronics Specialists Conference, pp. 152-159 (1989).
Li, et al., "Lossless voltage regulation and control of the resonant switched-capacitor DC-DC converter," 2015 IEEE 16th Workshop on Control and Modeling for Power Electronics (COMPEL), 7 pages (2015).
Liang, et al, "Design Considerations of Power MOSFET for High Frequency Synchronous Rectification," IEEE Transactions on Power Electronics 101(3), pp. 388-395 (1995).
Lindman, "Powering Tomorrow's Data Internetworking Systems," Ericsson Microelectronics, INTELEC. Twenty-Second International Telecommunications Energy Conference, pp. 506-511 (2000).
Lindman, et al., "Applying Distributed Power Modules in Telecom Systems," IEEE Transactions on Power Electronics 11(2), pp. 365-373 (1996).
Lineage Power, "CBQ25 Series," retrieved from http://www.lineagepower.com/oem/cbq25.html, 1 page (2010).
Lineage Power, "QSW025A0B Series Power Modules; DC-DC Converters; 36-75 Vdc Input; 12Vdc Output; 25A Output Current," 16 pages (2009).
Lineage Power, "QUK240 Series Power Modules; DC-DC Converters; 36-75vDC Input; 12Vdc Output; 25A Output Current," 16 pages (2009).
Linera, et al., "Closing the Feedback Loop in the Half-Bridge Complementary-Control DC-to-DC Converter," Proceedings of APEC 97—Applied Power Electronics Conference, pp. 977-982 (1997).
Lingle, "Low Input Voltage D.C. to D.C. Converter, Final Report," National Aeronautics and Space Administration, Contract No. NAS 5-3441, 118 pages (1984).
Lo & Henze, "Development of a DC-to-DC Power Converter for Distributed Power Processing," Proceedings of the Fourth Annual IEEE Applied Power Electronics Conference and Exposition, pp. 413-422 (1989).
Lo, "Cost Analysis of Powering an Optical Customer Access Network," Intelec Fourteenth International Telecommunications Energy Conference, pp. 96-103 (1992).
Lo, et al., "A Compact DC-to-DC Power Converter for Distributed Power Processing," IEEE Transactions on Power Electronics 7(4), pp. 714-724 (1992).
Lucent Technologies, "Data Sheet-NH020-Series Power SIPs: 5 Vdc input; 1.5Vdc Output; 20W," Bell Labs Innovations Data Sheet, 20 pages (1999).
Lucent Technologies, "HW100F and HW100A Power Modules: dc-dc Converters; 36 Vdc to 75 Vdc, 3.3 Vdc or 5 Vdc Output; 100W," Bell Labs Innovations Data Sheet, 16 pages (1999).
Lukasik, "Driving Today's Power Systems," Power Technology: A Special Supplement to EDN, Part Two: Power System Architectures, pp. P13-P18 (2004).

(56) References Cited

OTHER PUBLICATIONS

Maksimovic, "A Mos Gate Drive with Resonant Transitions," PESC '91 Record 22nd Annual IEEE Power Electronics Specialists Conference, pp. 527-532 (1991).

Malik, "The Power System Challenge—Understanding the Total Picture," Eighteenth Annual IEEE Applied Power Electronics Conference and Exposition, pp. 202-208 (2003).

Mammano, "Distributed Power Systems," Unitrode Corporation Seminar 900, Topic 1, pp. 1-1-1-12 (1993).

Mammano, "Fueling the Megaprocessors—Empowering Dynamic Energy Management," Unitrode Power Design Seminar, SEM1100 Topic 1, 25 pages (1996).

Mammano, "Isolating the Control Loop," Unitrode Power Supply Design Seminar 700, Topic 2, pp. 2-1-2-16 (1990).

Mankikar, "Power Electronics Industry Newsletter," Power Electronics Industry News, Issue 91, 20 pages (2002).

Mannion, "New Challenges Place Power Squarely in the Spotlight," Electronic Design, Nov. 3, 1997, 8 pages (1997).

Marchetti, "Make a noise for DC-DC converters," Electronic Product Design & Test, retrieved from http://www.epdtonthenet.net/article/17812/Make-a-noise-for-DC-DC-converters.aspx, 2 pages (2008).

Marchetti, "Power Systems Architectures What's In? What's Out?," Battery Power Products & Technology,, 2 pages (2003).

Matsuo, "Comparison of Multiple-Output DC-DC Converters using Cross Regulation," 1979 IEEE Power Electronics Specialists Conference, pp. 169-185 (1979).

Maxim, "Power Supplies for Telecom Systems," Maxim Integrated Products Application Note 280, retrieved from http://www.maxim-ic.com/an280, 15 pages (2000).

Maxim, "Synchronous Rectification Aids Low-Voltage Power Supplies," Maxim Integrated Products Application Note 625, retrieved from http://www.maxim-ic.com/appnotes.cfm/an_pk/652, 8 pages (2001).

Mc-Service, "Service Manual for Sony DCR-VX1000/VX1000E RMT-803 Sony Digital Video Camera Recorder," with the following supplements: "DCR-VX 1000/VX 1000E RMT-803, Service Manual, Supplement-3: Electrical Part Changed," "DCR-VX 1000/VX 1000E RMT-803, Service Manual, Supplement-2: Addition for Bist Check," "DCR-VX 1000/VXI000E RMT-803, Service Manual, Supplement-2: Addition for Bist Check," "DCR-VX 1000/VX 1000E RMT-803, Service Manual, Supplement-1," "DV Mechanical Adjustment Manual 1," 150 page.

McHale, "Complex military systems require efficient power electronics," Military Embedded Systems, retrieved from http://mil-embedded.com/articles/complex-efficient-power-electronics/, 6 pages (2013).

Micro Linear, "Battery Power Control IC General Description and Features," Data Sheet ML4873, 1 page (1997).

Micro Linear, "Battery Power Control IC," Advanced Data Sheet ML4873, 9 pages (1993).

Miftakhutdinov, "Improving System Efficiency with a New Intermediate-Bus Architecture," Texas Instruments Seminar, Topic 4, 20 pages (2009).

Miles, et al., "Market Trends Toward Enhanced Control of Electronic Power Systems," Proceedings of the Eighth Annual Applied Power Electronics Conference and Exposition, pp. 92-98 (1993).

Miwa, "Hybrid Construction of a 10MHz DC-DC Converter for Distributed Power Systems," Massachusetts Institute of Technology Thesis, 63 pages (1989).

Miwa, "Interleaved Conversion Techniques for High Density Power Supplies," Massachusetts Institute of Technology Thesis, 97 pages (1992).

Miwa, et al., "Copper-Based Hybrid Fabrication of a 50W, 5 MHz 40V-5V DC/DC Converter," Proceedings of the Fourth Annual IEEE Applied Power Electronics Conference and Exposition, pp. 256-264 (1989).

Miwa, et al., "High Efficiency Power Factor Correction Using Interleaving Techniques," Proceedings of APEC '92: Seventh Annual Applied Power Electronics Conference and Exposition, pp. 557-568 (1992).

Mohandes, "MOSFET Synchronous Rectifiers Achieve 90% Efficiency—Part I," Power Conversion & Intelligent Motion, pp. 10-13 (1991).

Mohandes, "MOSFET Synchronous Rectifiers Achieve 90% Efficiency—Part II," Power Conversion & Intelligent Motion, pp. 55-61 (1991).

Moore, "Step-Up/Step-Down Converters Power Small Portable Systems," EDN Magazine, pp. 79-84 (1994).

Moore, "Synchronous rectification aids low-voltage power supplies," EDN Access, retrieved from http://www.edn.eom/archives/1995/042795/09dF4.htm, 7 pages (1995).

Morrison, "Bus Converters Push Power Levels Higher," Electronic Design, retrieved from https://www.electronicdesign.com/content/article/21188217/bus-converters-push-power-levels-higher, 7 pages (2005).

Morrison, "Distributed Power Moves To Intermediate Bus Voltage," Electronic Design 50(19), pp. 55-62 (2002).

Morrison, "Sine Amplitude Converters: A New Class of Topologies for DC-DC Conversion." Electronic Design, retrieved from http://electronicdesign.com/energy/sine-amplitude-converters-new-class-topologies-dc-dc-conversion, 5 pages (2003).

Motto, "Introduction to Solid State Power Electronics," Powerex, Inc., 111 pages (1997).

MPS, "DN0004: 3A Point of Load Power Supplies—MP1570 Design Note," 6 pages (2005).

Mullett, "Practical Design of Small Distributed Power Systems," Power Conversion & Intelligent Motion, pp. 21-27 (1991).

Mullett, "The Role of the Power Source In System Design," Proceedings of the Power Sources Users Conference, 9 pages (1985).

Murakami, et al., "A high-efficiency 30 W board mounted power supply module," Proceedings of the Thirteenth International Telecommunications Energy Conference—INTELEC 91, pp. 122-127 (1991).

Murakami, et al., "A Highly Efficient Low-Profile 300-W Power-Pack for Telecommunications Sytems," Proceedings of 1994 IEEE Applied Power Electronics Conference and Exposition—ASPEC'94, pp. 786-792 (1994).

Murakami, et al., "A Simple and Efficient Synchronous Rectifier for Forward DC-DC Converters," Proceedings of the Eighth Annual Applied Power Electronics Conference and Exposition, pp. 463-468 (1993).

Murata Power Solutions, "EUS34-096 Isolated Bus Converter Datasheet," 3 pages (2008).

Mweene & Ashley, "Communications System Power Supply Designs," Texas Instruments Literature No. SNVA569, 6 pages (2011).

Mweene, "The Design of Front-End DC-DC Converters of Distributed Power Supply Systems with Improved Efficiency and Stability," Massachusetts Institute of Technology Thesis, 184 pages (1992).

Mweene, et al, "A 1 kW, 500 kHz Front-end Converter for Distributed Power Supply System," Proceedings of the Fourth Annual IEEE Applied Power Electronics Conference and Exposition, pp. 423-432 (1989).

Mweene, et al., "A high-efficiency 1.5 kW, 390-50 V half-bridge converter operated at 100% duty-ratio," Proceedings of APEC '92: Seventh Annual Applied Power Electronics Conference and Exposition, pp. 723-730 (1992).

Narveson & Harris, "Power-Management Solutions for Telecom Systems Improve Performance, Cost, and Size," Texas Instruments Incorporated Analog Applications Journal 3Q 2007, pp. 10-13 (2007).

Narveson & Jones, "Why the Market is Ready for a Non-Isolated DC/DC Power Module Standard," Nineteenth Annual IEEE Applied Power Electronics Conference and Exposition, pp. 335-341 (2004).

Narveson, "How Many Isolated DC-DC's Do you Really Need?," Proceedings of Applied Power Electronics Conference. APEC '96, pp. 692-695 (1996).

Narveson, "What is the Right Bus Voltage?," APEC '98: Thirteenth Annual Applied Power Electronics Conference and Exposition, pp. 883-888 (1998).

Newhart, "Product Report on DC-DC Converters," Electronic Design 34(21), pp. 169-170 (1986).

(56) References Cited

OTHER PUBLICATIONS

Niemela, et al., "Comparison of GaAs and Silicon Synchronous Rectifiers in a 3.3V Out, 50W DC-DC Converter," PESC Record. 27th Annual IEEE Power Electronics Specialists Conference, pp. 861-867 (1996).
Nochi, et al., "Full-Wave Current Resonant Multi-Output Converters," 21st Annual IEEE Conference on Power Electronics Specialists, pp. 528-535 (1990).
Non-Final Office Action on U.S. Appl. No. 16/781,070 DTD Sep. 23, 2020.
Non-Final Office Action on U.S. Appl. No. 17/385,384 DTD Jun. 28, 2022.
Notice of Allowance on U.S. Appl. No. 16/781,070 DTD May 14, 2021.
Notice of Allowance on U.S. Appl. No. 17/385,384 DTD Feb. 28, 2023.
Notice of Allowance on U.S. Appl. No. 17/385,384 DTD Nov. 3, 2022.
Office Action for U.S. Appl. No. 13/947,893 dated Nov. 21, 2014, 5 pages.
Ollero, et al., "New Post-Regulation and Protection Methods for Multiple Output Power Converters With Synchronous Rectification," Proceedings of Intelec'96—International Telecommunications Energy Conference, pp. 462-469 (1996).
Oraw & Ayyanar, "Load adaptive, high efficiency, switched capacitor intermediate bus converter," INTELEC 07—29th International Telecommunications Energy Conference, pp. 628-635 (2007).
Osifchin, et al., "Evolving Central-Office Powering Architecture," Fifth International Telecommunications Energy Conference, pp. 1-5 (1983).
P.R. Mallory & Co, Inc., "Fundamental Principles of Vibrator Power Supply Design," pp. 9-21, 23-31, 33-47, 49-105, 107-129, 131-135 (1947).
Pagotto, "Distributed Power Supplies, Course Notes for a Seminar Presented During the Power Electronics Conference '90," The Power Electronics Conference, pp. 175-185 (1990).
Panov & Jovanovic, "Design and Performance Evaluation of Low-Voltage/High-Current DC/DC OnBoard Modules," Fourteen Annual Applied Power Electronics Conference and Exposition, pp. 545-552 (1999).
Pedersen, "Low Voltage High Efficiency Power Conversion," Proceedings of the Fifth European Space Power Conference, pp. 51-56 (1998).
Pepper, "A New High Efficiency Post-Regulation Technique for Multiple Output Converters," Ninth International Solid-State Power Electronics Conference, 10 pages (1982).
Perkinson, "Ups Systems—A Review," Third Annual IEEE Applied Power Electronics Conference and Exposition, pp. 151-154 (1988).
Peterson & Saint-Pierre, "A Half Bridge, Self-Oscillating, Multi-Resonant Converter Circuit," Proceedings of the Eighth Annual Applied Power Electronics Conference and Exposition, pp. 77-84 (1993).
Power One Inc, "Form 10-K (Annual Report): Filed Mar. 12, 2004 for the Period Ending Dec. 31, 2003," Securities and Exchange Commission, 65 pages (2004).
Power One, "SQT54T38096 DC-DC Converter Preliminary Data Sheet," 12 pages (2007).
Pressman, "Chapter 3—Building Block Assembly of Compound Regulating Systems," Switching and Linear Power Supply, Power Converter Design, pp. 74-104 (1977).
Pressman, "Switching and Linear Power Supply, Power Converter Design," Hayden Book Co., 391 pages (1977).
Qian, "Advance Single-Stage Power Factor Correction Techniques," Virginia Polytechnic Institute and State University Thesis, 185 pages (1997).
Ratajczak, "Linear/Switching Supply Isolates, Holds Down Noise," Electronic Design 25, p. 156 (1979).
Ren, "High frequency, high efficiency two-stage approach for future microprocessors," Virginia Polytechnic Institute and State University thesis, 185 pages (2005).
Ren, et al., "A family of high power density unregulated bus converters," IEEE Transactions on Power Electronics 20(5), pp. 1045-1054 (2005).
Ren, et al., "Two-Stage 48V Power Pod Exploration for 64-Bit Microprocessor," Eighteenth Annual IEEE Applied Power Electronics Conference and Exposition, pp. 426-431 (2003).
Ren, et al., "Two-Stage Approach for 12V VR," Nineteenth Annual IEEE Applied Power Electronics Conference and Exposition, pp. 1306-1312 (2004).
Renauer, "Challenges in Powering High Performance Low Voltage Processors," Eleventh Annual Applied Power Electronics Conference and Exposition, pp. 977-983 (1996).
Rittenhouse, et al., "A Low-Voltage Power MOSFET With a Fast-Recovery Body Diode for Synchronous Rectification," 21st Annual IEEE Conference on Power Electronics Specialists, pp. 96-106 (1990).
Roddam, "Transistor Inverters and Converters, Chapters 7-11," D. Van Nostrand Company, pp. 116-204 (1963).
Roddam, "Transistor Inverters and Converters," London Life Books Ltd., 122 pages (1963).
Rodriguez, "Voltage Conversion and Regulation Techniques Employed in the Prime Converter for the Anchored Interplanetary Monitoring Platform (AIMP) Spacecraft," Supplement to IEEE Transactions on Aerospace and Electronics Systems AES-2(6), pp. 466-476 (1966).
Rostek, "Power System Design for Massive Parallel Computer Systems," Ninth Annual Applied Power Electronics Conference and Exposition, pp. 808-814 (1994).
Rozman & Fellhoelter, "Circuit Considerations for Fast, Sensitive Low-Voltage Loads in a Distributed Power System," 1Proceedings of 1995 IEEE Applied Power Electronics Conference and Exposition—APEC'95, pp. 34-42 (1995).
Rutledge, "Distributed Power 'Time for a Second Look,'" INTELEC '86—International Telecommunications Energy Conference, pp. 369-375 (1986).
Sabolis, "Bus Converters Aim to Boost Efficiency In IBA-Based Power Designs," DATEL Application Note, 6 pages (2003).
Sakai & Harada, "A New Synchronous Rectifier Using Bipolar Transistor Driven by Current Transformer," Proceedings of the Fourteenth International Telecommunications Energy Conference—INTELEC '92, pp. 424-429 (1992).
Sakai & Harada, "Synchronous Rectifier for Low Voltage Switching Converter," Proceedings of INTELEC 95. 17th International Telecommunications Energy Conference, pp. 471-475 (1995).
Sakai, et al., "MOSFET synchronous rectifier with saturable transformer commutation for high frequency converters," Proceedings of IEEE Power Electronics Specialist Conference—PESC '93, pp. 1024-1031 (1993).
Salato, "The Sine Amplitude Converter Topology Provides Superior Efficiency and Power Density in Intermediate Bus Architecture Applications," Vicor White Paper, 7 pages (2011).
Sampson, et al., "Energy Systems Meeting the Requirements for Distributed Telecommunications Systems," Trends in Telecommunications 8(3), pp. 24-32 (n.d.).
Sanders, et al., "The Road to Fully Integrated DC-DC Conversion via the Switched-Capacitor Approach," IEEE Transactions on Power Electronics 28(9), pp. 4146-4155 (2013).
Sano & Fujita, "Performance of a High-Efficiency Switched-Capacitor-Based Resonant Converter With Phase-Shift Control," IEEE Transactions on Power Electronics 26(2), pp. 344-354 (2011).
Sayani & Wanes, "Analyzing and determining optimum on-board power architectures for 48 V-input systems," Eighteenth Annual IEEE Applied Power Electronics Conference and Exposition, pp. 781-785 (2003).
Schlecht, "Choosing an On-Board Power Architecture," Power Technology: A Special Supplement to EDN, Part Two: Power System Architectures, pp. P28-P30 (2004).
Schlecht, "Research Results from the Study of A High Efficiency Highly Manufacturable DC-DC Converter," MIT to IBM Report, 32 pages (n.d.).
Schlect, "The Fundamentals of Switching Regulators and Their Control Circuits," 35 pages (2010).

(56) References Cited

OTHER PUBLICATIONS

Schulz, "System Interactions And Design Considerations For Distributed Power Systems," Virginal Polytechnic Institute & State University Thesis, 82 pages (1991).

Schulz, et al., "Design Considerations for a Distributed Power System," 21st Annual IEEE Conference on Power Electronics Specialists, pp. 611-617 (1990).

Schulz, et al., "Integrating a Series of High-Density Converters," PowerTechnics Magazine, pp. 32-37 (1990).

Schwarz, "A Controllable DC Transformer," IEEE Transactions on Magnetics 6(3), pp. 657-658 (1970).

Sebastian, el al., "An Overall Study of the Half-Bridge Complementary-Control DC-to-DC Converter," Proceedings of PESC '95—Power Electronics Specialist Conference, pp. 1229-1235 (1995).

Sebastian, et al., "A Complete Study of the Double Forward-Flyback Converter," PESC '88 Record, 19th Annual IEEE Power Electronics Specialists Conference, pp. 142-149 (1988).

Sebastian, et al., "A Study of the Two-Input DC-to-DC Switching Post-Regulators," V IEEE International Power Electronics Congress Technical Proceedings, CIEP 96, pp. 35-45 (1996).

Sebastian, et al., "Average-Current-Mode Control of Two-Input Buck Postregulators Used in Power-Factor Correctors," IEEE Transactions on Industrial Electronics 46(3), pp. 569-576 (1999).

Sebastian, et al., "Input Current Shaper Based on the Series Connection of a Voltage Source and Loss-Free Resistor," APEC '98 Thirteenth Annual Applied Power Electronics Conference and Exposition, pp. 461-467 (1998).

Sebastian, et al., "Small-Signal Modeling Of The Half-Bridge Complementary-Control DC-to-DC Converter," IV IEEE International Power Electronics Congress. Technical Proceedings. CIEP 95, pp. 44-50 (1995).

Sebastian, et al., "Very Efficient Two-Input DC-to-DC Switching Post-Regulators," PESC Record, 27th Annual IEEE Power Electronics Specialists Conference, pp. 874-880 (1996).

Seeman, et al., "Analysis and Optimization of Switched-Capacitor DC-DC Converters," IEEE Transactions on Power Electronics 23(2), pp. 841-851 (2008).

Severns & Bloom, "Modern DC-To-DC Switchmode Power Converter Circuits," Van Nostrand Reinhold Company, 179 pages (1985).

Severns, "Switchmode Converter Topologies—Make Them Work for You!", Intersil Inc. Application Bulletin A035, 32 pages (1980).

Severns, "The Power MOSFET As A Rectifier," Power Conversion International, pp. 49-50 (1980).

SGS-Thomson, "Designing with the L296 Monolithic Power Switching Regulator," SGS-Thomson Microelectronics Application Note, 43 pages (1996).

Shepard, "Power Supplies," Reston Publishing Company, pp. 32-37 (1984).

Shi & Brockschmidt, "Fault Tolerant Distributed Power," Proceedings of Applied Power Electronics Conference—APEC '96, pp. 671-677 (1996).

Shoyama & Harada, "Zero-Voltage-Switching by Magnetizing Current of Transformer in Push-Pull DC-DC Converter," Proceedings of the Thirteenth International Telecommunications Energy Conference—INTELEC 91, pp. 640-647 (1991).

Slurzberg & Osterheld, "Essentials of Radio-electronics," McGraw-Hill, pp. 358-362 & 623-624 (1961).

Small Services, Inc., "Who We Are," retrieved from http://www.smallservices.net/, 8 pages (2009).

Smith, "Benefits of the DC Bus Converter in Distributed Power Architectures for Networking & Communications Systems," International Rectifier, 8 pages (2004).

Smith, "Distributed Power Systems Via ASICs Using SMT," Surface Mount Technology, pp. 29-32 (1990).

Steigerwald, "High Density Power for Low Voltage Pulsed Loads," Proceedings of the Eighth Annual Applied Power Electronics Conference and Exposition, pp. 37-43 (1993).

Steigerwald, et al., "Investigation of Power Distribution Architectures for Distributed Avionics Loads," PESC95 Record, vol. 1, 26th Annual IEEE Power Electronics Specialists Conference, 9 pages (1995).

Sun, et al., "Forward Converter Regulator Using Controlled Transformer," IEEE Transactions on Power Electronics 11(2), pp. 356-364 (1996).

Suryani, "Bus Voltage Level Comparisons for Distributed Power Architectures," Power Conversion & Intelligent Motion, pp. 10-18 (1995).

Suryani, "The Value of Distributed Power," Proceedings of 1995 IEEE Applied Power Electronics Conference and Exposition—APEC'95, pp. 104-110 (1995).

SynQor, "16A Non-Isolated DC/DC Converter in SMT package," SynQor Inc. Technical Specification, Product # NQ12xxxSMA16, 16 pages (2004).

SynQor, "16A Non-Isolated, SMT DC/DC Converter with Wide Trim," SynQor Inc. Technical Specification, Product #NQ12T5OSMA16, 15 pages (2004).

SynQor, "16Amp, Wide Output Range, Non-Isolated DC/DC Converter," SynQor Inc. Technical Specification, Product # 1Q04T33VMA16, 20 pages (2004).

SynQor, "BusQor Bus Converter BQ50120QTA20," SynQor Inc. Technical Specification, 12 pages (2006).

SynQor, "IBA vs. DPA: What to Consider When Choosing an On-Board Power Architecture," A Technical White Paper by SynQor Inc., 4 pages (n.d.).

SynQor, "SynQor—Advancing the Power Curve," SynQor Inc., 24 pages (2003).

SynQor, "SynQor High Efficiency DC/DC Converters," SynQor Inc., 24 pages (2003).

SynQor, "SynQor Introduces 1.2V output Module for60A series of Half-Brick DC/DC Converters," SynQor, Inc. Press Release, 1 page (2002).

SynQor, "SynQor Introduces Wide-Input, Point-of-Load DC/DC Converters," SynQor, Inc. Press Release, 1 page (2004).

SynQor, "SynQor's Bus Converter Delivers 240 Watts in Quarter-Brick," SynQor, Inc. Press Release, 1 page (2002).

SynQor, "The PowerQor Series of DC/DC Converters," SnyQor Inc., 6 pages (n.d.).

SynQor, "BusQor Series," retrieved from http://web.archive.org/web/20020814221649/http://www.synqor.com/products/busqor_qb.html, 2 pages, (2002).

SynQor, "Technology Overview," retrieved from http://web.archive.org/web/20020208055450/http://www.synqor.com/products/2_2_tech_overview.html, 6 pages (2002).

Tabisz, et al., "A MOSFET Resonant Synchronous Rectifier for High-Frequency DC/DC Converters," 21st Annual IEEE Conference on Power Electronics Specialists, pp. 769-779 (1990).

Tabisz, et al., "Present and future of distributed power systems," Proceedings of APEC '92 Seventh Annual Applied Power Electronics Conference and Exposition, pp. 11-18 (1992).

Takagi, et al., "Ultra High Efficiency of 95% for DC/DC Converter—Considering Theoretical Limitation of Efficiency," Seventeenth Annual IEEE Applied Power Electronics Conference and Exposition, pp. 735-741 (2002).

Tam & Yang, "Functional Models for Space Power Electronic Circuits," IEEE Transactions on Aerospace and Electronic Systems 31(1), pp. 288-296 (1995).

Taylor, "Distributed Power Processing: The Systems Solution," INTELEC '83—Fifth International Telecommunications Energy Conference, pp. 310-314 (1983).

TDK Innoveta Inc. & TDK Corporation, "Stability Analysis of Bus Architecture," 2004 IBM Power Technology Symposium, 24 pages (2004).

Tektronix, "Aa 501 Distortion Analyzer with Options—Instruction Manual," Tektronix, Inc., 161 pages (1981).

Tektronix, "PS5004 Precision Power Supply—Instruction Manual," Tektronix, Inc., 142 pages (1986).

Tektronix, "TM 5003 Power Module—Instruction Manual," Tektronix, Inc., 73 pages (1981).

Tektronix, "TM 503 Power Module—Instruction Manual," Tektronix, Inc., 59 pages (1984).

(56) References Cited

OTHER PUBLICATIONS

Texas Instruments, "TI Unveils Next-Generation Point-of-Load Power Modules with Ultra-Fast Transient Response," retrieved from http://newscenter.ti.com/Blogs/newsroom/archive/2005/11/07/ti-unveils-next-generation-point-of-load-power-modules-with-ultra-fast-transient-response-sc05226.aspx, 2 pages (2005).
Theron, et al., "Soft Switching Self-Oscillating FET-Based DC-DC Converters," PESC '92 Record. 23rd Annual IEEE Power Electronics Specialists Conference, pp. 641-648 (1992).
Thollot, et al., "Power Electronics Technology and Applications 1993," IEEE Technology Update Series, pp. 13-22, 196-203, 207-209, 211-217, 259-302 (1993).
Thorsell, "Mini DC-DC Supplies Simplify Redundancy in Parallel Systems," Academic OneFiley, Gale Document No. A6321372, 4 pages (1988).
Thorsell, "Will Distributed On-Board DC/DC Converters Become Economically Beneficial in Telecom Switching Equipment," 12th International Conference on Telecommunications Energy, pp. 63-69 (1990).
*Tokai Corp. V. Eastern Enterprises, Inc.*, 632 F.3d 1358 (Fed. Cir. 2011), 39 pages.
Traister, "Voltage Regulator Circuit Manual," Academic Press, Inc., 77 pages (1989).
Trial Testimony Transcript of Dec. 14, 2010, AM Session, *SynQor, Inc. v. Artesyn Technologies, et al.*, Case No. 2:07-CV-479, 51 pages.
Tsai & Ng, "A Low-Cost, Low-Loss Active Voltage-Clamp Circuit for Interleaved Single-Ended Forward PWM Converter," Proceedings of the Eighth Annual Applied Power Electronics Conference and Exposition, pp. 729-733 (1993).
Uceda & Cobos, "Supplying Power at Low Voltage (3.3V)," Proceedings of First International Caracas Conference on Devices, Circuits and Systems, pp. 244-251 (1995).
Unitrode, "Switching Regulated Power Supply Design Seminar," Unitrode Corporation, 134 pages (1993).
Unknown, "Chapter II: Inverters and Converters," and "Chapter III, Regulated Power Supplies," pp. 2-1-2-65 and 3-1-3-31, (n.d.).
US Office Action on U.S. Appl. No. 13/933,252 DTD May 11, 2016.
US Office Action on U.S. Appl. No. 16/781,070 DTD Mar. 3, 2021.
Vazquez, et al., "A Systematic Approach to Select Distributed, Centralised or Mixed Power Architecture in Telecom Applications," INTELEC—Twentieth International Telecommunications Energy Conference, pp. 129-136 (1998).
Vazquez, et al., "Fixed Frequency Forward-Flyback Converter with Two Fully Regulated Outputs," Proceedings of INTELEC 95—17th International Telecommunications Energy Conference, pp. 161-166 (1995).
Vicor Powerblog, "Background to Factorized Power Architecture," Vicor Corporation, retrieved from http://powerblog.vicorpower.com/2011/11/background-to-factorized-power-architecture, 4 pages (2016).
Vicor Powerblog, "Build Small, Lighter Power Systems by Eliminating Bulk Capacitance," Vicor Corporation, retrieved from http://powerblog.vicorpower.com/2015/10/build-small-lighter-power-systems-eliminating-bulk-capacitance/, 3 pages (2015).
Vinciarelli, "Factorized Power Architecture & VI Chips—Power Paradigm of the Future?" Vicor Corporation Webcast, partial transcript, retrieved from http://cdn.vicorpower.com/documents/webcasts/fp_webcast.swf on May 23, 2016, 2 pages.
Vithanage, et al., "150W Board Mounted Power Supply Module Using Highly Compact and Efficient Synchronous Rectifiers," APEC '98 Thirteenth Annual Applied Power Electronics Conference and Exposition, pp. 177-183 .(1998).
Vlatkovic, et al., "Small-Signal Analysis of the Phase-Shifted PWM Converter," IEEE Transactions on Power Electronics 7(1), pp. 128-135 (1992).
Watson, "New Techniques in the Design of Distributed Power Systems," Virginia Polytechnic Institute and State University Thesis, 12 pages (1998).

Weinberg & Ghislanzoni, "A New Zero Voltage and Zero Current Power-Switching Technique," IEEE Transactions on Power Electronics 7(4), pp. 655-665 (1992).
Weinberg, "A Novel Lossless Resonant MOSFET Driver," PESC '92 Record. 23rd Annual IEEE Power Electronics Specialists Conference, pp. 1003-1010 (1992).
White & Miles, "Principles of Fault Tolerance," Proceedings of Applied Power Electronics Conference—APEC '96, pp. 18-25 (1996).
White, "Emerging on-board power architectures," Eighteenth Annual IEEE Applied Power Electronics Conference and Exposition, pp. 799-804 (2003).
Wiegman, "A Resonant Pulse Gate Drive For High Frequency Applications," Proceedings of APEC '92 Seventh Annual Applied Power Electronics Conference and Exposition, pp. 738-743 (1992).
Wiegman, et al., "A Dual Active Bridge SMPS Using Synchronous Rectifiers," High Frequency Power Conversion Conference Proceedings, pp. 336-346 (1990).
Wildrick, "Stability of Distributed Power Supply Systems," Virginia Polytechnic Institute and State University Thesis, 97 pages (1993).
Wildrick, et al., "A Method of Defining the Load Impedance Specification for a Stable Distributed Power System," IEEE Transactions on Power Electronics 10(3), pp. 280-285 (1995).
Xi, et al., "A Precisely Regulated Multiple Output Forward Converter Topology," Fifteenth Annual IEEE Applied Power Electronics Conference and Exposition, pp. 986-992 (2000).
Xi, et al., "A Zero Voltage Switching and Self-Reset Forward Converter Topology," APEC '99—Fourteenth Annual Applied Power Electronics Conference and Exposition, pp. 827-833 (1999).
Xi, et al., "An Improved Technique for the Synchronous Rectifier Mosfets in the Forward Converter Topology," CCECE '97—Canadian Conference on Electrical and Computer Engineering. Engineering Innovation: Voyage of Discovery, pp. (1997).
Xi, et al., "The Point of Use DC/DC Power Distribution: The Architecture and an Implementation," INTELEC. Twenty-Second International Telecommunications Energy Conference, pp. 498-505 (2000).
Xiao & Oruganti, "Soft Switched PWM DC/DC Converter With Synchronous Rectifiers," Proceedings of Intelec'96—International Telecommunications Energy Conference, pp. 476-484 (1996).
Xuefei, et al., "Studies of Self-Driven Synchronous Rectification in Low Voltage Power Conversion," Proceedings of the IEEE 1999 International Conference on Power Electronics and Drive Systems, pp. 212-217 (1999).
Yang, et al., "A New Dual Channel Resonant Gate Drive Circuit For Synchronous Rectifiers," Twenty-First Annual IEEE Applied Power Electronics Conference and Exposition, pp. 756-762 (2006).
Yang, et al., "Isolated Boost Circuit for Power Factor Correction," The VPEC Annual Power Electronics Seminar, pp. 97-104 (1992).
Yee, et al., "A Self-Driven Synchronous Rectifier," Proceedings of 1994 Power Electronics Specialist Conference—PESC'94, pp. 627-633 (1994).
Yeung, et al., "Generalised analysis of switched-capacitor step-down quasi-resonant converter," Electronics Letters 38(6), pp. 263-264 (2002).
Yeung, et al., "Zero-current switching switched-capacitor quasiresonant step-down converter," IEE Proceedings—Electric Power Applications 149(2), pp. 111-121 (2002).
Yoshida, et al., "A Novel Zero Voltage Switching Half Bridge Converter," Proceedings of Intelec 94, pp. 566-572 (1994).
Yoshida, et al., "Zero Voltage Switching Approach For Flyback Converter," Proceedings of the Fourteenth International Telecommunications Energy Conference—INTELEC '92, pp. 324-329 (1992).
Zhang, et al., "Analysis and Evaluation of Interleaving Techniques in Forward Converters," IEEE Transactions on Power Electronics 13(4), pp. 690-698 (1998).
Zhang, et al., "Commutation Analysis of Self-Driven Synchronous Rectifiers in an Active-Clamp Forward Converter," 27th Annual IEEE Power Electronics Specialists Conference, pp. 868-873 (1996).
Zhang, et al., "Design Considerations and Performance Evaluations of Synchronous Rectification in Flyback Converters," Proceedings of APEC 97—Applied Power Electronics Conference, pp. 623-630 (1997).

(56) References Cited

OTHER PUBLICATIONS

Zhang, et al., "Design considerations for low-voltage on-board DC/DC modules for next generations of data processing circuits," IEEE Transactions on Power Electronics 11(2), pp. 328-337 (1996).
Zhou, et al., "A Novel High-input-voltage, High Efficiency and Fast Transient Voltage Regulator Module—Push-pull Forward Converter," APEC '99—Fourteenth Annual Applied Power Electronics Conference and Exposition, pp. 279-283 (1999).
Zhou, et al., "Investigation of Candidate VRM Topologies for Future Microprocessors," Thirteenth Annual Applied Power Electronics Conference and Exposition, pp. 145-150 (1988).
Appendix C-1—Respondents' Invalidity Chart for U.S. Pat. No. 10,199,950 (Daocheng Huang et al., "Novel Non-isolated LLC Resonant Converters"), filed in the matter of Certain Power Converter Modules and Computing Systems Containing the Same, United States International Trade Commission, Investigation No. 337-TA-1370, complaint filed Jul. 12, 2023, Notice of Investigation issued Aug. 14, 2023 (35 pages).
Appendix C-2—Respondents' Invalidity Chart for U.S. Pat. No. 10,199,950 (U.S. Pat. No. 7,307,857, Yan-Fei Liu and Sheng Ye), filed in the matter of Certain Power Converter Modules and Computing Systems Containing the Same, United States International Trade Commission, Investigation No. 337-TA-1370, complaint filed Jul. 12, 2023, Notice of Investigation issued Aug. 14, 2023 (32 pages).
Appendix C-3—Respondents' Invalidity Chart for U.S. Pat. No. 10,199,950 (U.S. Pat. No. 6,930,893, Patrizio Vinciarelli), filed in the matter of Certain Power Converter Modules and Computing Systems Containing the Same, United States International Trade Commission, Investigation No. 337-TA-1370, complaint filed Jul. 12, 2023, Notice of Investigation issued Aug. 14, 2023 (54 pages).
Appendix C-4—Respondents' Invalidity Chart for U.S. Pat. No. 10,199,950 (Secondary References), filed in the matter of Certain Power Converter Modules and Computing Systems Containing the Same, United States International Trade Commission, Investigation No. 337-TA-1370, complaint filed Jul. 12, 2023, Notice of Investigation issued Aug. 14, 2023 (116 pages).
Appendix C-5—Respondents' Invalidity Chart for U.S. Pat. No. 10,199,950 (U.S. Pat. No. 4,257,087, Cuk), filed in the matter of Certain Power Converter Modules and Computing Systems Containing the Same, United States International Trade Commission, Investigation No. 337-TA-1370, complaint filed Jul. 12, 2023, Notice of Investigation issued Aug. 14, 2023 (32 pages).
Ball, et al., "The Combination of Thermal and Electrical Improvements in a IU 100A VRM," 2007 IEEE Power Electronics Specialists Conference, pp. 15-20 (2007).
Bel Power Products, "Bus Converter, 48V Input/9.3V Output/36.5A, 07CM-38S10L," Bel Fuse Inc., www.belfuse.com, 2004 (5 pages).
Bel Power Products, "Intermediate Bus Architecture," Bel Fuse Inc., www.belfuse.com, 2002 (4 pages).
Bel Power Products, "Isolated DC/DC Converters, 07QB-C5T Series Data Sheet," URL: https://www.alldatasheet.com/datasheet-pdf/download/156218/BEL/07QB-C5T.html, Bel Fuse Inc., pp. 1-8 (2005).
Bersani et al., "AN1336, DC/DC LLC Reference Design Using the dsPIC DSC," Microchip Technology, Inc., URL: ww1.microchip.com/downloads/aemDocuments/documents/OTH/ApplicationNotes/ApplicationNotes/LLC_Appnotes.pdf, 2010 (82 pages).
Chu, et al., "ZVS-ZCS Bidirectional Full-Bridge DC-DC Converter," 2009 IEEE International Conference on Power Electronics and Drive Systems (PEDS), pp. 1125-1130 (2010).
Delta Electronics, Inc., "Delphi Series DNK12, Non-Isolated, Point of Load DC/DC Power Modules, Preliminary Datasheet," Delta Electronics, Inc., 2018 (16 pages).
*Delta* vs. *Vicor* IPR Documents Part 1—Documents filed Sep. 4, 2024-Feb. 21, 2024, with cover letter, for *Delta Electronics, Inc.*, Petitioner v. *Vicor Corporation*, Patent Owner, Petition for Inter Partes Review of U.S. Pat. No. 10,199,950, filed Nov. 2, 2023 in the United State Patent and Trademark Office before the Patent Trial and Appeal Board, AIA Review #: IPR2024-00134.
*Delta* vs. *Vicor* IPR Documents Part 2—Documents filed Feb. 21, 2024 for *Delta Electronics, Inc.*, Petitioner v. *Vicor Corporation*, Patent Owner, Petition for Inter Partes Review of U.S. Pat. No. 10,199,950, filed Nov. 2, 2023 in the United State Patent and Trademark Office before Feb. 21, 2024 the Patent Trial and Appeal Board, AIA Review #: IPR2024-00134.
*Delta* vs. *Vicor* IPR Documents Part 3—Documents filed Feb. 21, 2024 for *Delta Electronics, Inc.*, Petitioner v. *Vicor Corporation*, Patent Owner, Petition for Inter Partes Review of U.S. Pat. No. 10,199,950, filed Nov. 2, 2023 in the United State Patent and Trademark Office before the Patent Trial and Appeal Board, AIA Review #: IPR2024-00134.
*Delta* vs. *Vicor* IPR Documents Part 4—Documents filed Feb. 21, 2024-Nov. 2, 2023 for *Delta Electronics, Inc.*, Petitioner v. *Vicor Corporation*, Patent Owner, Petition for Inter Partes Review of U.S. Pat. No. 10,199,950, filed Nov. 2, 2023 in the United State Patent and Trademark Office before the Patent Trial and Appeal Board, AIA Review #: IPR2024-00134.
*Delta* vs. *Vicor* IPR Documents Part 5—Documents filed Nov. 2, 2023 for *Delta Electronics, Inc.*, Petitioner v. *Vicor Corporation*, Patent Owner, Petition for Inter Partes Review of U.S. Pat. No. 10,199,950, filed Nov. 2, 2023 in the United State Patent and Trademark Office before the Patent Trial and Appeal Board, AIA Review #: IPR2024-00134.
*Delta* vs. *Vicor* IPR Documents Part 6—Documents filed Nov. 2, 2023 for *Delta Electronics, Inc.*, Petitioner v. *Vicor Corporation*, Patent Owner, Petition for Inter Partes Review of U.S. Pat. No. 10,199,950, filed Nov. 2, 2023 in the United State Patent and Trademark Office before the Patent Trial and Appeal Board, AIA Review #: IPR2024-00134.
*Delta* vs. *Vicor* IPR Documents Part 7—Documents filed Nov. 2, 2023 for *Delta Electronics, Inc.*, Petitioner v. *Vicor Corporation*, Patent Owner, Petition for Inter Partes Review of U.S. Pat. No. 10,199,950, filed Nov. 2, 2023 in the United State Patent and Trademark Office before the Patent Trial and Appeal Board, AIA Review #: IPR2024-00134.
Ericsson, "BMR 453 Series DC/DC Converter," Ericsson, https://web.archive.org/web/20120131104718/http:/www.ericsson.com/solutions/news/powermodules/2009/hires_BMR453_jan09.jpg, 2009 (1 page).
Ericsson, "BMR 453 series DC/DC converters, Input 36-75 V, Output up to 60 A/396 W Technical Specification," Ericsson, Jul. 2010 (35 pages).
File History of U.S. Pat. No. 10,199,950, published Feb. 5, 2019 (811 pages).
Huang, "Designing an LLC Resonant Half-Bridge Power Converter," Texas Instruments, Texas Instruments Power Supply Design Seminar, Topic 3, 2010 (27 pages).
Huang, et al., "Novel Non-isolated LLC Resonant Converters," 2012 Twenty-Seventh Annual IEEE Applied Power Electronics Conference and Exposition (APEC), pp. 1373-1380 (2012).
Huber, et al., "1.8-MHz, 38-V Resonant VRM," Twentieth Annual IEEE Applied Power Electronics Conference and Exposition, pp. 294-300 (2005).
Huber, et al., "1.8-MHz, 48-V Resonant VRM: Analysis, Design, and Performance Evaluation," IEEE Transactions on Power Electronics, Jan. 2006, vol. 21, No. 1 (pp. 79-88).
Intel Corporation, "Intel Xeon Processor ES-2400 Product Family, Datasheet—Volume One," Intel, URL: https://www.intel.com/content/dam/www/public/us/en/documents/datasheets/xeon-e5-2400-vol-1-datasheet.pdf, May 2012 (240 pages).
International Rectifier, "International Rectifier Introduces DC Bus Converter Chip Set Re-Defining Distributed Power Architecture for Networking and Communication Systems," URL:https://www.radiolocman.com/news/new.html?di=626, May 22, 2003 (3 pages).
Le Fevre, "Digital DC/DC Converter Family Integrates PMBus Connectivity," Ericsson, Jun. 12, 2009 (6 pages).
Lee, et al., "Design Challenges for Distributed Power Systems," Asian Power Electronics Journal, 1(1), pp. 1-14 (2007).
Liu et al., "Source Reactance Lossless Switch (SRLS) for Soft-Switching Converters with Constant Switching Frequency," IEEE

(56) References Cited

OTHER PUBLICATIONS

Transactions on Circuits and Systems I: Fundamental Theory and Applications, vol. 43, iss. 4, 1996 (12 pages).
Lu et al., "Optimal Design Methodology for LLC Resonant Converter" Twenty-First Annual IEEE Applied Power Electronics Conference and Exposition (APEC '06), Mar. 19-23, 2006 (6 pages).
McDonald, et al., "Design and Optimization of a High Performance LLC Converter," 2012 Texas Instruments Power Supply Design Seminar, 2012 (25 pages).
Microchip Technology, Inc., "dsPIC33FJ06GS101/X02 and dsPIC33FJ16GSX02/X04 Datasheet," Microchip Technology Inc., 2012 (386 pages).
Pan, et al., "Secondary-side Adaptive Digital Controlled Series Resonant DC-DC Converters for Low Voltage High Current Applications," 2008 IEEE Power Electronics Specialists Conference, pp. 711-717 (2008).
Respondents' Corrected Notice of Prior Art filed in the matter of Certain Power Converter Modules and Computing Systems Containing the Same, United States International Trade Commission, document dated Dec. 11, 2023, Investigation No. 337-TA-1370 (19 pages).
Salato, M., "Re-Architecting 48V Power Systems with a Novel Non-Isolated Bus Converter," 2015 IEEE International Telecommunications Energy Conference (INTELEC), Oct. 18-22, 2015 (7 pages).
Sharifi, et al., "A New Non-Isolated Resonant Step-Up Converter," 2012 International Conference on Applied Electronics, Pilsen, Czech Republic, pp. 253-256 (2012).
Spiazzi, et al., "Layout Considerations and Thermal, Analysis of a 1.8 MHz Resonant VRM," 2007 IEEE Industry Applications Annual Meeting, pp. 1993-2000 (2007).
*Synqor, Inc.* v. *Artesyn Techs., Inc.*, 709 F.3d 1365, Fed. Cir. 2013 (18 pages).
TDK, "Data Sheet: FReta iQD Series—Single Output Quarter Brick Bus Converter," TDK Innoveta Inc., Jun. 7, 2005 (12 pages).
Texas Instruments, "Digital Power Controllers—UCD3040, UCD3028, UCD2020," Texas Instruments, 2010 (63 pages).
Texas Instruments, "UCD3138 Data Manual—Highly Integrated Digital Controller for Isolated Power," Texas Instruments, Mar. 2012 (pp. 1-68).
Vicor Corporation, "NBM Bus Converter NBM2317S60D1565T0R," Vicor Corporation, URL: www.vicorpower.com/documents/datasheets/ds-NBM2317S60D1565T0R-VICOR.pdf?_gl=1*5obz2w*_up*MQ..*_ga*NTQwMDM4ODAyLjE3MzQ1Mzk1NjA.*_ga_C8JXV19SQ5*MTczNDUzOTU1OS4xLjAuMTczNDUzOTU1OS4wLjAuMA . . . , Jul. 2021 (27 pages).
Vicor Corporation, "Vicor's V-1 Chip Wins EDN 2003 Innovation of the Year Award," Vicor Corporation, URL: https://vicorcorporation.gcs-web.com/node/6881/pdf, Mar. 30, 2024 (1 page).
Vicor Corpration, "IBC Module IB0xxQ096T70xx-xx," Vicor Corporation, URL: www.vicorpower.com/documents/datasheets/ds_IB0xxQ096T70xx-xx.pdf?_gl=1*rac0q8*_up*MQ..*_gs*MQ..*_ga*MzA0ODk1NjgxLjE3MzQ1MzkyODU.*_ga_C8JXV19SQ5*MTczNDUzOTI4NC4xLjEuMTczNDUzOTMwMS4wLjAuMA..&gclid=EAIaIQobChMlutmKrN6xigMV7RKtBh0IDhFKEAAYASAAEgKxvfD_BwE, Sep. 2016 (19 pages).
Waffenschmidt, et al., "Design Method and Material Technologies for Passives in Printed Circuit Board Embedded Circuits," IEEE Transactions on Power Electronics, 2005, vol. 20, No. 3 (pp. 576-584).
Wei, et al., "A High Efficiency Topology for 12V VRM-Push-Pull Buck and Its Integrated Magnetics Implementations," Seventeenth Annual IEEE Applied Power Electronics Conference and Exposition (APEC), Dallas, TX, U.S.A., pp. 679-685, vol. 2 (2002).
Xu et al., "Voltage Divider and its Application in the Two-stage Power Architecture," Twenty-First Annual IEEE Applied Power Electronics Conference and Exposition (APEC), Dallas, TX, USA, 2006 (7 pages).
Zhang, et al., "Design and Analysis of Thermal Management for High-Power-Density Converters in Sealed Enclosures," Proceedings of APEC 97—Applied Power Electronics Conference, pp. 405-412 (1997).
Zhao et al., "Analysis of High Efficiency DC/DC Converter Processing Partial Input/Output Power," 2013 IEEE 14th Workshop on Control and Modeling for Power Electronics (COMPEL), 2013 (8 pages).
Zhou, et al., "1 MHz Self-Driven DC-DC Converter for Nonisolated 12V VRs," Nineteenth Annual IEEE Applied Power Electronics Conference and Exposition (APEC'04), pp. 279-284 (2004).
Zhu et al., "Three-Level Switching Cell for Low Voltage/High-Current DC-DC Converters," IEEE Transactions on Power Electronics, Sep. 2007, vol. 22, Iss. 5 (11 pages).

POWER DISTRIBUTION ARCHITECTURE WITH SERIES-CONNECTED BUS CONVERTER

CROSS-REFERENCE TO RELATED PATENT APPLICATIONS

This application is a continuation of U.S. patent application Ser. No. 17/385,384 filed Jul. 26, 2021, which is a continuation of U.S. patent application Ser. No. 16/781,070, filed Feb. 4, 2020 (now U.S. Pat. No. 11,075,583), which is a continuation of U.S. patent application Ser. No. 16/022,636, filed Jun. 28, 2018 (now U.S. Pat. No. 10,594,223), which is a continuation of U.S. patent application Ser. No. 13/933,252, filed Jul. 2, 2013 (now U.S. Pat. No. 10,199,950), each of which are incorporated herein by reference in their entirety.

BACKGROUND

Referring to FIG. 1, a prior art power distribution system 1 such as an Intermediate Bus Architecture ("IBA") is shown having a DC power source 5, supplying power at a source voltage, $V_S$, to the input of a bus converter 10. The output of the bus converter 10 supplies power to one or more down-stream regulators, e.g. regulators 6, 7 which in turn provide regulated power, e.g. regulated voltage, to respective loads 8, 9. The bus converter 10 may include a DC Transformer which is a switching power converter that may provide voltage transformation from its input to output at an essentially fixed voltage gain and also provide galvanic isolation between its input and output. The bus converter 10 may adjust its output slightly during predetermined operating conditions to provide in-rush current limiting, e.g. during start up and may provide partial regulation over selected portions of the source voltage range. Although a single bus converter is shown in FIG. 1, a plurality of bus converters may be connected to receive power from a single source 5 and provide power at one or more voltages to a plurality of down-stream regulators, such as regulators 6 and 7. Additionally, two or more bus converters or two or more DC Transformers may be connected in parallel to increase power throughput or to provide a measure of fault tolerance.

SUMMARY

One embodiment of the disclosure relates to an apparatus that includes a power distribution system comprising a source for providing power at a DC source voltage $V_S$. The apparatus further includes a bus converter that includes an input circuit and an output circuit. The bus converter is adapted to convert power from the input circuit to the output circuit at a substantially fixed voltage transformation ratio $K_{DC}$ at an output current. An input voltage $V_{IN}$ is applied to the input circuit and an output voltage $V_{OUT}$ is produced by the output of the bus converter, and the substantially fixed voltage transformation ratio can be represented as $K_{DC}=V_{OUT}/V_{IN}$. The apparatus further includes a power distribution bus connected to distribute power from the output circuit of the bus converter at the output voltage $V_{OUT}$. The apparatus further includes a plurality of regulators. Each regulator includes a regulator input connected to the power distribution bus to receive power from the output circuit of the bus converter and a regulator output connected to supply power to a respective load. The plurality of regulators each are separated by a distance from the bus converter. The input circuit of the bus converter and at least a portion of the output circuit of the bus converter are connected in series across the source such that an absolute value of the input voltage $V_{IN}$ applied to the input circuit is approximately equal to the absolute value of the DC source voltage $V_S$ minus a number N times the absolute value of the output voltage $V_{OUT}$, where N is at least 1.

Another embodiment relates to an apparatus that includes a power converter including an input circuit and an output circuit. The power converter is configured to receive power from a power distribution system comprising a source for providing power at a DC source voltage $V_S$. The power converter is adapted to convert power from the input circuit to the output circuit at a substantially fixed voltage transformation ratio $K_{DC}$ at an output current. An input voltage $V_{IN}$ is applied to the input circuit and an output voltage $V_{OUT}$ is produced by the output of the power converter. The substantially fixed voltage transformation ratio can be represented as $K_{DC}=V_{OUT}/V_{IN}$. The power converter further includes a series connection between the input circuit of the power converter and at least a portion of the output circuit of the power converter across the source, such that an absolute value of the input voltage $V_{IN}$ applied to the input circuit is approximately equal to the absolute value of the DC source voltage $V_S$ minus a number N times the absolute value of the output voltage $V_{OUT}$, where N is at least 1.

Yet another embodiment relates to an apparatus that includes a bus converter including an input circuit and an output circuit. The bus converter is configured to receive power from a power distribution system including a source for providing power at a DC source voltage $V_S$. The bus converter is adapted to convert power from the input circuit to the output circuit at a substantially fixed voltage transformation ratio $K_{DC}$ at an output current. An input voltage $V_{IN}$ is applied to the input circuit and an output voltage $V_{OUT}$ is produced by the output of the bus converter, and the substantially fixed voltage transformation ratio can be represented as $K_{DC}=V_{OUT}/V_{IN}$. The apparatus further includes a power distribution bus connected to distribute power from the output circuit of the bus converter at the output voltage $V_{OUT}$. The apparatus further includes a plurality of regulators. Each regulator includes a regulator input connected to the power distribution bus to receive power from the output circuit of the bus converter and a regulator output connected to supply power to a respective load. The plurality of regulators each are separated by a distance from the bus converter. The input circuit of the bus converter and at least a portion of the output circuit of the bus converter are connected in series across the source such that an absolute value of the input voltage $V_{IN}$ applied to the input circuit is approximately equal to the absolute value of the DC source voltage $V_S$ minus a number N times the absolute value of the output voltage $V_{OUT}$, where N is at least 1.

Another embodiment relates to an apparatus comprising an intermediate bus architecture power distribution system for a telecommunications system comprising a source for providing power at a DC source voltage; a circuit board comprising a bus converter, the bus converter comprising an input circuit, the input circuit comprising a primary transformer winding, the bus converter further comprising an output circuit, the output circuit comprising a secondary transformer winding, wherein the primary and secondary transformer windings are galvanically connected in series, and wherein the bus converter is configured to provide power to a power distribution bus that is not galvanically isolated from the source; and the circuit board further comprising a plurality of regulators, wherein each regulator comprises a regulator input connected to the power distribution bus to receive power from the output circuit of the bus converter and a regulator output connected to supply power to a respective load, the plurality of regulators each being separated by a distance from the bus converter.

DETAILED DESCRIPTION

Power Distribution Architecture

Figure 3:
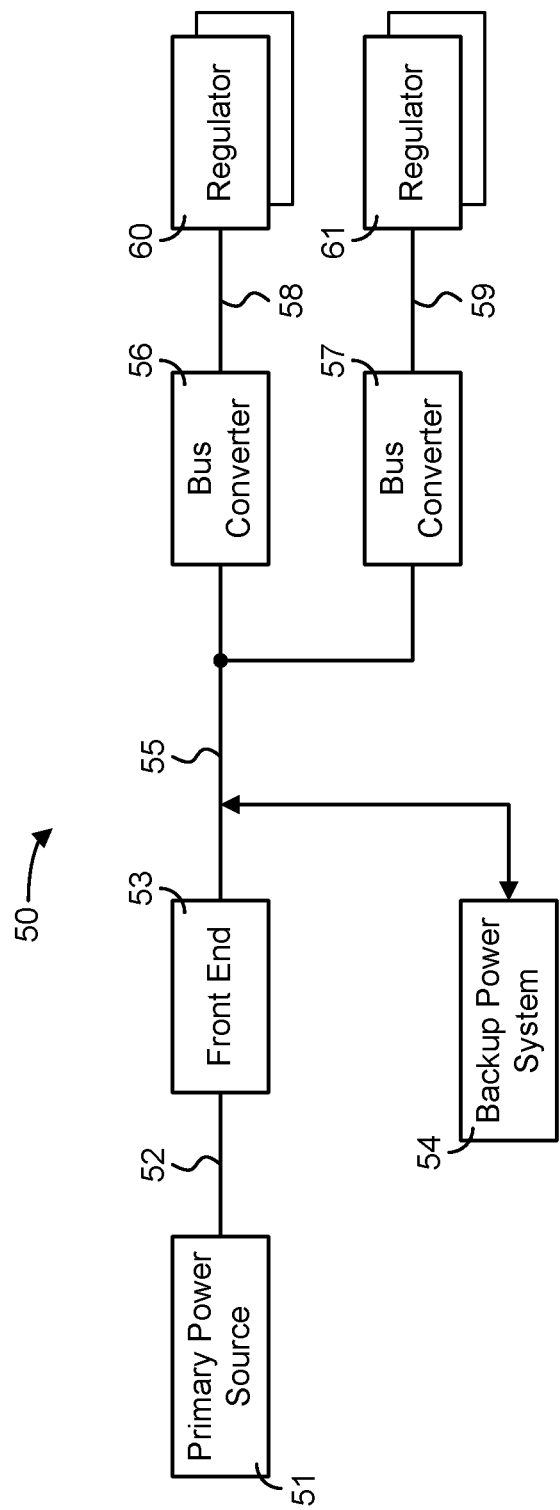
FIG. 3 shows a schematic diagram of a new power distribution architecture according to an illustrative embodiment.

A power distribution system 50 is shown in FIG. 3 having a primary power source 51 delivering power via a connection 52 to a front-end power-processing unit 53. The primary power source 51 may be an AC utility line, and the front end unit 53 may be a power conversion stage that converts power from the power source 51 delivering power at a relatively high but safe DC voltage to a power distribution bus 55, e.g. the DC voltage may vary from a minimum, e.g. 38 Volts, to a maximum, e.g. 55 Volts. Preferably, the front-end unit 53 provides voltage step down and isolation and may optionally provide power factor correction, regulation, or both. An optional backup power system 54 is shown connected to the power distribution bus 55 to provide power in the event of a loss of power from the primary power source 52. The backup power system may include batteries, a charger for maintaining the batteries, and a switchover mechanism that connects the batteries to the bus in response to predetermined events, such as a decline in voltage or loss of power from the output of the front end 53 or the primary power source 51.

One or more bus converters, e.g. bus converters 56, 57, may be connected to the power distribution bus 55 downstream from the front end 53 as shown in the example of FIG. 3 to convert power received from the relatively high voltage power distribution bus 55 for delivery to a respective lower voltage bus. As shown, bus converters 56 and 57 respectively supply power to buses 58 and 59 at voltages, e.g. at or near the requisite load voltages, that are lower than the voltage of the power distribution bus 55, providing step-down voltage transformation. The bus converters 56, 57 are generally separated by a distance from their respective regulators 60, 61. For example, in a typical system, one or more system circuit boards housed in a common enclosure may each include one or more bus converters, preferably located near the edge of, or other location on, the board where power connections are made to the board. A downstream regulator receiving power from the bus converter(s) may be preferably located adjacent to the circuitry, e.g. a processor, ASIC, or other circuitry, to which it or they supply power. The physical distance separating the bus converter and a respective down-stream regulator in such an example may range from as much as a dimension of the system circuit board, i.e. a diagonal dimension where the bus converter and regulator located at opposite corners, a length or width dimension where they are located at opposite edges, a half-length or width where one is situated closer to the middle and the other is at an edge, etc. In another example, a bus converter may be located off of the system board in which case the electrical distance could be greater than a dimension of the system board. Naturally, the distance separating the bus converter and a respective down-stream regulator will depend on the system layout. However, a bus converter housed in a self-contained assembly adapted to be installed as a unit at a location remote from the down-stream regulator(s) may be separated by a distance from a down-stream regulator regardless of their respective mounting locations at the system level.

The output of each bus converter 56, 57 may, in turn, provide power via its respective bus 58, 59 to a respective plurality of regulators, preferably at or near the point of load, such as point-of-load switching voltage regulators 60, 61. It should be understood that although two bus converters 56, 57 are shown in the example of FIG. 3, any number of bus converters, e.g. one, may be used. Similarly, although regulators 60 and 61 are shown in FIG. 3 as comprising a plurality of individual regulators, any suitable number of regulators, e.g. one, may be connected to a particular bus converter within the constraints of the physical devices used. The regulators 60, 61 may supply power to respective loads (not shown). The loads can be a variety of devices, including integrated circuits and electromechanical devices (such as storage and cooling devices).

The bus converters 56, 57 shown in the system of FIG. 3, however, preferably do not provide galvanic isolation between their respective output busses 58, 59 and the power distribution bus 55 as described in additional detail below.

Series-Connected DC Transformer

Figure 1:
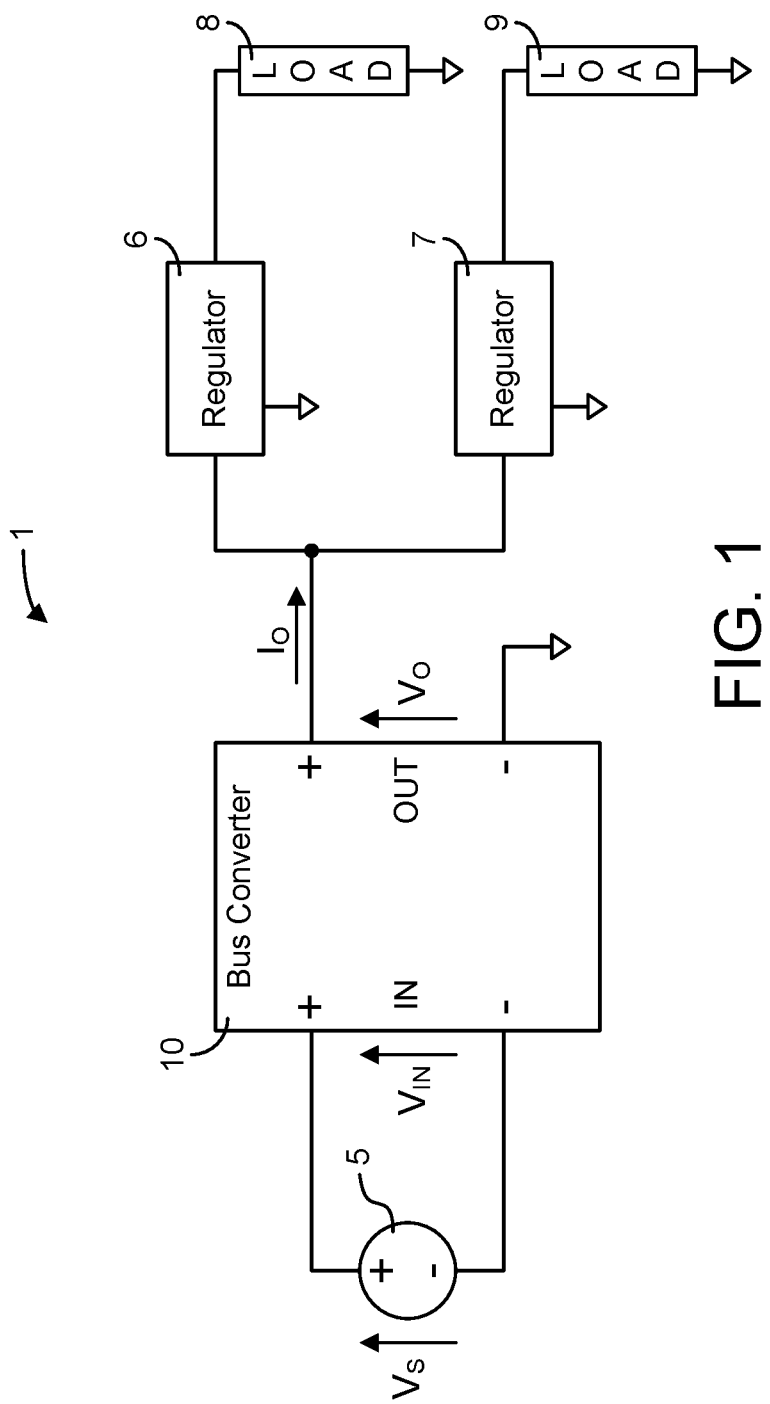
FIG. 1 shows a schematic block diagram of a prior art IBA power distribution system according to an illustrative embodiment.
Figure 2:
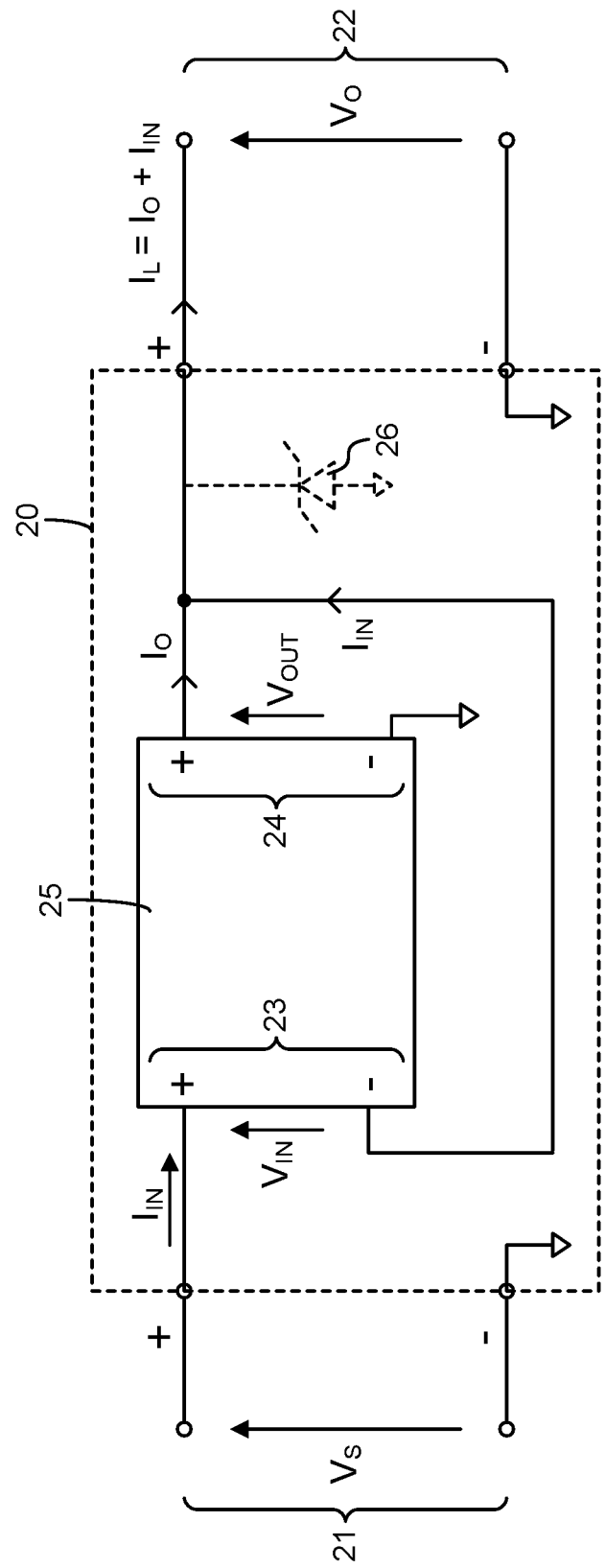
FIG. 2 shows a functional block diagram of a series-connected DC Transformer according to an illustrative embodiment.

Referring to FIG. 2, a functional block diagram of a series-connected power conversion system 20 suitable for use as a bus converter in the power distribution system 50 of FIG. 3 is shown. The power conversion system 20 includes an input 21 for receiving power from a source at a source voltage, $V_S$, and an output 22 for delivering power to a load at an output voltage, $V_O$, that is less than $V_S$, and a DC Transformer 25. The DC Transformer 25 may be implemented preferably using the Sine-Amplitude Converter ("SAC") topologies and timing architectures described in Vinciarelli, Factorized Power Architecture and Point of Load Sine Amplitude Converters, U.S. Pat. No. 6,930,893 and in Vinciarelli, Point of Load Sine Amplitude Converters and Methods, U.S. Pat. No. 7,145,786 both assigned to VLT., Inc. and incorporated here in their entirety by reference (hereinafter the "SAC Patents"). Alternatively, other converter topologies, such as hard-switching, fixed ratio DC-DC converters, may be used. The DC Transformer 25 converts power received from its input 23 (distinguished from the input 21 of the bus converter 20) at an input voltage, $V_{IN}$, for delivery to its output 24 at an output voltage, $V_{OUT}$, using an essentially fixed voltage gain or voltage transformation ratio.

The voltage gain or voltage transformation ratio of a system as defined generally herein is the ratio of its output voltage to its input voltage at a specified current such as an output current. For the system 20 in FIG. 2, the voltage transformation ratio may be expressed as $K_{SYS}=V_O/V_S$ @ $I_L$. Similarly, the voltage transformation ratio of the DC Transformer 25 may be stated as $K_{DC}=V_{OUT}/V_{IN}$ @ $I_O$. Note that the system output voltage, $V_O$, and the DC Transformer output voltage, $V_{OUT}$, are the same in the configuration shown. However, the input 23 and output 24 of the DC Transformer 25 are shown in a series-connected configuration across the system input 21. As a result, the input voltage, $V_{IN}$, to the DC Transformer input 23 is less than the input voltage, $V_S$, to the system input 21 by an amount equal to the output voltage:

$$V_{IN}=V_S-V_O. \quad (1)$$

Similarly as shown in FIG. 2, the current, $I_L$, drawn by the load from the system output 22 is greater than the current produced at the output 24 of the DC Transformer 25 by an amount equal to the input current:

$$I_O=I_L-I_{IN}. \quad (2)$$

The system voltage transformation ratio, $K_{SYS}$, using the series-connected DC Transformer 25, may be expressed as a function of the DC Transformer voltage transformation ratio, $K_{DC}$:

$$K_{SYS}=K_{DC}/(K_{DC}+1) \quad (3)$$

The above equation (3) may be rearranged to express the DC Transformer 25 voltage transformation ratio, KDC, required in a series-connected system as a function of the system voltage transformation ratio, $K_{SYS}$:

$$K_{DC}=K_{SYS}/(1-K_{SYS}) \quad (4)$$

Figure 4:
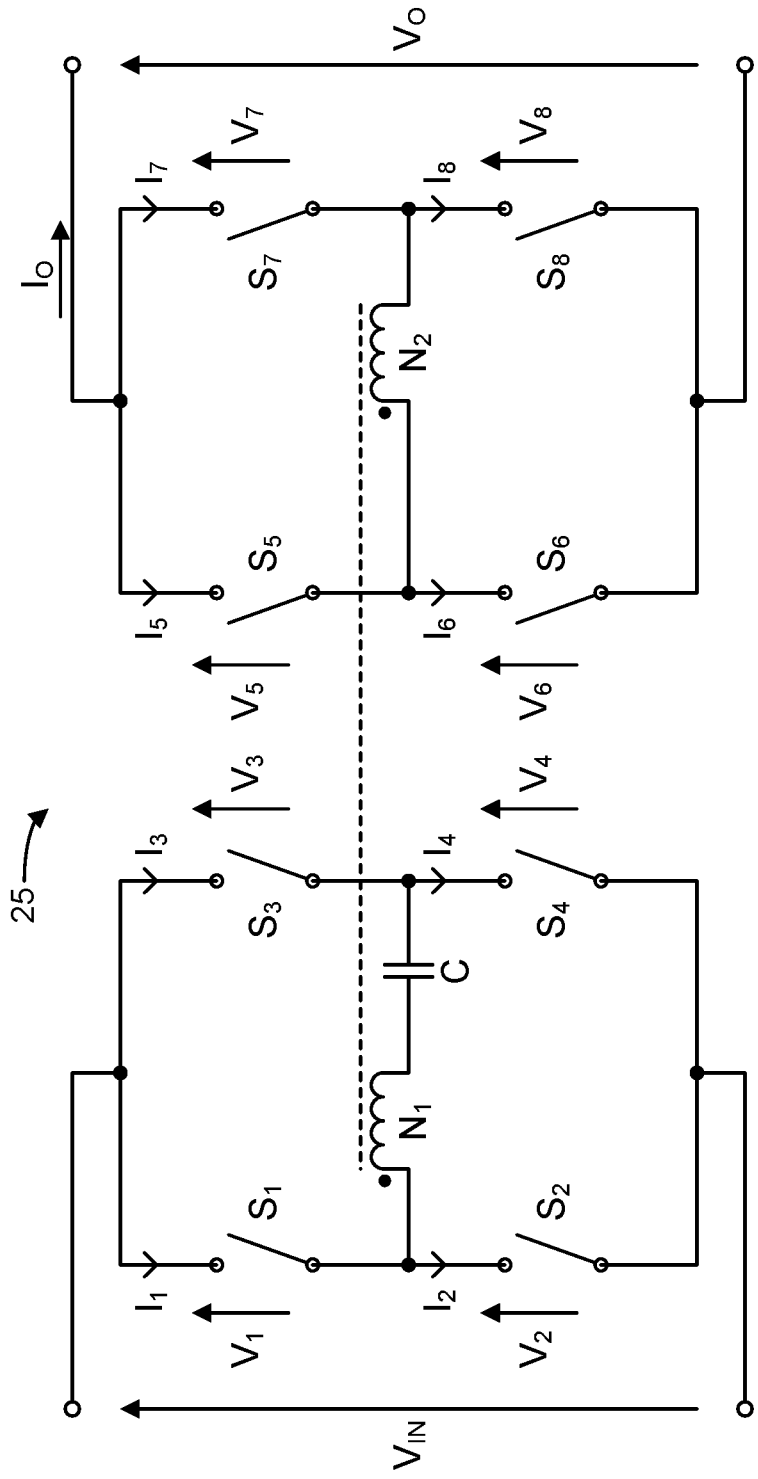
FIG. 4 shows a schematic diagram of an isolated SAC-based DC Transformer according to an illustrative embodiment.

Referring to FIG. 4, an isolated SAC that may be utilized for DC Transformer 25, according to one embodiment, is shown having a full-bridge input circuit, including switches S1, S2, S3, and S4, connected to drive the resonant circuit including capacitor C and the input winding, having N1 turns, with the input voltage $V_{IN}$. The isolated SAC is shown having a full-bridge output circuit, including switches S5, S6, S7, and S8, connected to rectify the voltage impressed across the output winding, having N2 turns, and delivering the output voltage, $V_O$. The voltage transformation ratio of the SAC will be essentially a function of the turns ratio: $K_{DC}=V_O/V_{IN}=N2/N1$.

Figure 5:
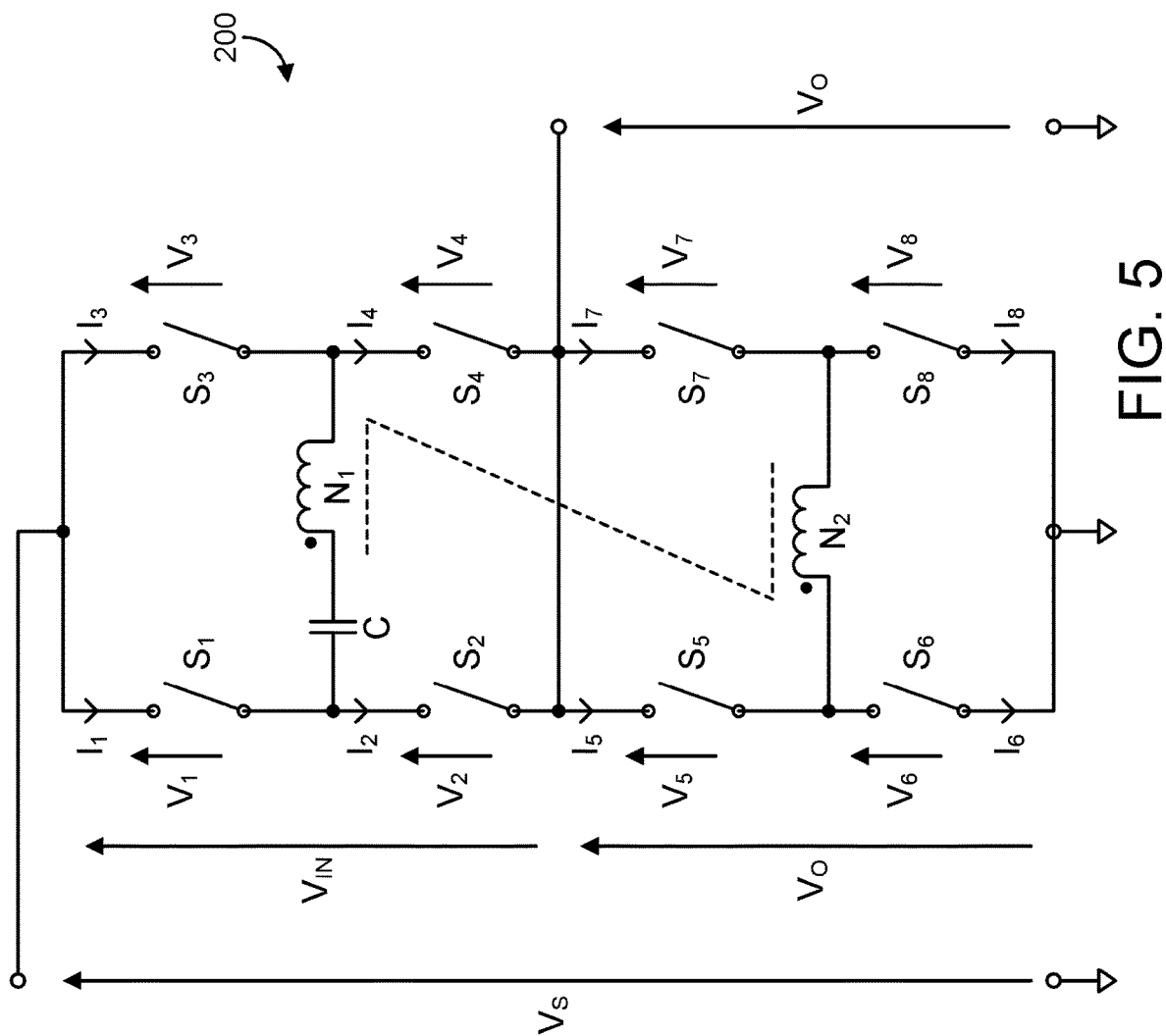
FIG. 5 shows a schematic diagram of a series-connected SAC-based DC Transformer according to an illustrative embodiment.

A series-connected SAC 200 is shown in FIG. 5. By way of comparison, the series-connected SAC 200 uses the same full-bridge input circuit topology, including switches S1, S2, S3, and S4, driving the resonant circuit including capacitor C and the input winding, having N1 turns, with the input voltage $V_{IN}$. SAC 200 also uses the same full-bridge output topology, including switches S5, S6, S7, and S8, connected to rectify the voltage impressed across the output winding, having N2 turns, and delivering the output voltage, $V_O$. The voltage transformation ratio of the series-connected SAC 200 from the input circuit to output circuit is also essentially a function of the transformer turns ratio N2/N1 and the same as the isolated SAC 25 in FIG. 4: $K_{DC}=V_O/V_{IN}=N2/N1$. However, when evaluated in terms of the system, i.e. using $V_S$ applied across the series-connected input and output, the voltage transformation ratio becomes: $K_{SYS}=V_O/V_S=N2/(N2+N1)$.

Many contemporary applications use a voltage transformation ratio equal to ⅕ requiring an odd transformer turns ratio (N2/N1=⅕) which is generally not optimal. Referring to equation (4) above, the $K_{SYS}=$⅕ bus converter may be implemented using a $K_{DC}=$¼ series-connected topology (e.g. as shown in FIGS. 2, 4, and 5), allowing the use of an even, i.e. 1:4, turns ratio in the transformer. An even transformer turns ratio may provide greater transformer layout flexibility and efficiency.

Figure 6:
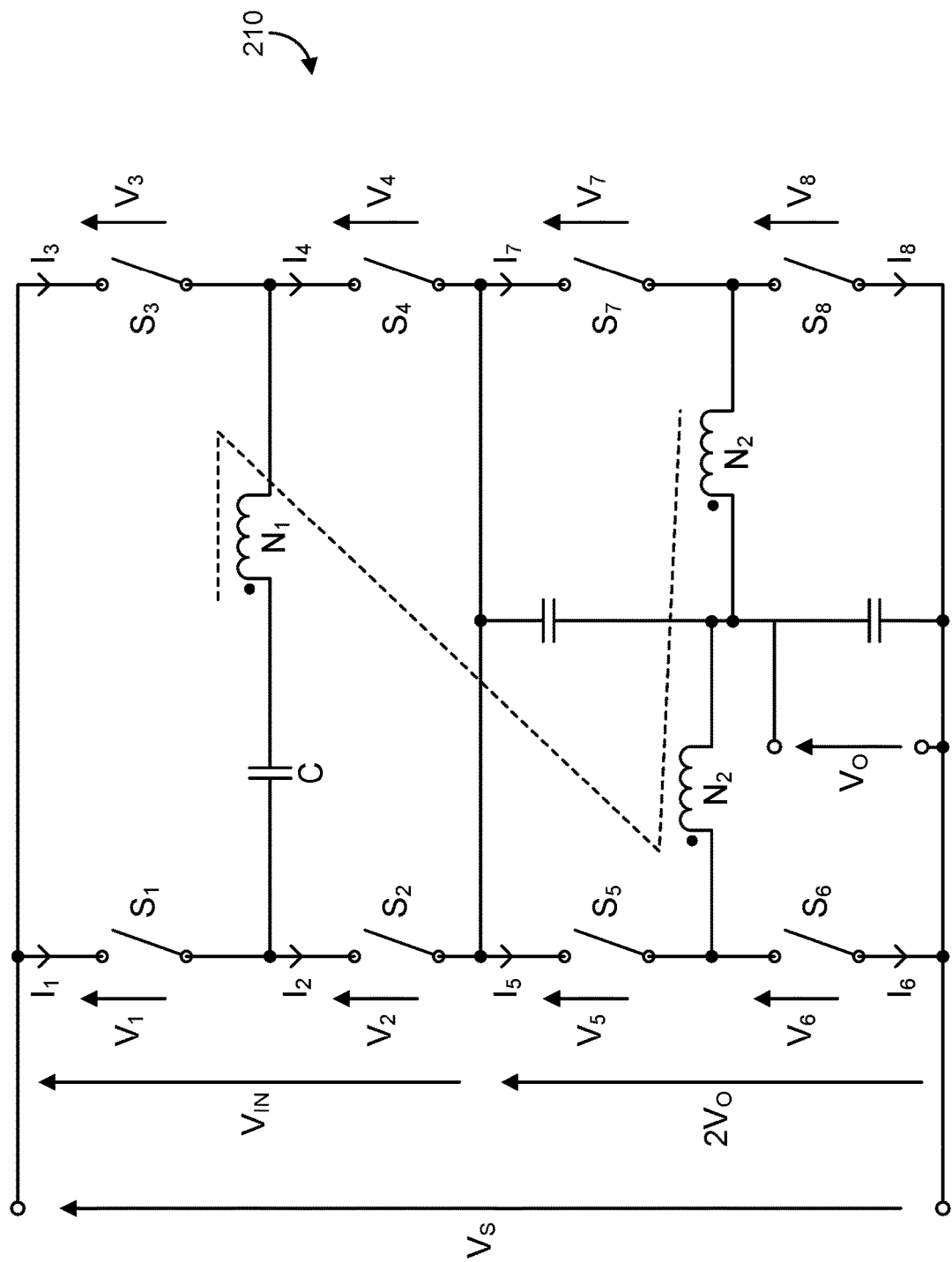
FIG. 6 shows a schematic diagram of a series-connected SAC-based DC Transformer having a center-tapped winding in the output circuit according to an illustrative embodiment.
Figure 7:
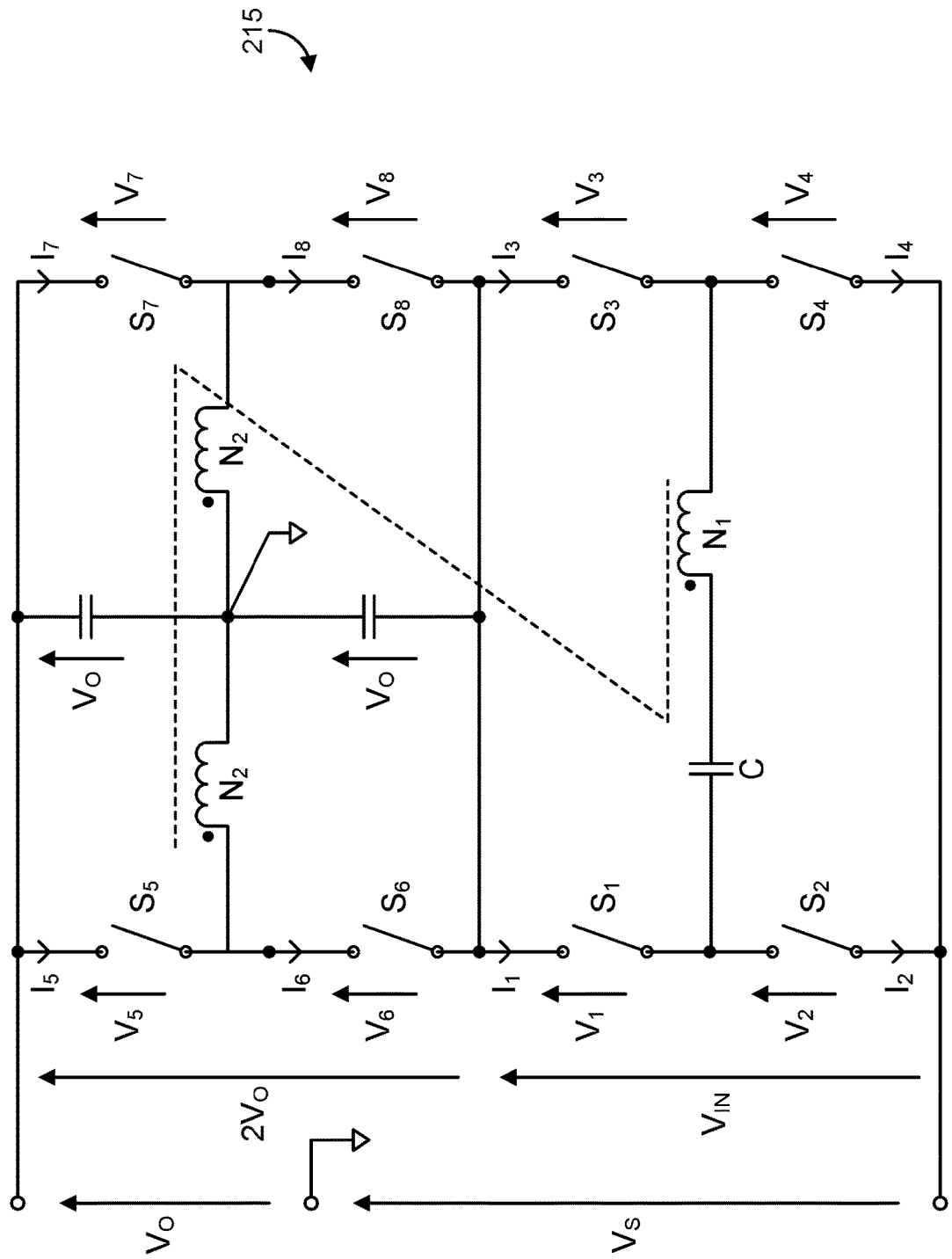
FIG. 7 shows a schematic diagram of a series-connected DC Transformer for receiving power from a negative input source and delivering power at a positive output voltage according to an illustrative embodiment.

Note that the series-connected converter 200 may be implemented by connecting an off-the-shelf isolated DC Transformer, such as the isolated converter shown in FIG. 4, as shown in FIG. 2. Alternatively, the converter 200 may be implemented as series-connected input and output circuits, e.g. as shown in FIGS. 5, 6, and 7 discussed below, in an integrated converter, optionally providing greater power density eliminating the isolation imposed design constraints, eliminating control circuit bias currents from flowing through to the output and the potential need for an output clamp, and providing system-ground referenced control circuitry (not shown) for interface signals that are referenced to ground rather than the output for the reconfigured off-the-shelf isolated converter.

Connecting the input and output of the DC Transformer 25 in series eliminates galvanic isolation between the input and output of the series-connected bus converter 20, which is counterintuitive. However, when used in the architecture of FIG. 3, isolation is deployed at an intermediate stage where the isolation may be superfluous. The architecture of FIG. 3, therefore, trades isolation at this stage for efficiency gain and reduced component stress. If isolation is required, e.g. for safety reasons, in the architecture of FIG. 3, it may preferably be provided by an upstream power conversion stage such as the front-end converter 53.

Efficiency

The power processed by the isolated SAC shown in FIG. 4 may be compared with that of the series-connected SAC 200 (FIG. 5) by summing the product of maximum voltage across ($V_n$) and average current ($I_n$) through each switch (n=1 through 8).

$$P_{Processed}=\sum_{n=1}^{n=8n}(V_n*I_n) \quad (5)$$

Each input switch (S1, S2, S3 and S4) in the full bridge input circuits (FIGS. 4, 5) is subjected to the input voltage, $V_{IN}$, (distinguished from the source voltage $V_S$) and an average of one half of the input current, $I_{IN}$. The sinusoidal nature of the current in the SAC topology represents a difference between the RMS and average currents, which is unimportant for the following comparison between two converters using the same topology. The power processed by the input circuits is:

$$P_{IN}=2*V_{IN}*I_{IN} \quad (6)$$

Similarly, each output switch (S5, S6, S7 and S8) in the full bridge output circuit of FIG. 4 will be subjected to the full output voltage, $V_O$, and will carry an average of one half of the output current, $I_O$. Note that the output current in the case of the isolated converter is equal to the load current, $I_L$, and in the case of the series-connected converter (discussed below) is not. The power processed by the output circuits may therefore be reduced to:

$$P_{OUT}=2*V_O*I_O \quad (7)$$

Combining equations (6) and (7) and making the appropriate substitutions using $K_{DC}=V_O/V_{IN}$ and the corollary $I_{IN}=K_{DC}*I_O$, the total power processed by the converters reduces to:

$$P=4*V_O*I_O \quad (8)$$

In the isolated converter of FIG. 4, the output current equals the load current ($I_O=I_L$), therefore, the power processed by the isolated converter, $P_{ISO}$, may be reduced to the following function of load power, $P_{Load}=V_O*I_L$:

$$P_{ISO}=4*P_{Load} \quad (9)$$

Neglecting fixed losses in the converter, the input current may be expressed as a function of the output current and voltage transformation ratio as follows:

$$I_{IN}=I_O*K_{DC} \quad (10)$$

Combining equations (2), (4), and (10), the output current of the series-connected converter may be expressed as a function of load current and voltage transformation ratio as follows:

$$I_{O\text{-}Series}=I_L*(1-K_{SYS}) \quad (11)$$

Substituting equation (11) into equation (8) produces the total power processed by the series-connected converter as a function of load power ($P_{Load}=V_O*I_L$) and system voltage transformation ratio:

$$P_{SERIES}=4*P_{Load}*(1-K_{SYS}) \quad (12)$$

Accordingly, the efficiency advantage of the series-connected converter over the isolated converter—the ratio of equations (12) and (9)—reduces to:

$$P_{SERIES}/P_{ISO}=(1-K_{SYS}) \quad (13)$$

From equation (13) it can be seen that the series-connected converter offers a significant efficiency advantage. Consider a typical example for comparison, using a bus converter to convert power from a nominal 50 Volt power distribution bus for delivery to a 10 volt load ($K_{SYS}=\frac{1}{5}$) at 100 amps: the series-connected converter processes only 80% of the power, offering a 20% efficiency savings compared to the isolated converter.

In a typical isolated DC Transformer, like most DC-DC converters, the control circuitry is configured to operate from power drawn from the input producing a quiescent component of the input current. Use of such a converter, e.g. an off-the-shelf DC Transformer, in a series-connected configuration could, therefore, allow the quiescent input current to flow unregulated into a load connected to the output, which would be problematic while the power train is not operating and, therefore, incapable of regulating the output voltage. It may, for that reason, be desirable to clamp the output voltage using a zener diode, such as zener diode 26 in FIG. 2, or other clamp circuit or device appropriately scaled in breakdown voltage and power dissipation to carry the quiescent input current, protecting the load and perhaps the output circuitry of the converter. Integrating the series-connected input and output circuitry into a non-isolated converter topology such as shown in FIGS. 5, 6, and 7 affords the opportunity to configure the control circuitry to draw power from the input to ground preventing that component of the input current from flowing out to the load. Additionally, a DC blocking capacitor may be used in the power train to avoid leakage current from flowing from the input to the output. One or both of the above measures may be used to avoid the need to clamp the output.

Configuring the control circuitry to reference the system ground in the integrated converter (rather than the input return in the off-the-shelf isolated converter) easily allows any interface signals to be ground-referenced (rather than output referenced) which is advantageous from the perspective of the system integrator.

Center-Tap Secondary

Another series-connected SAC 210 is shown in FIG. 6. By way of comparison, the series-connected SAC 210 uses the same full-bridge input circuit topology, including switches S1, S2, S3, and S4, driving the resonant circuit including capacitor C and the input winding, having N1 turns, with the input voltage $V_{IN}$, as shown in FIG. 5. However, a center-tap output winding, having 2*N2 turns, is used in the output circuit, which includes switches S5, S6, S7, and S8, connected to rectify the voltage impressed across the output windings and delivering the output voltage, $V_O$. The system voltage transformation ratio of the series-connected SAC 210 (FIG. 6) is essentially a function of the transformer turns ratio: $K_{SYS}=V_O/V_{SYS}=N2/(N1+2*N2)$; as is the voltage transformation ratio from input circuit to output circuit: $K_{DC}=V_O/V_{IN}=N2/N1$.

The converter 210 of FIG. 6 differs from the series-connected converter 200 (FIG. 5) in that the input voltage, $V_{IN}$, presented to the input circuit is equal to the source voltage, $V_S$, reduced by twice the output voltage, $V_O$:

$$V_{IN\text{-}210}=V_S-2V_O \quad (14)$$

as suggested by the addition of N2 turns in the output winding of the transformer. Also, each output switch (S5, S6, S7 and S8) in the converter 210 is subjected to twice the output voltage, $V_O$, with the upper output switches (S5 and S7) each carrying an average of half of the input current, $I_{IN}$, and the lower output switches (S6 and S8) each carrying an average of half of the difference between the load current, $I_L$, and the input current, $I_{IN}$. Using the same analysis as described above, summing the product of maximum voltage across ($V_n$) and average current ($I_n$) through each switch (N=1 through 8), the total power processed by the converter 210 of FIG. 6 is:

$$P_{210}=2*V_{IN}*I_{IN}+2*V_O*I_{IN}+2*V_O*(I_L-I_{IN}) \quad (15)$$

Using the system voltage transformation ratio, $K_{SYS}=V_O/V_S$ in equation (14), the input voltage may be expressed as:

$$V_{IN\text{-}210}=V_O*((1/K_{SYS})-2) \quad (16)$$

Recognizing that in an ideal converter the input power equals the output power $V_S*I_{IN}=V_O*I_L$ the input current may be expressed as:

$$I_{IN}=K_{SYS}*I_L \quad (17)$$

Making the appropriate substitutions into equation (15), the total power processed by series-connected converter 210 (FIG. 6) reduces to:

$$P_{210}=4*V_O*I_L*(1-K_{SYS}) \quad (18)$$

which may be further reduced to express the total power processed by the series-connected converter 210 using a center-tap output winding as shown in FIG. 6 as a function of load power ($P_{Load}=V_O*I_L$) and system voltage transformation ratio:

$$P_{210}=4*P_{Load}*(1-K_{SYS}) \quad (19)$$

Which is the same result obtained in equation (12) above for the series-connected converter 200 in FIG. 5.

There may be certain advantages of one series-connected topology over the other depending upon the application. For example, the transformer in the converter 200 (FIG. 5) has N2 fewer turns than in the transformer of the converter 210 (FIG. 6) offering reduced winding losses. However, the input switches (S1, S2, S3 and S4) in the converter 210 (FIG.

6) are exposed to lower voltages than in the converter 200 (FIG. 5) which may afford lower switch conduction losses. Also, two of the output switches (S5 and S7) in converter 210 (FIG. 6) carry much less current and may be implemented with smaller and more cost effective devices than in converter 200 (FIG. 5).

Negative Input-Positive Output

Referring to FIG. 7, another series-connected SAC-based converter 215 is shown configured to receive a negative source voltage, $V_S$, and deliver a positive output voltage. (The topology shown in FIG. 7 may alternatively be adapted to receive a positive source voltage and deliver a negative output voltage.) Converter 215 may be viewed as a variation of the converter 210 (FIG. 6) in which the input and output circuit positions have been rearranged with the output terminal serving as the common terminal. The converter 215 of FIG. 7 differs from the converter 210 (FIG. 6) in that the absolute value of the input voltage, $V_{IN}$, presented to the input circuit is equal to the absolute value of the source voltage, $V_S$, reduced by the absolute value of the output voltage, $V_O$ (compared to twice the output voltage in FIG. 6) because of the polarity change from input to output:

$$|V_{IN\text{-}215}|=|V_S|-|V_O| \tag{20}$$

as also suggested by the transformer configuration. Also, the upper output switches (S5 and S7) each carry an average of half of the output current, $I_O$, which equals the load current, $I_L$ in FIG. 7, compared to the difference between the load current, $I_L$, and the input current, $I_{IN}$, in FIG. 6. Once again, summing the product of maximum voltage across ($V_n$) and average current ($I_n$) through each switch (N=1 through 8) as described above, the total power processed by the converter 215 of FIG. 7 is:

$$P_{215}=2*V_{IN}*I_{IN}+2*V_O*I_{IN}+2*V_O*I_L \tag{21}$$

which, when reduced using equations (17) and (20), becomes:

$$P_{215}=4*P_{Load} \tag{22}$$

A comparison of the power processed by the converter 215 (equation (22); FIG. 7) with the power processed by the isolated converter 25 (equation (9); FIG. 4) may indicate no efficiency advantage, however, the input switches (S1, S2, S3 and S4) in the series-connected converter 215 of FIG. 7 are subjected to lower voltages potentially affording use of better figure of merit switches leading to potential efficiency improvements. Furthermore, the absence of isolation-related design constraints in such an integrated converter may be used to increase power density.

The converters 20 (FIG. 2), 200 (FIG. 5), 210 (FIG. 6), and 215 (FIG. 7) are examples of a class of series-connected converters in which at least a portion of the output circuit is connected in series with the input circuit such that the absolute value of the voltage, $V_{IN}$, presented to the input circuit is equal to the absolute value of the source voltage $V_S$, minus N times the absolute value of the output voltage, $V_O$, where the value of N is at least 1:

$$|V_{IN}|=|V_S|-N*|V_O| \tag{23}$$

The value of N will vary depending upon the converter topology used, e.g. a center-tap secondary or not, polarity reversing or not, etc. In the examples described above: N=1 for converters 20 (FIG. 2), 200 (FIG. 5), and 215 (FIG. 7) and N=2 for converter 210 (FIG. 6) as shown in equation 14. Although a full bridge switch configuration is preferred for its superior noise performance, half-bridge switch configurations may also be deployed in the input circuitry, the output circuitry, or both.

The disclosure is described above with reference to drawings. These drawings illustrate certain details of specific embodiments that implement the systems, apparatus, and/or methods of the present disclosure. However, describing the disclosure with drawings should not be construed as imposing on the disclosure any limitations that may be present in the drawings. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

It should be noted that although the disclosure provided herein may describe a specific order of method steps, it is understood that the order of these steps may differ from what is described. Also, two or more steps may be performed concurrently or with partial concurrence. It is understood that all such variations are within the scope of the disclosure.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. An apparatus, comprising:
    a bus converter circuit having a first terminal, a second terminal, and a common terminal and being configured to convert power in a direction, the direction being one of the following:
        (a) a first direction in which the first terminal and common terminal form an input for receiving input power at a first voltage, V1, and the second terminal and the common terminal form an output for delivering output power at a second voltage, V2, or
        (b) a second direction in which the second terminal and the common terminal form an input for receiving input power at the second voltage, V2, and the first terminal and the common terminal form an output for delivering output power at the first voltage, V1;
    wherein the input and output are galvanically connected;
    wherein over a range of input voltages the bus converter circuit uses an essentially fixed voltage transformation ratio, K, equal to the second voltage, V2 divided by the first voltage, V1, (K=V2/V1), to convert power in the direction, such that output power delivered in the first direction is at the second voltage, V2=K×V1, and output power delivered in the second direction is at the first voltage, V1=V2/K;
    wherein the first voltage, V1, is greater than the second voltage, V2;
    wherein the bus converter circuit includes (i) a transformer having a first winding and a second winding, (ii) a plurality of switches, and (iii) a controller configured to operate the plurality of switches in a series of converter operating cycles;
    wherein each converter operating cycle includes a first and a second power transfer interval, the first and second power transfer intervals having essentially equal durations, and wherein during the first power transfer interval a first set of the plurality of switches is ON and power is converted in the direction, and during the second power transfer interval a second set of the plurality of switches is ON and power is converted in the direction;

wherein the bus converter circuit is configured during the first power transfer interval (a) to form a first series circuit in which at least the following elements are all connected in series without regard to order: at least one of the first or second terminals, at least one of the first or second windings of the transformer, at least one of the plurality of switches in the first set, and at least one capacitor, and (b) to conduct current in the direction between the first terminal and the second terminal;

wherein the bus converter circuit is configured during the second power transfer interval (a) to form a second series circuit in which at least the following elements are all connected in series without regard to order: at least one of the first or second terminals, at least one of the first or second windings of the transformer, at least one of the plurality of switches in the second set, and at least one capacitor, and (b) to conduct current in the direction between the first terminal and the second terminal;

wherein the bus converter circuit is configured to, before the first power transfer interval, reduce a voltage across a first ZVS switch prior to turning the first ZVS switch ON, such that the voltage across the first ZVS switch is reduced when the first ZVS switch is turned ON, the first ZVS switch being at least one of the plurality of switches in the first set; and wherein the bus converter circuit is configured to, before the second power transfer interval, reduce a voltage across a second ZVS switch prior to turning the second ZVS switch ON, such that the voltage across the second ZVS switch is reduced when the second ZVS switch is turned ON, the second ZVS switch being at least one of the plurality of switches in the second set.

2. The apparatus of claims 1, wherein the bus converter circuit is a self-contained assembly adapted to be installed as a unit.

3. A computer apparatus, comprising:
a power distribution system including an input bus for receiving power at a relatively high safe voltage, preferably approximately 48 Volts;
one or more bus converter circuits of claim 1, connected to receive power from the input bus;
one or more power busses connected to receive power from the one or more bus converter circuits;
a plurality of regulators, each having an input connected to receive power from the one or more power busses and an output for delivering a regulated output; and
one or more semiconductor processors connected to receive power from one or more of the plurality of regulators.

4. The apparatus of claim 1, wherein forming the first and second series circuits comprises at least two of the first and second terminals.

5. The apparatus of claim 4, further comprising:
a power distribution bus connected to distribute power from the output; and
a plurality of voltage regulators, wherein each voltage regulator comprises a regulator input connected to the power distribution bus to receive power from the output and a regulator output connected to supply power to a respective load, the plurality of voltage regulators each being separated by a distance from the bus converter circuit.

6. The apparatus of claim 5, wherein the direction is the first direction.

7. The apparatus of claim 6, wherein the respective load comprises a computer processor.

8. A computer apparatus, comprising:
a power distribution system including an input bus for receiving power at a relatively high safe voltage, preferably approximately 48 Volts;
one or more bus converter circuits of claim 4, connected to receive power from the input bus;
one or more power busses connected to receive power from the one or more bus converter circuits;
a plurality of regulators, each having an input connected to receive power from the one or more power busses and an output for delivering a regulated output; and
one or more semiconductor processors connected to receive power from one or more of the plurality of regulators.

9. The apparatus of claim 4, wherein the bus converter circuit is further capable of converting power in either of the first direction or the second direction and the direction is a function of conditions external to the bus converter circuit.

10. A computer apparatus, comprising:
a power distribution system including an input bus for receiving power at a relatively high safe voltage, preferably approximately 48 Volts;
one or more bus converter circuits of claim 9, connected to receive power from the input bus;
one or more power busses connected to receive power from the one or more bus converter circuits;
a plurality of regulators, each having an input connected to receive power from the one or more power busses and an output for delivering a regulated output; and
one or more semiconductor processors connected to receive power from one or more of the plurality of regulators.

11. The apparatus of claim 4, wherein the first series circuit comprises one or more of the following: (a) at least one component that is not in the second series circuit, (b) at least one component that is in the second series circuit but is connected in an order that is different from in the second series circuit, or (c) at least one component that is in the second series circuit but is connected to carry a current that flows in a direction that is opposite from a current that the component carries in the second series circuit.

12. A computer apparatus, comprising:
a power distribution system including an input bus for receiving power at a relatively high safe voltage, preferably approximately 48 Volts;
one or more bus converter circuits of claim 11, connected to receive power from the input bus;
one or more power busses connected to receive power from the one or more bus converter circuits;
a plurality of regulators, each having an input connected to receive power from the one or more power busses and an output for delivering a regulated output; and
one or more semiconductor processors connected to receive power from one or more of the plurality of regulators.

13. The apparatus of claim 4, wherein the first set of switches includes one or more switches that are not in the second set of switches.

14. The apparatus of claim 4, wherein the first set of switches does not include any switches that are in the second set of switches.

15. The apparatus of claim 4, wherein at least one winding of the first series circuit is different than at least one winding of the second series circuit.

16. The apparatus of claim 4, wherein at least one winding of the first series circuit is the same as at least one winding of the second series circuit.

17. The apparatus of claim 16, wherein the at least one winding is configured in the first series circuit to carry current in one direction and in the second series circuit to carry current in another direction opposite to the one direction.

18. The apparatus of claim 16, wherein the first series circuit and the second series circuit each comprises at least two windings of the transformer.

19. The apparatus of claims 18, wherein the bus converter circuit is a self-contained assembly adapted to be installed as a unit.

20. A computer apparatus, comprising:
   a power distribution system including an input bus for receiving power at a relatively high safe voltage, preferably approximately 48 Volts;
   one or more bus converter circuits of claim 18, connected to receive power from the input bus;
   one or more power busses connected to receive power from the one or more bus converter circuits;
   a plurality of regulators, each having an input connected to receive power from the one or more power busses and an output for delivering a regulated output; and
   one or more semiconductor processors connected to receive power from one or more of the plurality of regulators.

21. The apparatus of claim 18, wherein the at least two windings in the first and second series circuits each comprises the first winding and the second winding, and the first winding and the second winding are configured in the first series circuit to carry current in one direction and are configured in the second series circuit to carry current in another direction opposite to the one direction.

22. The apparatus of claim 21, wherein the first and second windings are configured in a first order in the first series circuit and in a second different order in the second series circuit.

23. The apparatus of claim 22, wherein the first and second windings are configured in the first series circuit for current to flow in the first direction and in the second series circuit for current to flow in the another direction.

24. The apparatus of claim 18, wherein the first and second series circuits form a first and a second series resonant circuit, each having a characteristic resonant period; and the essentially equal duration of the first and second power transfer intervals is less than each characteristic resonant period.

25. The apparatus of claims 24, wherein the bus converter circuit is a self-contained assembly adapted to be installed as a unit.

26. The apparatus of claim 18, wherein the transformer comprises a third winding and the first and second series circuits each further comprises the third winding.

27. The apparatus of claim 26, wherein the first, second, and third windings are configured in the first series circuit to carry current in one direction and in the second series circuit to carry current in another direction opposite to the one direction.

28. The apparatus of claim 26, wherein the first set of switches includes one or more switches that are not in the second set of switches.

29. The apparatus of claim 26, wherein the first set of switches does not include any switches that are in the second set of switches.

30. The apparatus of claim 16, wherein the transformer comprises a third winding and the first series circuit and the second series circuit each comprises at least two windings of the transformer.

31. The apparatus of claims 30, wherein the bus converter circuit is a self-contained assembly adapted to be installed as a unit.

32. A computer apparatus, comprising:
   a power distribution system including an input bus for receiving power at a relatively high safe voltage, preferably approximately 48 Volts;
   one or more bus converter circuits of claim 30, connected to receive power from the input bus;
   one or more power busses connected to receive power from the one or more bus converter circuits;
   a plurality of regulators, each having an input connected to receive power from the one or more power busses and an output for delivering a regulated output; and
   one or more semiconductor processors connected to receive power from one or more of the plurality of regulators.

33. The apparatus of claim 4, wherein the voltage across the first ZVS switch is reduced to nearly zero before the first ZVS switch is turned ON and the voltage across the second ZVS switch is reduced to nearly zero before the second ZVS switch is turned ON.

34. The apparatus of claim 1, wherein the voltage across the first ZVS switch is reduced to nearly zero before the first ZVS switch is turned ON and the voltage across the second ZVS switch is reduced to nearly zero before the second ZVS switch is turned ON.

35. The apparatus of claim 1, wherein at least one of the windings is coupled to the input and at least one of the windings is coupled to the output during the power transfer intervals.

36. The apparatus of claim 35, wherein the first winding is coupled to the input during the first power transfer interval and the second winding is coupled to the output during the first power transfer interval.

37. The apparatus of claim 36, wherein the transformer comprises a third winding and the third winding is coupled to the output during the second power transfer interval.

38. The apparatus of claim 1, wherein the bus converter circuit is a self-contained assembly adapted to be installed as a unit.

39. The apparatus of claim 38, wherein the direction is the first direction.

40. The apparatus of claim 6, wherein the respective load comprises a computer processor.

41. The apparatus of claim 1, wherein the first series circuit comprises one or more of the following: (a) at least one component that is not in the second series circuit, (b) at least one component that is in the second series circuit but is connected in an order that is different from in the second series circuit, or (c) at least one component that is in the second series circuit but is connected to carry a current that flows in a direction that is opposite from a current that the component carries in the second series circuit.

42. A computer apparatus, comprising:
   a power distribution system including an input bus for receiving power at a relatively high safe voltage, preferably approximately 48 Volts;
   one or more bus converter circuits of claim 41, connected to receive power from the input bus;

one or more power busses connected to receive power from the one or more bus converter circuits;
a plurality of regulators, each having an input connected to receive power from the one or more power busses and an output for delivering a regulated output; and
one or more semiconductor processors connected to receive power from one or more of the plurality of regulators.

43. The apparatus of claim 1, wherein the first set of switches includes one or more switches that are not in the second set of switches.

44. The apparatus of claim 1, wherein the first set of switches does not include any switches that are in the second set of switches.

45. The apparatus of claim 1, wherein at least one winding of the first series circuit is different than at least one winding of the second series circuit.

46. The apparatus of claim 1, wherein at least one winding of the first series circuit is the same as at least one winding of the second series circuit.

47. The apparatus of claim 46, wherein the at least one winding is configured in the first series circuit to carry current in one direction and in the second series circuit to carry current in another direction opposite to the one direction.

48. The apparatus of claim 46, wherein the first series circuit and the second series circuit each comprises at least two windings of the transformer.

49. A computer apparatus, comprising:
a power distribution system including an input bus for receiving power at a relatively high safe voltage, preferably approximately 48 Volts;
one or more bus converter circuits of claim 41, connected to receive power from the input bus;
one or more power busses connected to receive power from the one or more bus converter circuits;
a plurality of regulators, each having an input connected to receive power from the one or more power busses and an output for delivering a regulated output; and
one or more semiconductor processors connected to receive power from one or more of the plurality of regulators.

50. The apparatus of claim 49, wherein the bus converter circuit is a self-contained assembly adapted to be installed as a unit.

51. The apparatus of claim 48, wherein the at least two windings in the first and second series circuits each comprises the first winding and the second winding, and the first winding and the second winding are configured in the first series circuit to carry current in one direction and are configured in the second series circuit to carry current in another direction opposite to the one direction.

52. The apparatus of claim 51, wherein the first and second windings are configured in a first order in the first series circuit and in a second different order in the second series circuit.

53. The apparatus of claim 52, wherein the first and second windings are configured in the first series circuit for current to flow in the one direction and in the second series circuit for current to flow in the another direction.

54. The apparatus of claim 51, wherein the transformer comprises a third winding and the first and second series circuits each further comprise the third winding.

55. The apparatus of claim 54, wherein the first, second, and third windings are configured in the first series circuit to carry current in the one direction and in the second series circuit to carry current in the another direction.

56. The apparatus of claim 54, wherein the first set of switches does not include any switches that are in the second set of switches.

57. The apparatus of claim 54, wherein the first set of switches does not include any switches that are in the second set of switches.

58. The apparatus of claim 56, wherein the bus converter circuit is a self-contained assembly adapted to be installed as a unit.

59. The apparatus of claim 58, wherein the bus converter circuit is a self-contained assembly adapted to be installed as a unit.

60. The apparatus of claim 46, wherein the transformer comprises a third winding and the first series circuit and the second series circuit each comprises at least two windings of the transformer.

61. A computer apparatus, comprising:
a power distribution system including an input bus for receiving power at a relatively high safe voltage, preferably approximately 48 Volts;
one or more bus converter circuits of claim 60, connected to receive power from the input bus;
one or more power busses connected to receive power from the one or more bus converter circuits;
a plurality of regulators, each having an input connected to receive power from the one or more power busses and an output for delivering a regulated output; and
one or more semiconductor processors connected to receive power from one or more of the plurality of regulators.

62. The apparatus of claim 61, wherein one or more of the bus converter circuits is a self-contained assembly adapted to be installed as a unit.

63. The apparatus of claim 1, wherein the first winding and the second winding are connected together at a node and the second terminal is connected to receive power from the node.

64. The apparatus of claim 63, wherein the first winding and the second winding comprise an equal number of turns and the bus converter circuit is further capable of converting power in either the first direction or the second direction.

65. The apparatus of claim 64, wherein the transformer further comprises a third winding, and the first and second series circuits each include at least two windings.

66. The apparatus of claim 1, wherein the first winding and second winding are connected together at a node and the common terminal is connected to the node.

67. The apparatus of claim 66, wherein the first winding and the second winding comprise an equal number of turns, and the bus converter circuit is further capable of converting power in either the first direction or a second opposite direction.

68. A method, comprising:
providing a bus converter circuit having a first terminal, a second terminal, and a common terminal and being configured to convert power in a direction, the direction being one of the following:
(a) a first direction in which the first terminal and common terminal form an input for receiving input power at a first voltage, V1, and the second terminal and the common terminal form an output for delivering output power at a second voltage, V2, or
(b) a second direction in which the second terminal and the common terminal form an input for receiving input power at the second voltage, V2, and the first terminal and the common terminal form an output for delivering output power at the first voltage, V1;

galvanically connecting the input and the output;

wherein over a range of input voltages the bus converter circuit a uses an essentially fixed voltage transformation ratio, K, equal to the second voltage, V2 divided by the first voltage, V1, (K=V2/V1), to convert power in the direction, such that output power delivered in the first direction is at the second voltage, V2=K×V1, and output power delivered in the second direction is at the first voltage, V1=V2/K;

wherein the first voltage, V1, is greater than the second voltage, V2;

wherein the bus converter circuit includes (i) a transformer having a first winding and a second winding, (ii) a plurality of switches, and (iii) a controller;

operating, by the controller, the plurality of switches in a series of converter operating cycles including a first and a second power transfer interval, the first and second power transfer intervals having essentially equal durations, and wherein during the first power transfer interval a first set of the plurality of switches is ON and power is converted in the direction, and during the second power transfer interval a second set of the plurality of switches is ON and power is converted in the direction;

forming, by the bus converter circuit, during the first power transfer interval a first series circuit in which at least the following elements are all connected in series without regard to order: at least one of the first or second terminals, at least one of the first or second windings of the transformer, at least one of the plurality of switches in the first set, and at least one capacitor, and conducting, by the bus converter circuit, current in the direction between the first terminal and the second terminal;

forming, by the bus converter circuit, during the second power transfer interval a second series circuit in which at least the following elements are all connected in series without regard to order: at least one of the first and second terminals, at least one of the first or second windings of the transformer, at least one of the plurality of switches in the second set, and at least one capacitor, and conducting, by the bus converter circuit, current in the direction between the first terminal and the second terminal;

before the first power transfer interval, reducing, by the bus converter circuit, a voltage across a first ZVS switch prior to turning the first ZVS switch ON, such that the voltage across the first ZVS switch is reduced when the first ZVS switch is turned ON, the first ZVS switch being at least one of the plurality of switches in the first set; and reducing, by the bus converter circuit, a voltage across a second ZVS switch prior to turning the second ZVS switch ON, such that the voltage across the second ZVS switch is reduced when the second ZVS switch is turned ON, the second ZVS switch being at least one of the plurality of switches in the second set.

69. The method of claim 68, further comprising providing inrush current control at least during start-up of the bus converter circuit.

70. The method of claim 68, further comprising providing the bus converter circuit as a self-contained assembly.

71. The method of claim 68, wherein forming the first and second series circuits includes at least two of the first and second terminals.

72. The method of claim 71, wherein the bus converter circuit is capable of converting power in either of the first direction or the second direction and the direction is a function of conditions external to the bus converter circuit.

73. The method of claim 71, wherein at least one winding of the first series circuit is the same as at least one winding of the second series circuit; and the at least one winding of the first series circuit is connected to carry current in one direction and the at least one winding of the second series circuit is connected to carry current in another direction opposite to the one direction.

74. The method of claim 71, wherein at least one winding of the first series circuit is different than at least one winding of the second series circuit.

75. The method of claim 74, comprising connecting the first, second, and third windings in the first series circuit to carry current in one direction and in the second series circuit to carry current in another direction opposite to the one direction.

76. The method of claim 71, wherein the voltage across the first ZVS switch is reduced to nearly zero before the first ZVS switch is turned ON and the voltage across the second ZVS switch is reduced to nearly zero before the second ZVS switch is turned ON.

77. The method of claim 68, wherein the first series circuit and the second series circuit each comprises at least two windings of the transformer.

78. The method of claim 77, comprising:
connecting the first winding and the second winding in the first series circuit to carry current in the one direction; and
connecting the first winding and the second winding in the second series circuit to carry current in the another direction.

79. The method of claim 77, comprising connecting the first and second windings in a first order in the first series circuit and in a second different order in the second series circuit.

80. The method of claim 77, wherein the first and second series circuits include the first and second terminals.

81. The method of claim 80, wherein the transformer comprises a third winding and the first and second series circuits each further comprises the third winding.

82. The apparatus of claim 68, wherein the first and second series circuits form a first and a second series resonant circuit, each having a characteristic resonant period; and the essentially equal duration of the first and second power transfer intervals is less than each characteristic resonant period.

83. The method of claim 68, wherein the voltage across the first ZVS switch is reduced to nearly zero before the first ZVS switch is turned ON and the voltage across the second ZVS switch is reduced to nearly zero before the second ZVS switch is turned ON.

84. The method of claim 68, further comprising:
providing an input power bus connected to supply power to the input of the bus converter circuit;
providing a power distribution bus connected to receive power at a relatively high safe voltage, preferably approximately 48 Volts, from the output of the bus converter circuit;
providing a plurality of regulators, each having an input connected to receive power from the power distribution bus and an output for delivering a regulated output; and
one or more semiconductor processors connected to receive power from one or more of the plurality of regulators.

85. A method of powering a computer processor, the method comprising:
  using an input bus to distribute input power at a first voltage, V1;
  using one or more non-isolated bus converters to convert power received from the input bus for delivery to an output at a second voltage, V2;
  using one or more output power busses to distribute power from the one or more bus converters at the second voltage, V2, to one or more loads;
  using a plurality of regulators to regulate power received from the output power busses for delivery via a regulator output to the one or more loads; and
  wherein one or more of the loads comprise a computer processor;
  wherein the one or more non-isolated bus converters have a first terminal, a second terminal, and a common terminal, and the first terminal and common terminal form an input connected to receive power from the input bus at the first voltage, V1, and the second terminal and the common terminal form an output for delivering output power at the second voltage, V2, to the one or more power busses;
  wherein the input is galvanically connected to the output;
  using an essentially fixed voltage transformation ratio, K, equal to the second voltage, V2 divided by the first voltage, V1, (K=V2/V1), to convert power in the one or more bus converters from the input for delivery to the output at the second voltage, V2=K×V1, over a range of input voltages;
  wherein the first voltage, V1, is greater than the second voltage, V2;
  wherein the one or more non-isolated bus converters include (i) a transformer having a first winding and a second winding, (ii) a plurality of switches, and (iii) a controller;
  using the controller to operate the plurality of switches in a series of converter operating cycles including a first and a second power transfer interval, the first and second power transfer intervals having essentially equal durations, and wherein during the first power transfer interval a first set of the plurality of switches is ON and power is converted from the input to the output, and during the second power transfer interval a second set of the plurality of switches is ON and power is converted from the input to the output;
  wherein the one or more non-isolated bus converters are configured, during the first power transfer interval to (a) form a first series circuit in which at least the following elements are all connected in series without regard to order: at least one of the first or second terminals, at least one of the first or second windings of the transformer, at least one of the plurality of switches in the first set, and at least one capacitor, and (b) convert current flowing through the first terminal into current flowing through the second terminal in inverse proportion to the essentially fixed voltage transformation ratio, K;
  wherein the one or more non-isolated bus converters are configured during the second power transfer interval to (a) form a second series circuit in which at least the following elements are all connected in series without regard to order: at least one of the first or second terminals, at least one of the first or second windings of the transformer, at least one of the plurality of switches in the second set, and at least one capacitor, and (b) convert current flowing through the first terminal into current flowing through the second terminal in inverse proportion to the essentially fixed voltage transformation ratio, K;
  wherein the one or more non-isolated bus converters are configured before the first power transfer interval, to reduce a voltage across a first ZVS switch prior to turning the first ZVS switch ON, such that the voltage across the first ZVS switch is reduced when the first ZVS switch is turned ON, the first ZVS switch being at least one of the plurality of switches in the first set; and
  wherein the one or more non-isolated bus converters are configured before the second power transfer interval, to reduce a voltage across a second ZVS switch prior to turning the second ZVS switch ON, such that the voltage across the second ZVS switch is reduced when the second ZVS switch is turned ON, the second ZVS switch being at least one of the plurality of switches in the second set.

86. The method of claim 85, further comprising converting power from an AC utility line for delivery at a DC voltage, the converting providing voltage step down and galvanic isolation to provide a relatively high safe voltage, preferably approximately 48 Volts and wherein the first voltage, V1, is approximately 48 Volts.

87. The method of claim 85, wherein the first winding and the second winding are connected together at a node and further comprising delivering power via the node to the second terminal.

88. The method of claim 87, wherein the first winding comprises a first number of turns and the second winding comprise a second number of turns, and the first number and second number are equal.

89. A computer apparatus comprising:
  a power distribution system including an input bus for receiving power at a relatively high safe voltage, preferably approximately 48 Volts;
  one or more bus converter circuits connected to receive power from the input bus;
  one or more power busses connected to receive power from the one or more bus converter circuits;
  a plurality of regulators, each having an input connected to receive power from the one or more power busses and an output for delivering a regulated output; and
  one or more semiconductor processors connected to receive power from one or more of the regulators;
  wherein at least one of the one or more bus converter circuits has a first terminal, a second terminal, and a common terminal and is configured to convert power in a first direction in which the first terminal and common terminal form an input for receiving input power at a first voltage, V1, and the second terminal and the common terminal form an output for delivering output power at a second voltage, V2;
  wherein the input and output are galvanically connected;
  wherein over a range of input voltages the at least one of the one or more bus converter circuits uses an essentially fixed voltage transformation ratio, K, equal to the second voltage, V2 divided by the first voltage, V1, (K=V2/V1), to convert power in the first direction, such that output power delivered is at the second voltage, V2=K×V1;
  wherein the first voltage, V1, is greater than the second voltage, V2;
  wherein the at least one of the one or more bus converter circuits includes (i) a transformer having a first winding and a second winding, (ii) a plurality of switches, and (iii) a controller configured to operate the plurality of switches in a series of converter operating cycles;

wherein each converter operating cycle includes a first and a second power transfer interval, the first and second power transfer intervals having essentially equal durations, and wherein during the first power transfer interval a first set of the plurality of switches is ON and power is converted in the first direction, and during the second power transfer interval a second set of the plurality of switches is ON and power is converted in the first direction;

wherein the at least one of the one or more bus converter circuits is configured during the first power transfer interval to (a) form a first series circuit in which at least the following elements are all connected in series without regard to order: at least one of the first or second terminals, at least one of the first or second windings of the transformer, at least one of the plurality of switches in the first set, and at least one capacitor, and (b) convert in the first direction current flowing through the first terminal into current flowing through the second terminal in inverse proportion to the essentially fixed voltage transformation ratio, K;

wherein the at least one of the one or more bus converter circuits is configured during the second power transfer interval to (a) form a second series circuit in which at least the following elements are all connected in series without regard to order: at least one of the first or second terminals, at least one of the first or second windings of the transformer, at least one of the plurality of switches in the second set, and at least one capacitor, and (b) convert in the first direction current flowing through the first terminal into current flowing through the second terminal in inverse proportion to the essentially fixed voltage transformation ratio, K;

wherein the at least one of the one or more bus converter circuits is configured to, before the first power transfer interval, reduce a voltage across a first ZVS switch prior to turning the first ZVS switch ON, such that the voltage across the first ZVS switch is reduced when the first ZVS switch is turned ON, the first ZVS switch being at least one of the plurality of switches in the first set; and wherein the at least one of the one or more bus converter circuits is configured to, before the second power transfer interval, reduce a voltage across a second ZVS switch prior to turning the second ZVS switch ON, such that the voltage across the second ZVS switch is reduced when the second ZVS switch is turned ON, the second ZVS switch being at least one of the plurality of switches in the second set.

90. The apparatus of claim 89, wherein the first series circuit comprises one or more of the following: (a) at least one component that is not in the second series circuit, (b) at least one component that is in the second series circuit but is connected in an order that is different from in the second series circuit, or (c) at least one component that is in the second series circuit but is connected to carry a current that flows in a direction that is opposite from a current that the component carries in the second series circuit.

91. The apparatus of claim 90, wherein the first winding and the second winding are connected together at a node and the common terminal is connected to the node.

92. The apparatus of claim 91, wherein the first winding and the second winding comprise an equal number of turns and the at least one of the one or more bus converter circuits is further capable of converting power in either the first direction or a second opposite direction.

93. The apparatus of claim 92, wherein the transformer further comprises a third winding, and the first and second series circuits each include at least two windings.

94. The apparatus of claim 1, wherein the first winding and second winding are connected together at a node and the second terminal is connected to receive power from the node.

95. The apparatus of claim 93, wherein the first winding and the second winding comprise an equal number of turns, and the at least one of the one or more bus converter circuits is further capable of converting power in either the first direction or a second opposite direction.

\* \* \* \* \*